(12) United States Patent
Tsuboi et al.

(10) Patent No.: US 7,161,274 B2
(45) Date of Patent: Jan. 9, 2007

(54) MICRO-OSCILLATION ELEMENT HAVING TWO ROTATIONAL AXES THAT ARE NON-ORTHOGONAL TO EACH OTHER

(75) Inventors: Osamu Tsuboi, Kawasaki (JP); Norinao Kouma, Kawasaki (JP); Hisao Okuda, Kawasaki (JP); Hiromitsu Soneda, Kawasaki (JP); Mi Xiaoyu, Kawasaki (JP); Satoshi Ueda, Kawasaki (JP); Ippei Sawaki, Kawasaki (JP); Yoshitaka Nakamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 10/790,762

(22) Filed: Mar. 3, 2004

(65) Prior Publication Data

US 2005/0035682 A1     Feb. 17, 2005

(30) Foreign Application Priority Data

Aug. 12, 2003  (JP) .............................. 2003-292554
Jan. 6, 2004   (JP) .............................. 2004-001440

(51) Int. Cl.
  *H02N 1/00*   (2006.01)
  *G02B 26/08*  (2006.01)
(52) U.S. Cl. ....................... 310/309; 359/225; 359/291
(58) Field of Classification Search ................ 310/309; 359/223–226, 291, 298, 872
  See application file for complete search history.

(56) References Cited

U.S. PATENT DOCUMENTS 5,543,956 A * 8/1996 Nakagawa et al. ......... 359/225
5,739,941 A * 4/1998 Knipe et al. ................ 359/224
5,969,465 A * 10/1999 Neukermans et al. ....... 310/333
6,423,563 B1    7/2002 Fukada et al. .............. 438/50
6,795,225 B1 * 9/2004 Tsuboi et al. ............... 359/224
2003/0007262 A1 * 1/2003 Tsuboi et al. ............... 359/847
2005/0035682 A1 * 2/2005 Tsuboi et al. ............... 310/309

FOREIGN PATENT DOCUMENTS

| JP | 10-190007   | 7/1998    |
| JP | 10-270714   | 10/1998   |
| JP | 11-203383   | 7/1999    |
| JP | 2000-31502  | 1/2000    |
| JP | 2003-117897 | * 4/2003  |

OTHER PUBLICATIONS

Machine translation of 2003-117897. Seiso et al, Apr. 2003, "Micro Actuator".*

* cited by examiner

*Primary Examiner*—Karl Tamai
(74) *Attorney, Agent, or Firm*—Armstrong, Kratz, Quintos, Hanson & Brooks, LLP.

(57) ABSTRACT

A micro-oscillation element includes a movable main section, a first frame and a second frame, and a first connecting section that connects the movable main section and the first frame and defines a first axis of rotation for a first rotational operation of the movable main section with respect to the first frame. The element further includes a second connecting section that connects the first frame and the second frame and defines a second axis of rotation for a second rotational operation of the first frame and the movable main section with respect to the second frame. A first drive mechanism is provided for generating a driving force for the first rotational operation. A second drive mechanism is provided for generating a driving force for the second rotational operation. The first axis of rotation and the second axis of rotation are not orthogonal.

12 Claims, 42 Drawing Sheets

160  167(165)

167(165)

170  177(175)

177(175)

183(181)

180  187(185)

183(181)

187(185)

193(191)

190  197(195)

193(191)

197(195)

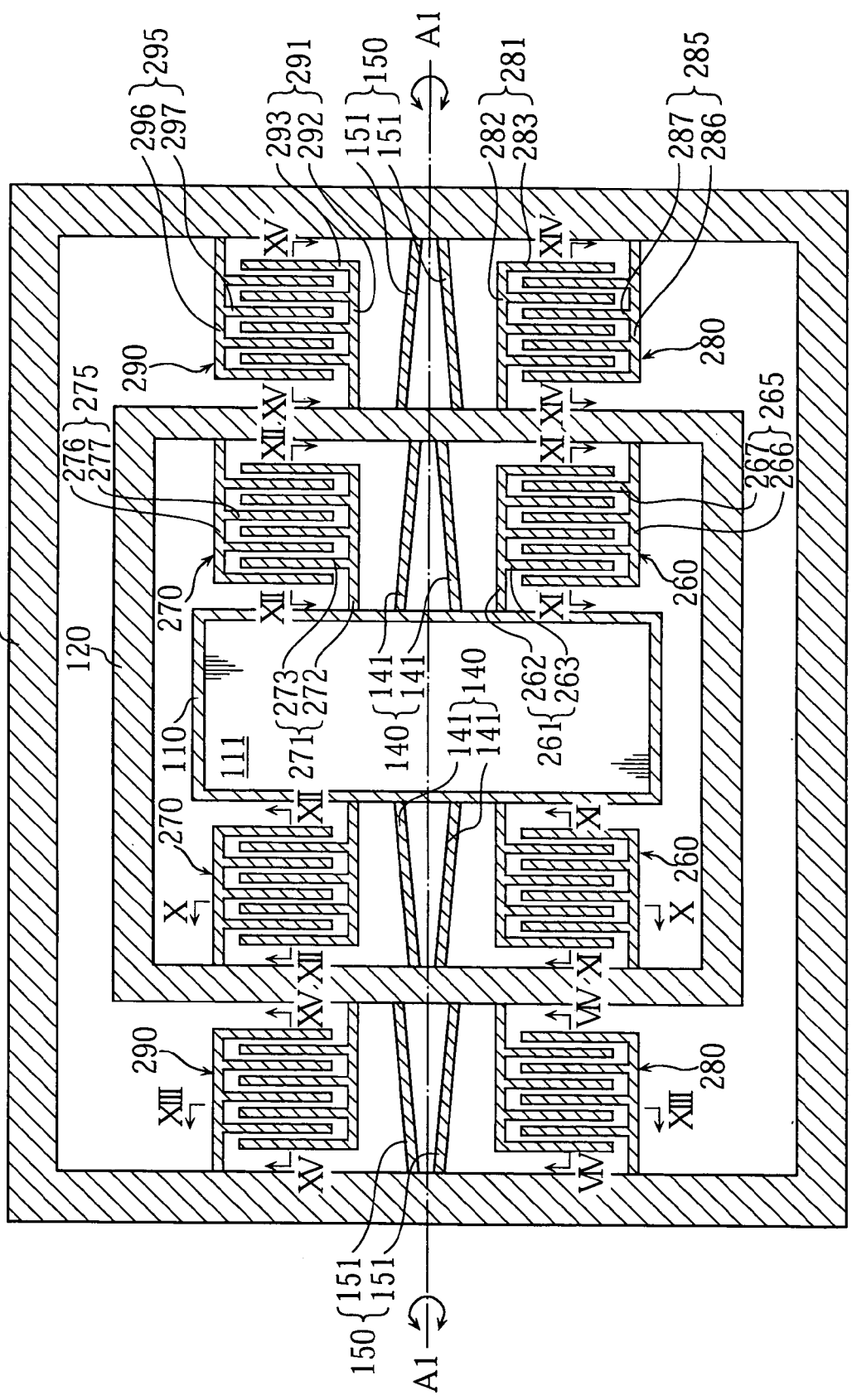

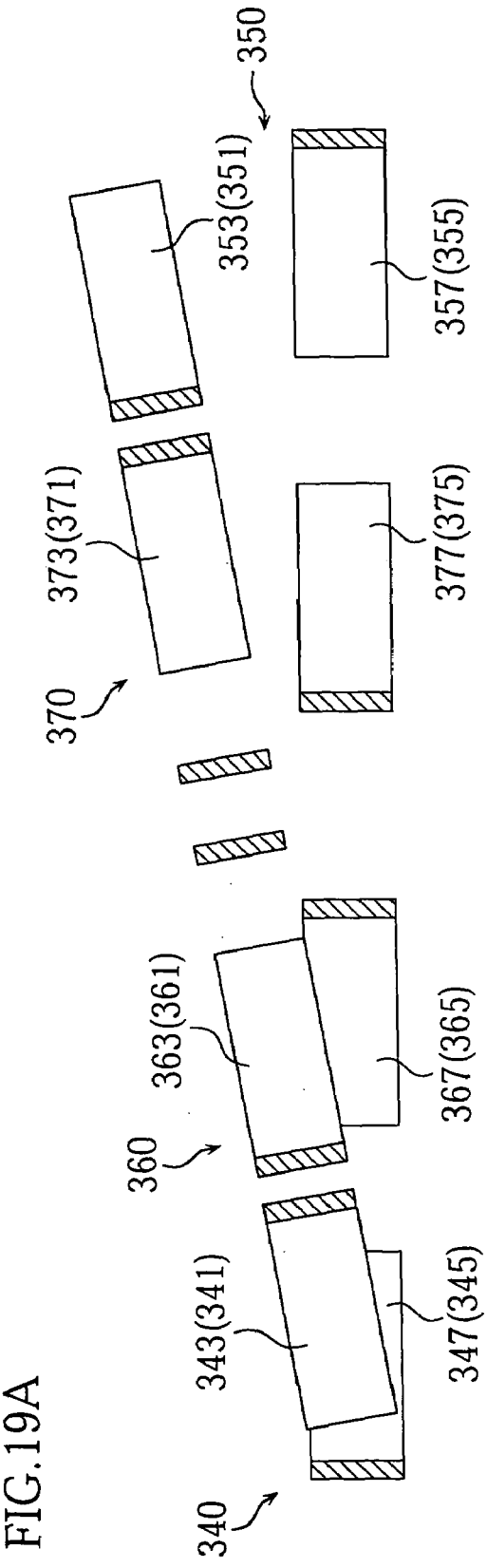
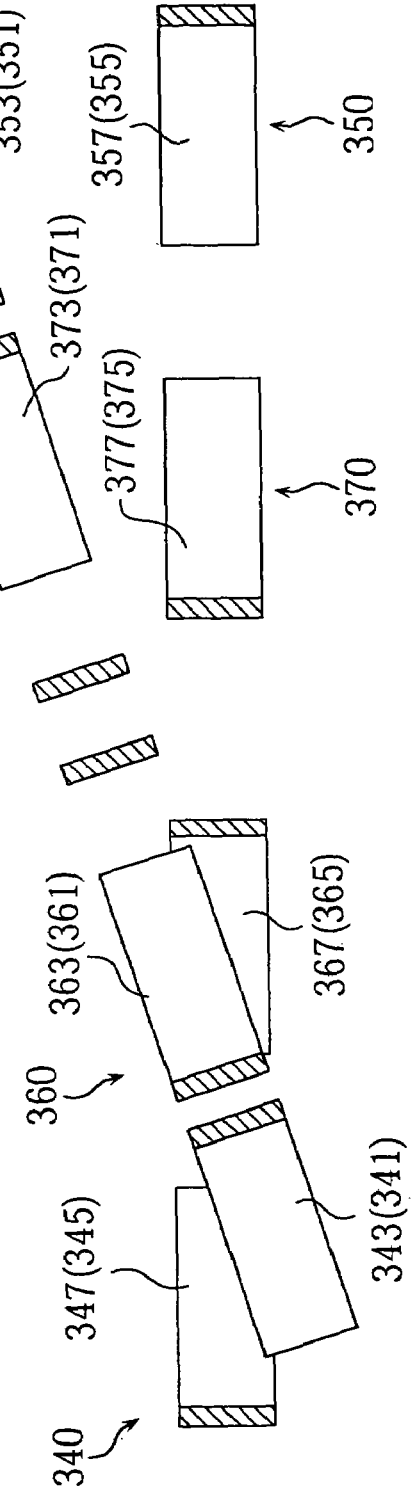
FIG.19A
FIG.19B

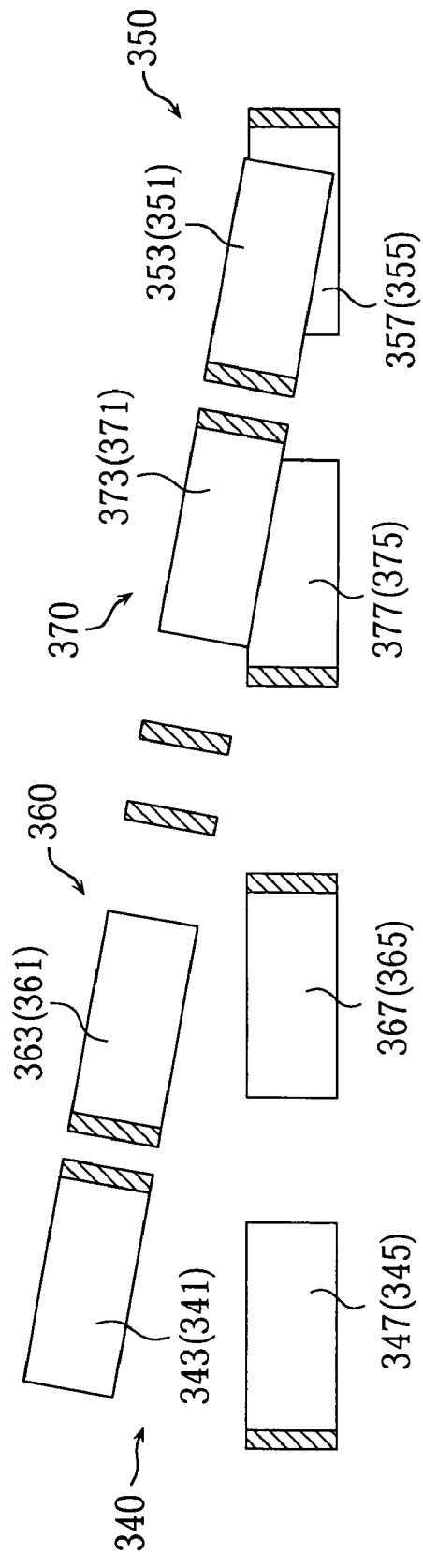
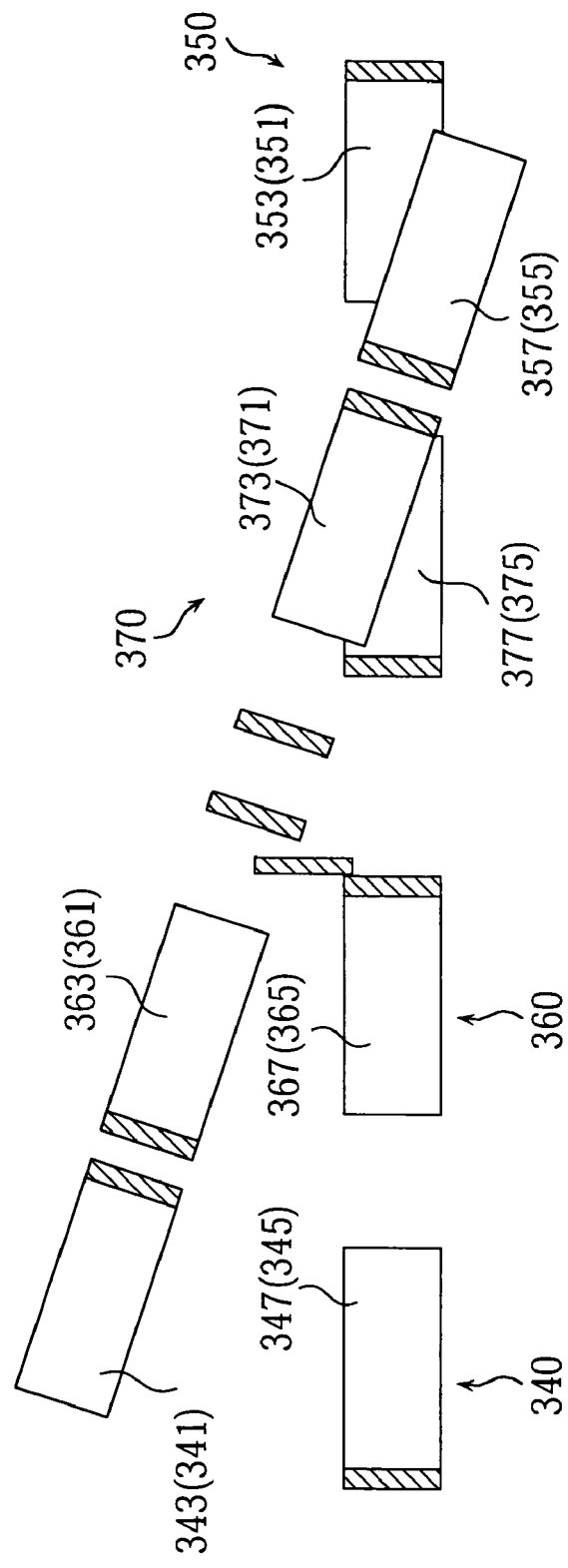

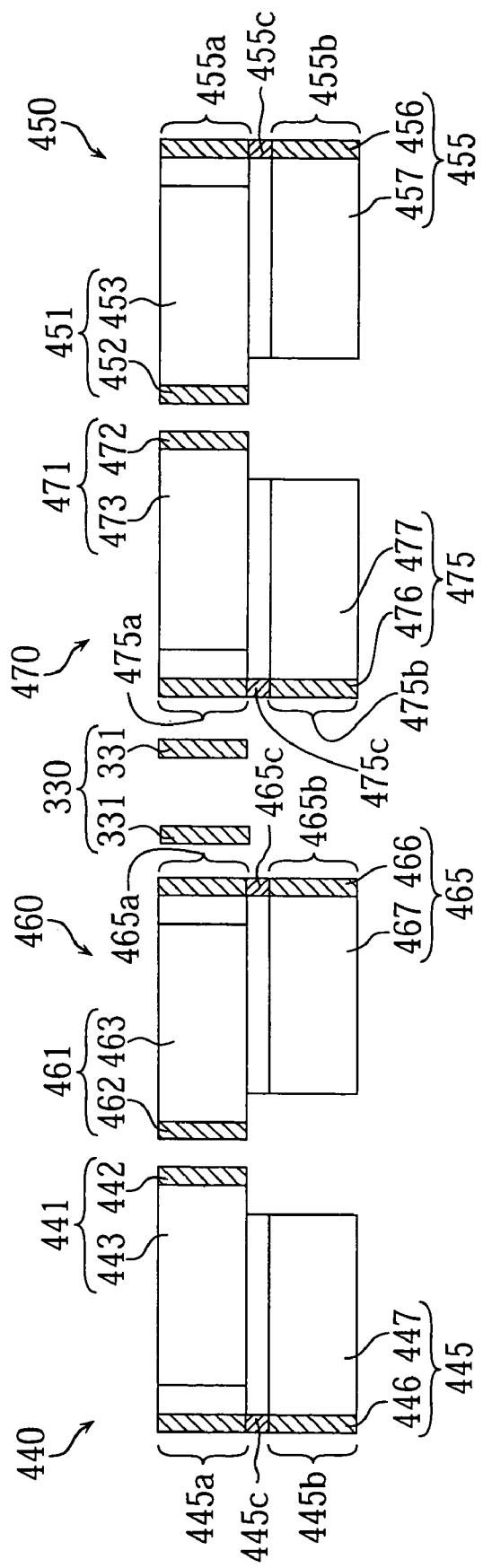

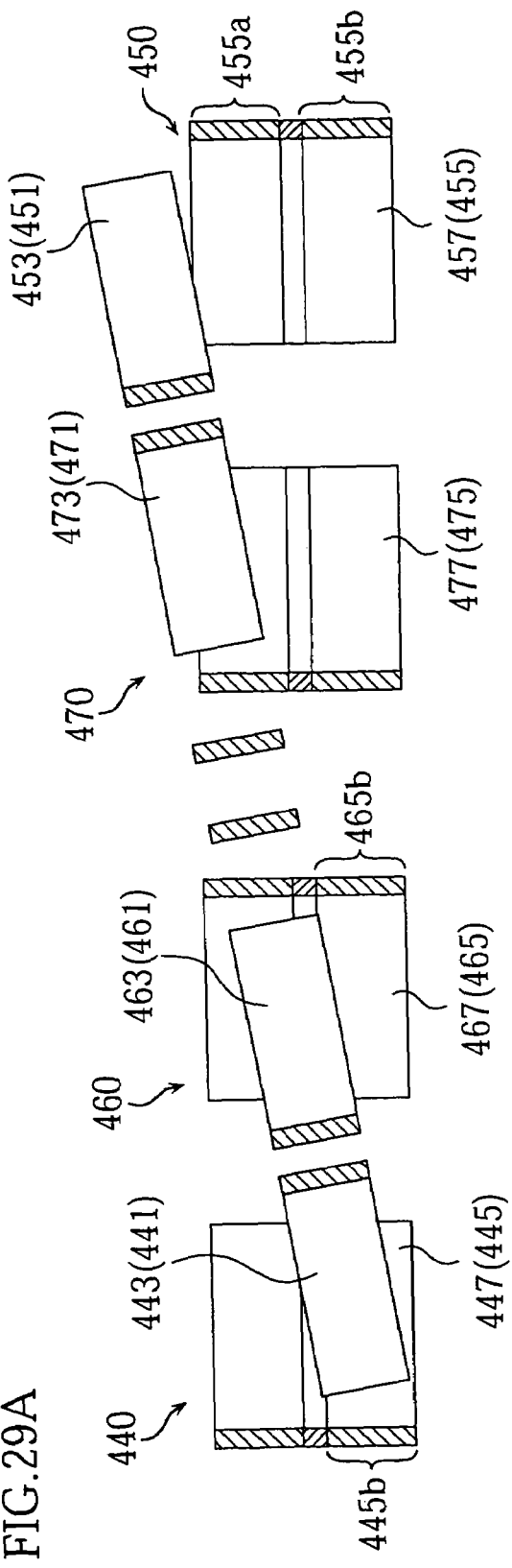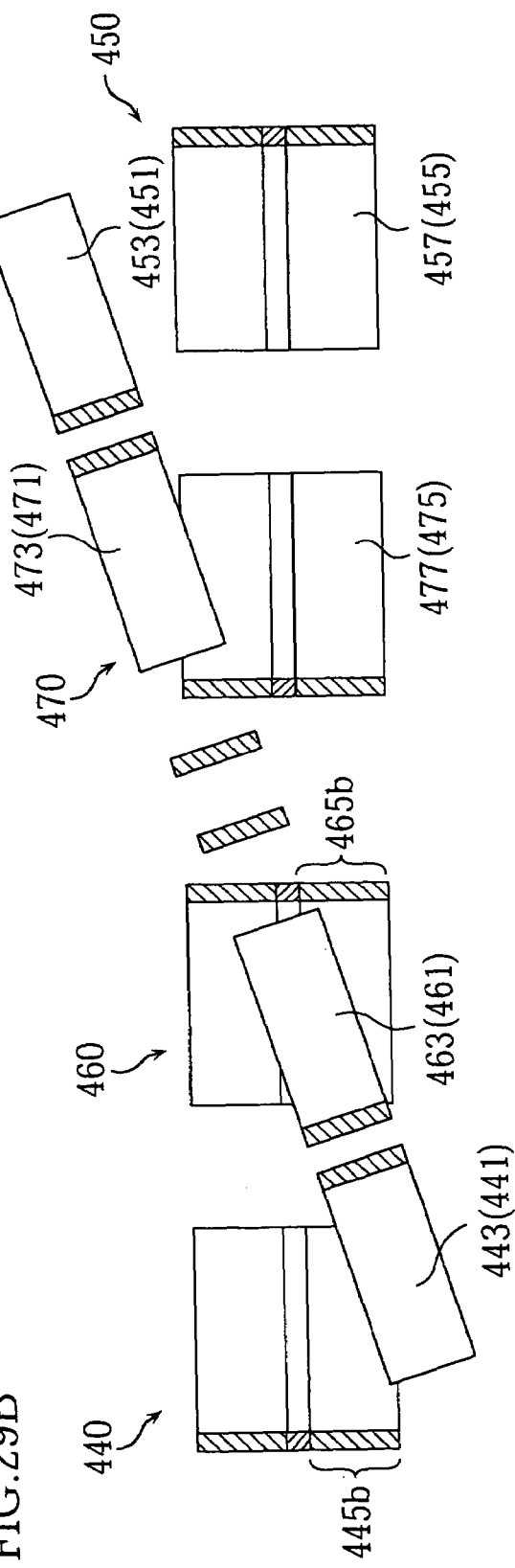
FIG.29A
FIG.29B

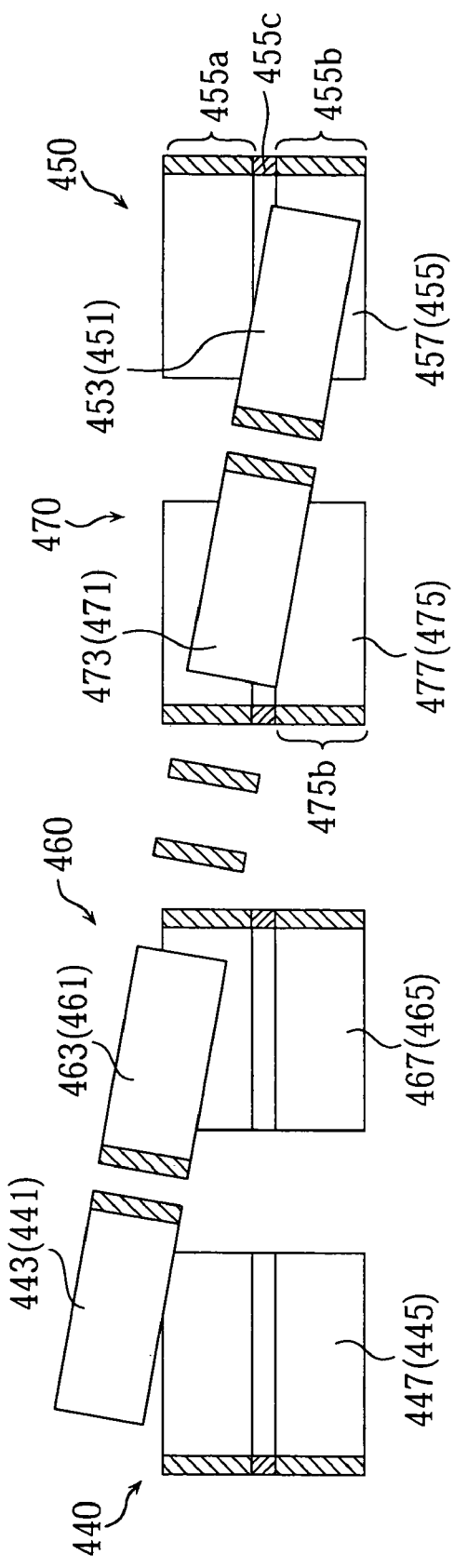

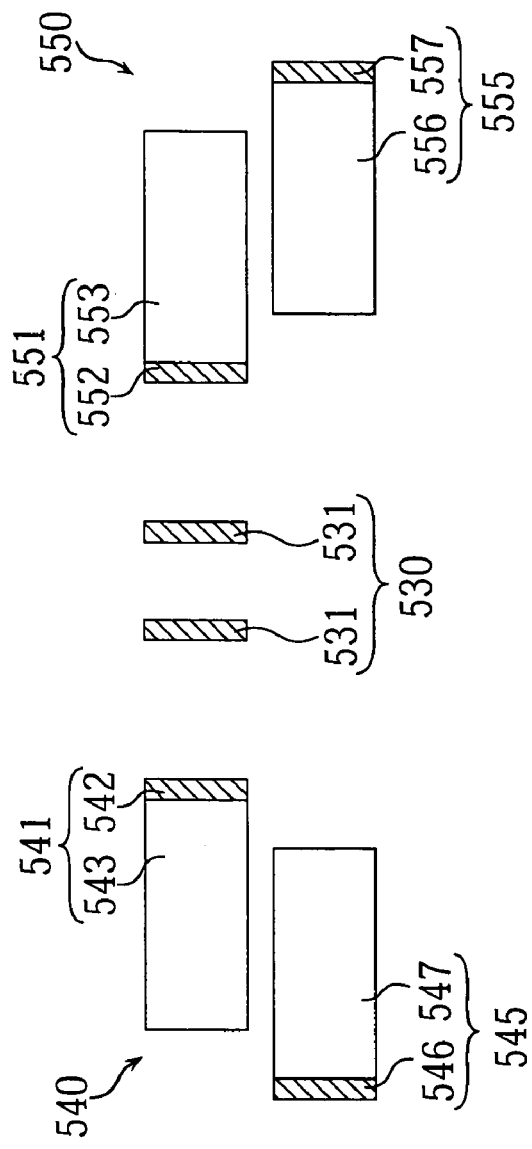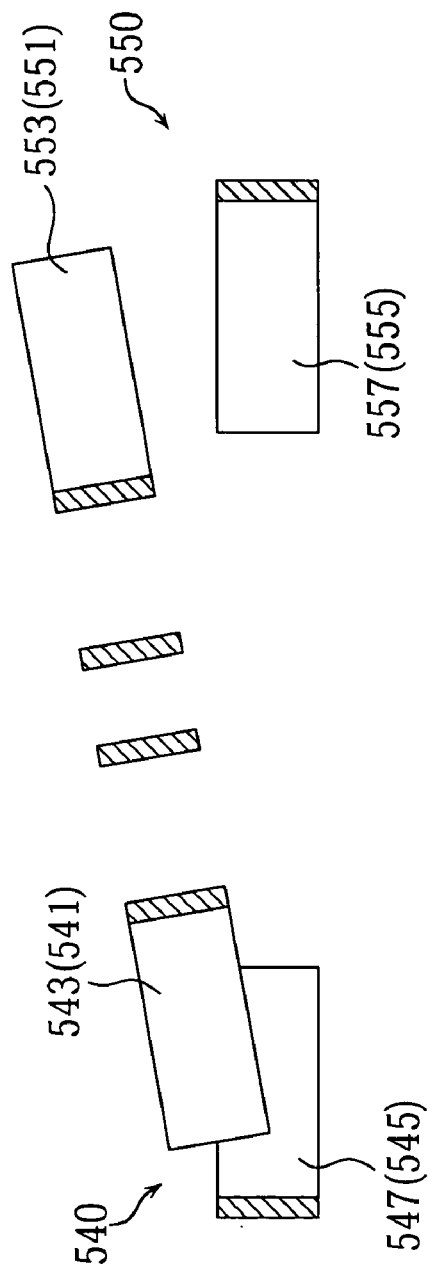
FIG.38A
FIG.38B ns to a micro-oscillation element, such as a micro-mirror element having a movable section capable of rotational displacement, and also relates to a drive method for such a micro-oscillation element.

MICRO-OSCILLATION ELEMENT HAVING TWO ROTATIONAL AXES THAT ARE NON-ORTHOGONAL TO EACH OTHER

BACKGROUND OF THE INVENTION

1. Field of the Invention

The present invention relates to a micro-oscillation element, such as a micro-mirror element having a movable section capable of rotational displacement, and also relates to a drive method for such a micro-oscillation element.

2. Description of the Related Art

In recent years, it has been sought to apply the use of elements having extremely small structures formed by micro-machining technology, in various technological fields. For example, in the field of optical communications technology, attention has focused on very small micro-mirror elements which have a light reflecting function.

In optical communications, an optical signal is transmitted by using an optical fiber as a medium, and furthermore, in general, a so-called optical switching device is used in order to switch the transmission path of the optical signal from one fiber to another fiber. Characteristics required in an optical switching device in order to achieve good optical communications include high capacity, high speed and high reliability, in the switching operation, and the like. From this point of view, expectations have been growing with regard to optical switching devices which incorporate micro-mirror elements fabricated by micro-machining technology. This is because the use of a micro-mirror element makes it possible to carrying out switching processes on the optical signal itself, without having to convert the optical signal to an electrical signal, between the optical transmission path on the input side of the optical switching device and the optical transmission path on the output side thereof, and this means that it is suitable for obtaining the characteristics described above.

A micro-mirror element is provided with a mirror surface for reflecting light, and it is capable of changing the direction in which the light is reflected by oscillation of the mirror surface. Electrostatic drive-type micro-mirror elements which use electrostatic force in order to cause the mirror surface to oscillate are used in many devices. Electrostatic drive-type micro-mirror elements can be divided broadly into two types: micro-mirror elements manufactured by so-called surface micro-machining technology, and micro-mirror elements manufactured by so-called bulk micro-machining technology.

In the case of surface micro-machining technology, a thin layer of material corresponding to a respective constituent area is formed on a substrate and processed into a prescribed pattern, and such patterns are layered in a sequential fashion, whereby respective areas constituting an element, such as a support, mirror surface and electrode section, and the like, are formed, and a sacrificial layer which is subsequently removed is also formed. On the other hand, in the case of bulk micro-machining technology, a support and mirror section, and the like, are formed in a prescribed shape by etching the actual material of the substrate, mirror surfaces and electrodes being formed as thin layers thereon according to requirements. Bulk micro-machining technology is described, for example, in Japanese Patent Laid-Open No. (Hei)10-190007, Japanese Patent Laid-Open No. (Hei)10-270714 and Japanese Patent Laid-Open No. 2000-31502.

One technical feature required in a micro-mirror element is that the mirror surface which performs light reflection has a high degree of flatness. However, in the case of surface micro-machining technology, since the mirror surface ultimately formed is thin, the mirror surface is liable to curve, and consequently, it is difficult to achieve a high degree of flatness in a mirror surface having a large surface area. On the other hand, in the case of bulk micro-machining technology, a mirror section is constituted by cutting into the actual material substrate, which is relatively thick, by means of an etching process, and since a mirror surface is provided on this mirror section, it is possible to ensure rigidity, even if the mirror surface has a large surface area. Consequently, it is possible to form a mirror surface having a sufficiently high degree of optical flatness.

FIG. 43 and FIG. 44 illustrate a conventional electrostatically driven micro-mirror element X8 fabricated by means of bulk micro-machining technology. FIG. 43 is an exploded oblique view of a micro-mirror element X8, and FIG. 44 is a cross-sectional view along line XXXXIV—XXXXIV in FIG. 43 of the micro-mirror element X8 in an assembled state.

The micro-mirror element X8 has a structure in which a mirror substrate 80 and a base substrate 86 are layered on each other. The mirror substrate 80 is constituted by a mirror section 81, a frame 82, and a pair of torsion bars 83 linking same together. By performing etching from one side only on a prescribed material substrate, such as a silicon substrate having electrical conductivity, it is possible to form the outline shape of the mirror section 81, frame 82 and torsion bars 83, on the mirror substrate 80. A mirror surface 84 is provided on the surface of the mirror section 81. A pair of electrodes 85a, 85b are provided on the rear face of the mirror section 81. The pair of torsion bars 83 define an axis A8 for the rotational operation of the mirror section 81, as described hereinafter. An electrode 87a opposing the electrode 85a of the mirror section 81, and an electrode 87b opposing the electrode 85b are provided on the base substrate 86.

In the micro-mirror element X8, when an electric potential is applied to the frame 82 of the mirror section 80, the electric potential is transmitted to the electrode 85a and the electrode 85b, by means of the pair of torsion bars 83 and the mirror section 81, which are formed in an integral fashion from the same conductive material as the frame 82. Consequently, by applying a prescribed electric potential to the frame 82, it is possible to charge the electrodes 85a, 85b, positively, for example. In this state, if the electrode 87a of the base substrate 86 is charged with a negative charge, then an electrostatic attraction is generated between the electrode 85a and the electrode 87a, and hence the mirror section 81 rotates in the direction of the arrow M8, as indicated in FIG. 44, whilst twisting the pair of torsion bars 83. The mirror section 81 is able to swing until it reaches an angle at which the force of attraction between the electrodes balances with the sum of the twisting resistances of the respective torsion bars 83. Alternatively, if a negative charge is applied to the electrode 87b whilst a positive charge is being applied to the electrodes 85a, 85b of the mirror section 81, then an electrostatic attraction is generated between the electrode 85b and the electrode 87b, and hence the mirror section 81 will rotate in the opposite direction to the arrow M8. By driving the mirror section 81 to swing as described above, it is possible to switch the direction of reflection of the light reflected by the mirror surface 84.

In the micro-mirror element X8, in order to attain a large angle in the rotational displacement of the mirror section 81, it is necessary to ensure a sufficient gap between the mirror substrate 80 and the base substrate 86, in order to avoid mechanical contact between the mirror substrate 80 and base substrate 86. However, since the electrostatic force generated between the electrodes 85*a* and 87*a*, or between the electrodes 85*b* and 87*b*, tends to decline as the distance between the electrodes increases, the drive voltage that is to be applied between the respective electrodes must be increased to a corresponding degree, in order that the mirror section 81 can be driven suitably, whilst guaranteeing a sufficient gap between the mirror substrate 80 and the base substrate 86. In many cases, increasing the drive voltage is undesirable, in terms of the composition of the element, or from the viewpoint of reducing power consumption.

FIG. 45 is a partially abbreviated oblique diagram of a further conventional micro-mirror element X9, which is fabricated by means of bulk micro-machining technology. The micro-mirror element X9 has a mirror section 91 provided with a mirror surface 94 on the upper surface thereof, a frame 92 (partially omitted), and a pair of torsion bars 93 for linking same together. Comb tooth-shaped electrodes 91*a*, 91*b* are formed at the two respective end portions of the mirror section 91. A pair of comb tooth-shaped electrodes 92*a*, 92*b* are formed in the frame 92, extending in an inward direction in positions corresponding to the comb tooth-shaped electrodes 91*a*, 91*b*. A pair of torsion bars 93 define an axis A9 for the rotational operation of the mirror section 91 with respect to the frame 92.

In a micro-mirror element X9 having a composition of this kind, the set of comb tooth-shaped electrodes provided in adjacent positions in order to generate an electrostatic force, for example, the comb tooth-shaped electrode 91*a* and the comb tooth-shaped electrode 92*a*, are oriented in a two-tier fashion as illustrated in FIG. 46A, when no voltage is applied to same. On the other hand, when a prescribed voltage is applied, as illustrated in FIG. 46B, the comb tooth-shaped electrode 91*a* is drawn inside the comb tooth-shaped electrode 92*a*, thereby causing the mirror section 91 to rotate. More specifically, for example, if the comb tooth-shaped electrode 91*a* is charged with a positive charge, and the comb tooth-shaped electrode 92*a* is charged with a negative charge, then the mirror section 91 will rotate about the axis A9, whilst twisting the pair of torsion bars 93. By driving the mirror section 91 to swing in this fashion, it is possible to switch the direction of reflection of the light reflected by the mirror surface 94 provided on the mirror section 91. It is known that the drive voltage required in order to drive a pair of comb tooth-shaped electrodes of this kind tends to be lower than the drive voltage required to achieve driving of a pair of planar electrodes, as in the micro-mirror element X8 described above.

FIG. 47 shows a method for manufacturing a micro-mirror element X9. In FIG. 47, the process of forming a portion of the mirror section 91 shown in FIG. 45, and the frame 92, torsion bars 93 and a portion of the set of comb tooth-shaped electrodes 91*a*, 92*a*, is illustrated by the changes in a particular cross-section. The cross-section represents a continuous cross-section which is modeled on a plurality of cross-sections that are contained within the section in which a single micro-switching element is formed on a material substrate (wafer) that is subjected to various processes.

In the method of manufacturing a micro-mirror element X9, firstly, a wafer S9 is prepared as illustrated in FIG. 47A. The wafer S9 is a so-called SOI (Silicon on Insulator) wafer, which has a laminated structure comprising a silicon layer 901, a silicon layer 902 and an insulating layer 903 interposed between these layers. Next, by carrying out anisotropic etching via a prescribed mask on the silicon layer 901, as illustrated in FIG. 47B, the constituent parts that are to be formed in the silicon layer 901 (the mirror section 91, a portion of the frame 92, the torsion bars 93, and the comb tooth-shaped electrode 91*a*) are formed. Next, by carrying out anisotropic etching via a prescribed mask on the silicon layer 902, as illustrated in FIG. 47C, the constituent parts that are to be formed in the silicon layer 902 (a portion of the frame 92, and the comb tooth-shaped electrode 92*a*) are formed. Subsequently, as illustrated in FIG. 47D, the exposed portion on the silicon layer 903 is removed by carrying out isotropic etching on the insulating layer 903. In this way, the mirror section 91, frame 92, torsion bars 93, and the set of comb tooth-shaped electrodes 91*a*, 92*a*, are formed. The other set of comb tooth-shaped electrodes 91*b*, 92*b* are formed in a similar manner to the comb tooth-shaped electrodes 91*a*, 91*b*.

In the micro-mirror element X9, since the comb tooth-shaped electrodes 91*a*, 91*b* are displaced in accordance with the rotational operation of the mirror section 91, the comb tooth-shaped electrodes 91*a*, 91*b* must have sufficient thickness corresponding to the prescribed angle of inclination of the mirror section 91. Therefore, in order to achieve a large angle in the rotational displacement of the mirror section 91 of the micro-mirror element X9, it is necessary to design the comb tooth-shaped electrodes 91*a*, 91*b* to be long in the direction of rotational operation, thus ensuring a sufficient length for the stroke of the drive electrodes (the stroke being the range of relative movement of the electrode pair in the direction of the rotational operation which is tolerable whilst still being able to generate a suitable driving force). In order to ensure a long stroke, in the aforementioned method of manufacture, it is necessary to carry out processing on a material substrate S9 having silicon layers 901, 902 of a thickness which corresponds to the required stroke length. However, it tends to be difficult to form comb tooth-shaped electrodes 91*a*, 91*b* wherein each electrode tooth has a relatively small width, to a high degree of accuracy, by carrying out etching processes, or the like, on relatively thick silicon layers 901, 902.

In addition, in the micro-mirror element X9, since the mirror section 91 is formed to the same thickness as the comb tooth-shaped electrodes 91*a*, 91*b*, then the formation of comb tooth-shaped electrodes 91*a*, 91*b* which are long in the direction of rotational operation inevitably leads to the formation of a thick mirror section 91. The thicker the mirror section 91, the greater the mass of the mirror section 91 and hence, the greater the inertia thereof. Consequently, cases have occurred in which it is not possible to achieve the desired speed in driving the rotational operation of the mirror section 91.

In this way, in a conventional micro-mirror element X9, it has been problematic to achieve rotational operation of the mirror section 91 involving a large amount of rotational displacement, at a high speed of operation.

SUMMARY OF THE INVENTION

The present invention has been proposed under the circumstances described above. It is therefore an object of the present invention to provide a micro-oscillation element and a method for driving micro-oscillation element suitable for achieving rotational operation of a movable section involving a large rotational displacement, at a high speed of operation.

A micro-oscillation element is proposed by a first aspect of the present invention. This micro-oscillation element comprises: a movable main section; a first and second frame; a first connecting section that connects the movable main section and the first frame and defines a first axis of rotation for a first rotational operation of the movable main section with respect to the first frame; a second connecting section that connects the first frame and the second frame and defines a second axus of rotation for a second rotational operation of the first frame and the movable main section with respect to the second frame; a first drive mechanism for generating a driving force for the first rotational operation; and a second drive mechanism for generating a driving force for the second rotational operation. In the present element, the first axis of rotation and the second axis of rotation are not orthogonal. The first drive mechanism is, for example, constituted by a set of comb tooth-shaped electrodes, in which case one of the comb tooth-shaped electrodes is provided in an integral fashion with respect to the movable main section, and the other comb tooth-shaped electrode is provided in an integral fashion with respect to the first frame. Moreover, the second drive mechanism is, for example, constituted by a set of comb tooth-shaped electrodes, in which case one of the comb tooth-shaped electrodes is provided in an integral fashion with respect to the first frame, and the other comb tooth-shaped electrode is provided in an integral fashion with respect to the second frame.

In the micro-oscillation element having a composition of this kind, the first rotational operation and the second rotational operation of the movable main section include common components of displacement. In other words, the overall amount of displacement in these common displacement components corresponds to the sum of the amount of displacement originating from the first rotational operation and the amount of displacement originating from the second rotational operation. Therefore, in the common displacement components, the respective strokes of the first and second drive mechanisms are applied in a mutually overlapping fashion, and hence a long stroke can be ensured. For example, if the first axis of rotation and the second axis of rotation are mutually coinciding, then the displacement component of the first rotational operation and the displacement component of the second rotational operation will coincides entirely, and the total amount of rotational displacement of the movable main section will correspond to the sum of the amount of displacement of the first rotational operation and the amount of displacement of the second rotational operation, as a result of which, a stroke that is effectively longer than the respective strokes of the first and second drive mechanisms is ensured in the rotational displacement of the movable main section. Since an effectively long stroke is ensured by superimposition of the strokes of two types of drive mechanisms, then it is possible to form the respective drive mechanisms that consist of sets of comb tooth-shaped electrodes, for example, to a relatively thin size (to a relatively short length in the direction of rotational operation). Therefore, the movable section (the movable main section and the first frame) which tends to be formed to a thickness that reflects the thickness of the drive mechanisms, can be formed to a relatively thin size. The thinner the movable section, the lighter the weight thereof, and hence the more suitable it is for achieving high speeds of operation. In this way, the micro-oscillation element according to the first aspect of the present invention is suitable for achieving high operating speeds for rotational operations of the movable main section involving large amounts of rotational displacement.

In the first aspect of the present invention, preferably, the first connecting section has a cavity section that becomes wider as approaching the movable main section. In addition to this, or instead of this, the second connecting section may have a cavity section that becomes wider as approaching the first frame. A composition of this kind is suitable for reducing unwanted displacement components in a direction perpendicular to the desired rotational displacement, for example.

A further micro-oscillation element is proposed by a second aspect of the present invention. This micro-oscillation element comprises: a movable section; frame; a connecting section that connects the movable section and the frame and defines an axis of rotation for a rotational operation of the movable section with respect to the frame; a first drive mechanism for generating a driving force for the rotational operation at a point relatively distant from the axis of rotation; and a second drive mechanism for generating a driving force for the rotational operation at a point relatively close to the axis of rotation. The first drive mechanism is, for example, constituted by a set of comb tooth-shaped electrodes, in which case one of the comb tooth-shaped electrodes is provided in an integral fashion with respect to the movable section, and the other comb tooth-shaped electrode is provided in an integral fashion with respect to the frame. Furthermore, the second drive mechanism is, for example, constituted by a set of comb tooth-shaped electrodes, in which case one of the comb tooth-shaped electrodes is provided in an integral fashion with respect to the movable section, and the other comb tooth-shaped electrode is provided in an integral fashion with respect to the frame.

In a micro-oscillation element having a composition of this kind, the first drive mechanism is more suitable than the second drive mechanism for generating a larger rotational torque to act as a driving force for rotational operation of the movable section, and the second drive mechanism is more suitable than the first drive mechanism for ensuring a longer stroke. In the micro-oscillation element according to the second aspect of the present invention, it is possible to achieve good rotational operation of the movable section, by making effective use of these respective characteristics of the two types of drive mechanisms. For example, when the amount of displacement of the movable section is within a small angular range, then a large rotational torque can be generated principally by means of the first drive mechanism, whereas if it is within a larger angular range, then a prescribed rotational torque can be sustained by means of the second drive mechanism, throughout the relatively longer stroke of the second drive mechanism. In a micro-oscillation element equipped with both a drive mechanism that is suitable for generating a large rotational torque and a drive mechanism that is suitable for ensuring a large stroke, it is possible to ensure an effectively large stroke even without forming the respective comb tooth-shaped electrodes of the respective drive mechanisms to an excessively thick size. Therefore, the micro-oscillation element according to the second aspect of the present invention is suitable for achieving high operating speeds for rotational operations of the movable section involving large amounts of rotational displacement.

In the first and second aspects of the present invention, preferably, the first drive mechanism and the second drive mechanism are constituted such that they can be operated under common control. In this case, preferably, the first drive mechanism and the second drive mechanism are connected electrically in parallel. Preferably, the first drive mechanism and the second drive mechanism are, alternatively, separated electrically, being constituted such that they can be operated under mutually independent control.

A further micro-oscillation element is proposed by a third aspect of the present invention. This micro-oscillation element comprises: a movable section; a frame; a connecting section that connects the movable section and the frame and defines an axis of rotation for a rotational operation of the movable section with respect to the frame; and a drive mechanism for generating a driving force for rotational operation over points that change in distance from the axis of rotation continuously. The drive mechanism is, for example, constituted by a set of comb tooth-shaped electrodes, in which case one of the comb tooth-shaped electrodes is provided in an integral fashion with respect to the movable section, and the other comb tooth-shaped electrode is provided in an integral fashion with respect to the frame.

In a micro-oscillation element having a composition of this kind, the first and second drive mechanisms of the second aspect of the invention are comprised within a single drive mechanism. Therefore, according to the third aspect of the present invention, similar beneficial effects to those described above with respect to the second aspect of the invention are achieved. In addition, according to the third aspect of the present invention, the rotational torque generated in a single drive mechanism tends to change gradually and continuously throughout the range of prescribed rotational operation. This characteristic is suitable for achieving good rotational operation of the movable section.

A further micro-oscillation element is proposed by a fourth aspect of the present invention. This micro-oscillation element comprises: a movable section, a frame, a connecting section that connects the movable section and the frame and defines an axis of rotation for the rotational operation of the movable section with respect to the frame, and a drive mechanism comprising a first comb tooth-shaped electrode and a second comb tooth-shaped electrode for generating a driving force for rotational operation. The first comb tooth-shaped electrode and/or the second comb tooth-shaped electrode have electrode teeth comprising a first conductor section and second conductor section that are electrically separated and aligned in parallel with the direction of rotational operation. For example, the first comb tooth-shaped electrode is provided in an integral fashion with respect to the movable section, and the second comb tooth-shaped electrode is provided in an integral fashion with respect to the frame.

In this element, the first conductor section and second conductor section of the first comb tooth-shaped electrode and/or the second comb tooth-shaped electrode are aligned in parallel with the direction of rotational operation of the movable section. A composition of this kind is suitable for ensuring a large relatively range of movement, in other words a large stroke, for the pair of comb tooth-shaped electrodes. Moreover, the first conductor section and the second conductor section included in a single comb tooth-shaped electrode are electrically separated from each other and hence the voltages applied to same may be controlled in an independent fashion. The present swinging element having a first and second conductor section of this kind in at least one of the pair of comb tooth-shaped electrodes is suitable for achieving high operating speeds for rotational operation of the movable section involving large amounts of rotational displacement.

A further micro-oscillation element is proposed by a fifth aspect of the present invention. This micro-oscillation element comprises: a movable section, a frame, a connecting section that connects the movable section and the frame and defines an axis of rotation for the rotational operation of the movable section with respect to the frame, and a drive mechanism comprising a first comb tooth-shaped electrode and a second comb tooth-shaped electrode for generating a driving force for rotational operation. The first comb tooth-shaped electrode has electrode teeth comprising a first conductor section and second conductor section that are electrically connected and aligned in parallel with the direction of rotational operation. The second comb tooth-shaped electrode has electrode teeth comprising a third conductor section that opposes the first conductor section and does not oppose the second conductor section when the element is not driven. For example, the second comb tooth-shaped electrode is provided in an integral fashion with respect to the movable section, and the first comb tooth-shaped electrode is provided in an integral fashion with respect to the frame.

In this element, the first conductor section and the second conductor section of the first comb tooth-shaped electrode which generate an electrostatic attraction with respect to the third conductor section in the second comb tooth-shaped electrode are aligned in parallel with the direction of rotational operation of the movable section. A composition of this kind is suitable for ensuring a large relatively range of movement, in other words, a large stroke, for the pair of comb tooth-shaped electrodes. Moreover, if the second comb tooth-shaped electrode (third conductor section) is provided in an integral fashion with respect to the frame, and the first comb tooth-shaped electrode is provided in an integral fashion with respect to the movable section, then the second comb tooth-shaped electrode (third conductor section) can be formed to a relatively thin size (relatively short dimension in the direction of rotational operation), and hence the movable section, which tends to be formed to a thickness that reflects the thickness of the second comb tooth-shaped electrode (third conductor section) can also be formed to a relatively thin size. The thinner the movable section, the lighter the weight thereof, and hence the more suitable it is for achieving high speeds of operation. In this way, the present micro-oscillation element having a pair of comb tooth-shaped electrodes of this kind is suitable for achieving high operating speeds for rotational operation of the movable section involving large amounts of rotational displacement.

In the fifth aspect of the present invention, preferably, the first conductor section and third conductor section are of different lengths in the direction of rotational operation.

In the first to fifth aspects of the present invention, preferably, at least one of the sets of comb tooth-shaped electrodes constituting the comb tooth-shaped electrodes has a base section, and electrode teeth extending from this base section, these electrode teeth having regions which increase gradually in width or thickness towards the end of the base section side. Alternatively, preferably, at least one of the sets of comb tooth-shaped electrodes constituting the comb tooth-shaped electrodes comprise a base section and electrode teeth extending from this base section, the electrode teeth having regions which increase gradually in width as approaching the other comb tooth-shaped electrode.

In the second to fifth aspects of the present invention, preferably, the connecting section has a cavity section that becomes wider as approaching the movable section. A composition of this kind is suitable for reducing unwanted displacement components in a direction perpendicular to the desired rotational displacement, for example.

A method for driving a micro-oscillation element is proposed by a sixth aspect of the present invention. The micro-oscillation element driven by this method comprises: a movable section, a frame, a connecting section that connects the movable section and the frame and defines an axis of rotation for the rotational operation of the movable section with respect to the frame, and a first comb tooth-shaped electrode and a second comb tooth-shaped electrode for generating a driving force for rotational operation. Te first comb tooth-shaped electrode has electrode teeth comprising a first conductor section and a second conductor section aligned in parallel with the direction of rotational operation. The first comb tooth-shaped electrode of this kind is provided in an integral fashion with respect to the frame, for example. The second comb tooth-shaped electrode has electrode teeth comprising a third conductor section that opposes the first conductor section and does not oppose the second conductor section when the element is not driven. The second comb tooth-shaped electrode of this kind is provided in an integral fashion with respect to the movable section, for example. The present method comprises: a first step for causing the movable section to perform rotational operation in a first direction by generating an electrostatic attraction between the second conductor section and the third conductor section, and a second step for causing the movable section to perform rotational operation in a second direction, opposite to the first direction, by generating an electrostatic attraction between the first conductor section and the third conductor section, subsequently to the first step.

In this method, the first conductor section and the second conductor section of the first comb tooth-shaped electrode which generate an electrostatic attraction with respect to the third conductor section in the second comb tooth-shaped electrode are aligned in parallel with the direction of rotational operation of the movable section. Therefore, this method is suitable for ensuring a large relatively range of movement, in other words, a large stroke, for the pair of comb tooth-shaped electrodes. Moreover, in the first and second comb tooth-shaped electrodes in the present method, as well as generating a driving force for rotational operation in a first direction, a driving force is also generated for rotational operation in a second direction, opposite to the first direction. The present method for generating a driving force in two directions by means of a set of comb tooth-shaped electrodes is suitable for achieving high operating speeds in rotational operation in both directions. In this way, the driving method according to the sixth aspect of the present invention is suitable for achieving high operating speeds for rotational operation involving large amounts of rotational displacement. What is more, according to the present method, it is possible to drive a micro-oscillation element according to the fourth aspect of the present invention, for example, in a suitable manner.

In the sixth aspect of the present invention, preferably, the micro-oscillation element being driven further comprises: a third comb tooth-shaped electrode and a fourth comb tooth-shaped electrode for generating a driving force for rotational operation. The third comb tooth-shaped electrode has electrode teeth comprising a fourth conductor section and a fifth conductor section aligned in parallel with the direction of rotational operation. The third comb tooth-shaped electrode of this kind is provided in an integral fashion with respect to the frame, for example. The third comb tooth-shaped electrode and the first comb tooth-shaped electrode described previously are disposed in a symmetrical fashion, for example, with respect to the axis of rotation of the movable section. Moreover, the fourth comb tooth-shaped electrode has electrode teeth comprising a sixth conductor section that opposes the fourth conductor section and does not oppose the fifth conductor section when the element is not driven. The fourth comb tooth-shaped electrode of this kind is provided in an integral fashion with respect to the movable section, for example. The fourth comb tooth-shaped electrode and the second comb tooth-shaped electrode described previously are disposed in a symmetrical fashion, for example, with respect to the axis of rotation of the movable section. If the micro-oscillation element has a composition of this kind, then preferably, the driving method according to the sixth aspect further comprises a third step for causing the movable section to perform rotational operation in a second direction by generating an electrostatic attraction between the fifth conductor section and the sixth conductor section, subsequently to the second step, and a fourth step for causing the movable section to perform rotational operation in a first direction by generating an electrostatic attraction between the fourth conductor section and the sixth conductor section, subsequently to the third step.

In the sixth aspect of the present invention, preferably, in the second step, an electrostatic attraction is generated between the fourth conductor section and the sixth conductor section. Preferably, in the fourth step, an electrostatic attraction is generated between the first conductor section and the third conductor section. Moreover, preferably, the first, second, third and fourth steps are respectively implemented during time periods corresponding to one quarter of a cycle of the rotational operation.

A further micro-oscillation element is proposed by a seventh aspect of the present invention. The micro-oscillation element driven by the present method comprises: a movable section, a frame, a connecting section that connects the movable section and the frame and defines an axis of rotation for the rotational operation of the movable section with respect to the frame, a first comb tooth-shaped electrode and a second comb tooth-shaped electrode for generating a driving force for rotational operation, and a third comb tooth-shaped electrode and a fourth comb tooth-shaped electrode for generating a driving force for rotational operation at a position closer to the axis of rotation than the first and second comb tooth-shaped electrodes. The first and third comb tooth-shaped electrodes are provided in an integral fashion with respect to the frame, for example. The second and fourth comb tooth-shaped electrodes are provided in an integral fashion with respect to the movable section, for example. The present method comprises: a first step for causing the movable section to perform rotational operation in a first direction by generating an electrostatic attraction between the first comb tooth-shaped electrode and the second comb tooth-shaped electrode, as well as generating an electrostatic attraction between the third comb tooth-shaped electrode and the fourth comb tooth-shaped electrode, and a second step for causing the movable section to perform rotational operation in the first direction by generating an electrostatic attraction between the third comb tooth-shaped electrode and the fourth comb tooth-shaped electrode, subsequently to the first step.

According to the present method, it is possible to drive the micro-oscillation element according to the second aspect of the present invention, in a suitable manner, and hence high operating speeds can be achieved in rotational operation involving large amounts of rotational displacement.

Preferably, the driving method according to the seventh aspect of the present invention further comprises a third step for causing the movable section to rotate in a second direction, opposite to the first direction, by generating an electrostatic attraction between the first conductor section and the second conductor section, subsequently to the second step. Preferably, the first step and the third step are both implemented during a time period corresponding to one quarter of a cycle of the rotational operation.

Preferably, in the seventh aspect of the present invention, the micro-oscillation element further comprises a fifth comb tooth-shaped electrode and a sixth comb tooth-shaped electrode for generating a driving force for rotational operation, and a seventh comb tooth-shaped electrode and eighth comb tooth-shaped electrode for generating a driving force for rotational operation at a position closer to the axis of rotation than the fifth and sixth comb tooth-shaped electrodes. The fifth and seventh comb tooth-shaped electrodes are provided in an integral fashion with respect to the frame, for example. The sixth and eighth comb tooth-shaped electrodes are provided in an integral fashion with respect to the movable section, for example. Moreover, the fifth comb tooth-shaped electrode and the first comb tooth-shaped electrode described previously, the sixth comb tooth-shaped electrode and the second comb tooth-shaped electrode described previously, the seventh comb tooth-shaped electrode and the third comb tooth-shaped electrode described previously, and the eighth comb tooth-shaped electrode and the fourth comb tooth-shaped electrode described previously are respectively disposed in a symmetrical fashion, for example, with respect to the axis of rotation of the movable section. If the micro-oscillation element has a composition of this kind, then preferably, the driving method according to the seventh aspect of the present invention further comprises: a fourth step for causing the movable section to perform rotational operation in a second direction by generating an electrostatic attraction between the fifth comb tooth-shaped electrode and the sixth comb tooth-shaped electrode, as well as generating an electrostatic attraction between the seventh comb tooth-shaped electrode and the eighth comb tooth-shaped electrode, subsequently to the third step, and a fifth step for causing the movable section to perform rotational operation in a second direction by generating an electrostatic attraction, following the fourth step, between the seventh comb tooth-shaped electrode and the eighth comb tooth-shaped electrode.

Preferably, the driving method according to the seventh aspect of the present invention further comprises a sixth step for causing the movable section to rotate in the first direction by generating an electrostatic attraction between the fifth comb tooth-shaped electrode and the sixth comb tooth-shaped electrode, subsequently to the fifth step. Preferably, the fifth step and the sixth step are both implemented during a time period corresponding to one quarter of a cycle of the rotational operation.

A further method for driving a micro-oscillation element is proposed by an eighth aspect of the present invention. The micro-oscillation element driven by the present method comprises: a movable section, a frame, a connecting section that connects the movable section and the frame and defines an axis of rotation for the rotational operation of the movable section with respect to the frame, a first comb tooth-shaped electrode and a second comb tooth-shaped electrode for generating a driving force for rotational operation, and a third comb tooth-shaped electrode and a fourth comb tooth-shaped electrode for generating a driving force for rotational operation at a position closer to the axis of rotation than the first and second comb tooth-shaped electrodes. The first comb tooth-shaped electrode has electrode teeth comprising a first conductor section and a second conductor section aligned in parallel with the direction of rotational operation. The second comb tooth-shaped electrode has electrode teeth comprising a third conductor section that opposes the first conductor section and does not oppose the second conductor section when the element is not driven. The third comb tooth-shaped electrode has electrode teeth comprising a fourth conductor section and a fifth conductor section aligned in parallel with the direction of rotational operation. The fourth comb tooth-shaped electrode has electrode teeth comprising a sixth conductor section that opposes the fourth conductor section and does not oppose the fifth conductor section when the element is not driven. The first and third comb tooth-shaped electrodes are provided in an integral fashion with respect to the frame, for example, and the second and fourth comb tooth-shaped electrodes are provided in an integral fashion with respect to the movable section, for example. The present method comprises: a first step for causing the movable section to perform rotational operation in a first direction by generating an electrostatic attraction between the second conductor section and the third conductor section, as well as generating an electrostatic attraction between fifth conductor section and the sixth conductor section, and a second step for causing the movable section to perform rotational operation in the first direction by generating an electrostatic attraction between the fifth conductor section and the sixth conductor section.

A composition of this kind also effectively combines the composition according to the sixth and seventh aspects of the invention described previously. Therefore, according to the eighth aspect of the present invention, when driving a micro-oscillation element according to the second aspect of the present invention, it is possible to achieve high operational speeds for rotational operation of the movable section involving large amounts of rotational displacement.

The driving method according to the eighth aspect of the present invention further comprises: a third step for causing the movable section to perform rotational operation in a second direction, opposite to the first direction, by generating an electrostatic attraction between the first conductor section and the third conductor section, between the second conductor section and the third conductor section, and between the fourth conductor section and the sixth conductor section, subsequently to the second step, and a fourth step for causing the movable section to perform rotational operation in the second direction by generating an electrostatic attraction, following the third step, between the first conductor section and the third conductor section, and between the fourth conductor section and the sixth conductor section.

Preferably, in the eighth aspect of the present invention, the micro-oscillation element comprises a fifth comb tooth-shaped electrode and a sixth comb tooth-shaped electrode for generating a driving force for rotational operation, and a seventh comb tooth-shaped electrode and eighth comb tooth-shaped electrode for generating a driving force for rotational operation at a position closer to the axis of rotation than the fifth and sixth comb tooth-shaped electrodes. The fifth comb tooth-shaped electrode has electrode teeth comprising a seventh conductor section and an eighth conductor section aligned in parallel with the direction of rotational operation. The sixth comb tooth-shaped electrode has electrode teeth comprising a ninth conductor section that opposes the seventh conductor section and does not oppose the eighth conductor section when the element is not driven. The seventh comb tooth-shaped electrode has electrode teeth comprising a tenth conductor section and an eleventh conductor section aligned in parallel with the direction of rotational operation. The eighth comb tooth-shaped electrode has electrode teeth comprising a twelfth conductor section that opposes the tenth conductor section and does not oppose the eleventh conductor section when the element is not driven. The fifth and seventh comb tooth-shaped electrodes are provided in an integral fashion with respect to the frame, for example, and the sixth and eighth comb tooth-shaped electrodes are provided in an integral fashion with respect to the movable section, for example. Moreover, the fifth comb tooth-shaped electrode and the first comb tooth-shaped electrode described previously, the sixth comb tooth-shaped electrode and the second comb tooth-shaped electrode described previously, the seventh comb tooth-shaped electrode and the third comb tooth-shaped electrode described previously, and the eighth comb tooth-shaped electrode and the fourth comb tooth-shaped electrode described previously are respectively disposed in a symmetrical fashion, for example, with respect to the axis of rotation of the movable section. If the micro-oscillation element has a composition of this kind, then the driving method according to the eighth aspect of the present invention comprises: a fifth step for causing the movable section to perform rotational operation in a second direction by generating an electrostatic attraction between the eighth conductor section and the ninth conductor section, as well as generating an electrostatic attraction between the eleventh conductor section and the twelfth conductor section, subsequently to the fourth step; a sixth step for causing the movable section to perform rotational operation in a second direction by generating an electrostatic attraction, following the fifth step, between the eleventh conductor section and the twelfth conductor section; a seventh step for causing the movable section to perform rotational operation in a first direction by generating an electrostatic attraction between the seventh conductor section and the ninth conductor section, between the eighth conductor section and the ninth conductor section, and between the tenth conductor section and the eleventh conductor section, subsequently to the sixth step; and an eighth step for causing the movable section to perform rotational operation in the first direction by generating an electrostatic attraction, following the seventh step, between the seventh conductor section and the ninth conductor section, and between the tenth conductor section and the twelfth conductor section.

In the eighth aspect of the present invention, preferably, in the third step and the fourth step, an electrostatic attraction is generated between the seventh conductor section and the ninth conductor section, and between the tenth conductor section and the twelfth conductor section. In the eighth aspect of the present invention, preferably, in the seventh step and the eighth step, an electrostatic attraction is generated between the first conductor section and the third conductor section, and between the fourth conductor section and the sixth conductor section.

BRIEF DESCRIPTION OF THE DRAWINGS

FIG. 9 is a plan view of a micro-mirror element according to a second embodiment of the present invention;

FIGS. 12A–11B are cross-sectional views along line XII—XII in FIG. 9;

FIGS. 19A–19B are cross-sectional views along line XVIII—XVIII in FIG. 17 when the micro-mirror element is being driven;

FIGS. 20A–20B are cross-sectional view along line XVIII—XVIII in FIG. 17 when the micro-mirror element is being driven;

FIG. 28 is a cross-sectional view along line XXVIII—XXVIII in FIG. 27;

FIGS. 29A–29B are cross-sectional views along line XXVIII—XXVIII in FIG. 27 when the micro-mirror element is being driven;

FIGS. 30A–30B are cross-sectional views along line XXVIII—XXVIII in FIG. 27 when the micro-mirror element is being driven;

FIGS. 38A–38B are cross-sectional views along line XXXVIII—XXXVIII in FIG. 36;

DETAILED DESCRIPTION OF THE PREFERRED EMBODIMENTS

Figure 1:
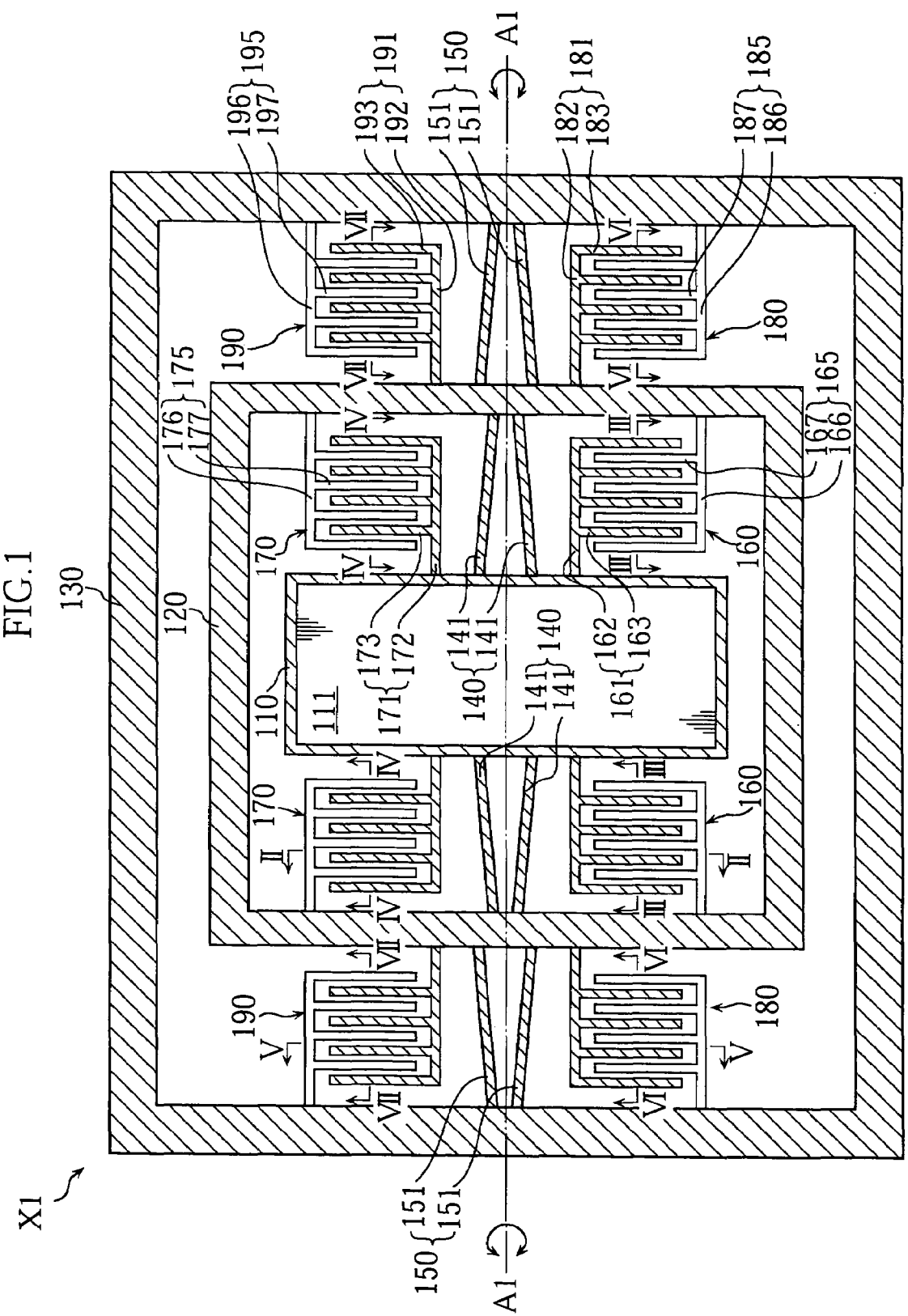
FIG. 1 is a plan view of a micro-mirror element according to a first embodiment of the present invention.

FIG. 1–FIG. 7 shows a micro-mirror element X1 according to a first embodiment of the present invention. FIG. 1 is a plan view of the micro-mirror element X1, and FIG. 2 are cross-sectional view along line II—II in FIG. 1. Furthermore, FIG. 3 to FIG. 7 are cross-sectional views along line III—III, line IV—IV, line V—V, line VI—VI and line VII—VII in FIG. 1, respectively.

The micro-mirror element X1 comprises a mirror section 110, n inner frame 120, an outer frame 130, a pair of connecting ections 140, a pair of connecting sections 150, and respective airs of drive mechanisms 160, 170, 180, 190. Furthermore, the micro-mirror element X1 is manufactured by carrying out processing on a material substrate, which is a so-called SOI (silicon on insulator) substrate, by means of bulk micro-machining technology, such as MEMS technology. The material substrate has a laminated structure consisting, for example, of first and second silicon layers, and an insulating layer interposed between these silicon layers, a prescribed type of conductivity being imparted to the respective silicon layers, by doping with an impurity. For the purpose of clarifying the diagrams, in FIG. 1, the regions originating in the first silicon layer which project beyond the insulating layer in the direction of the reader are marked by diagonal hatching (with the exception of the mirror surface 111 described hereinafter).

The mirror section 110 is a region formed principally in the first silicon layer, and it has a mirror surface 111 having a light reflecting function, on the front surface thereof. The mirror surface 111 has a laminated structure consisting of a Cr layer formed on the first silicon layer, and an Ar layer formed on the Cr layer. The mirror surface 111 of this kind forms the principal movable section of the present invention.

The inner frame 120 is a region formed principally in the first silicon layer, in such a state that it surrounds the mirror section 110. The inner frame 120 of this kind and the aforementioned mirror section 110 constitute a movable section according to the present invention. The outer frame 130 is a region formed principally in the first silicon layer, in such a state that it surrounds the inner frame 120.

The pair of connecting sections 140 are regions formed in the first silicon layer, and consist respectively of two torsion bars 141. The torsion bars 141 are connected to the mirror section 110 and the inner frame 120, thus linking same together. The interval between the two torsion bars 141 in each respective connecting section 140 gradually increases from the inner frame 120 side towards the mirror section 110 side. The pair of connecting sections 140 of this kind define an axis A1 for the rotational operation of the mirror section 110 with respect to the inner frame 120. Preferably, the connecting sections 140 are each constituted by two torsion bars 141, the interval between which gradually increases from the inner frame 120 side towards the mirror section 110 side, and they prevent unwanted displacement in the rotational operation of the mirror section 110. Furthermore, it is also possible to constitute the connecting sections 140 such that two different electric potentials can be applied from the inner frame 120 to the mirror section 110, via the two torsion bars 141.

The pair of connecting sections 150 are regions formed in the first silicon layer, and consist respectively of two torsion bars 151. The torsion bars 151 are connected to the inner frame 120 and the outer frame 130, thus linking same together. The interval between the two torsion bars 150 of the respective connecting sections 151 gradually increases from the outer frame 130 side towards the inner frame 120 side. The axis of rotation of the rotational operation of the inner frame 120 and the mirror section 110 accompanying same, with respect to the outer frame 130, as defined by the pair of connecting sections 150 of this kind, coincides with the rotational axis A1. In other words, the pair of connecting sections 140 and the pair of connecting sections 150 are disposed such that the axiss of rotation defined respectively by same are mutually coinciding. Preferably, the connecting sections 150 which are respectively constituted by two torsion bars 151, the interval between which gradually increases from the outer frame 130 side towards the inner frame 120 side, prevent unwanted displacement in the rotational operation of the inner frame 120 and the mirror section 110. Furthermore, it is also possible to constitute the connecting sections 150 such that two different electric potentials can be applied from the outer frame 130 to the inner frame 120, via the two torsion bars 151.

Figure 2A:
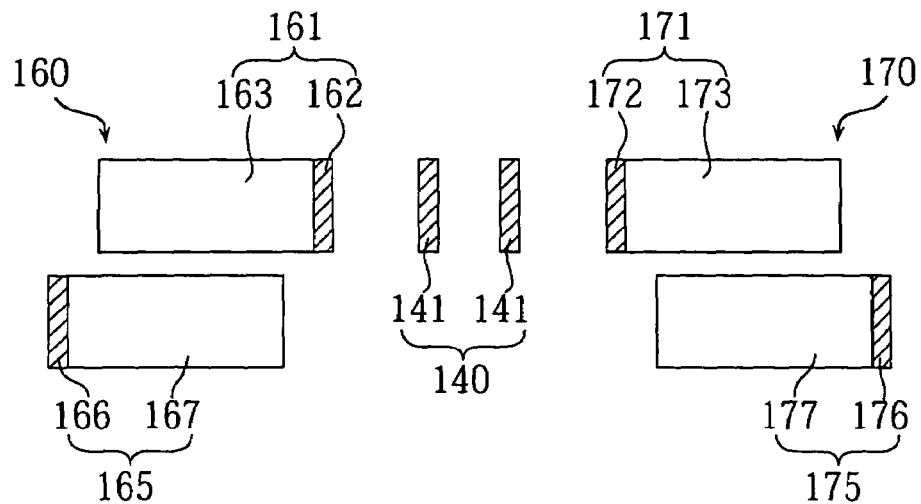
FIGS. 2A–2C are cross-sectional views along line II—II in FIG. 1.
Figure 3A:
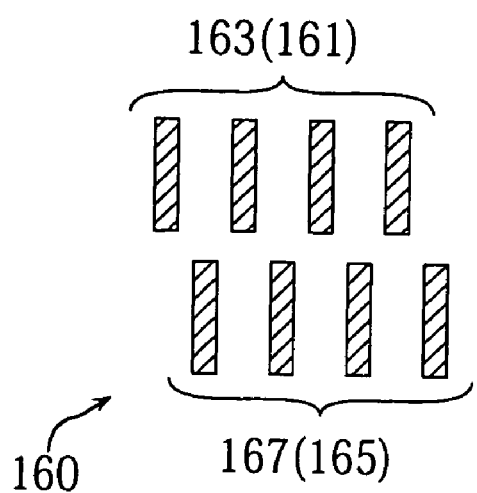
FIGS. 3A–3B are cross-sectional views along line III—III in FIG. 1.

Two drive mechanisms 160 are disposed in a symmetrical fashion, with respect to the mirror section 110, each comprising a comb tooth-shaped electrode 161 and comb tooth-shaped electrode 165. The comb tooth-shaped electrode 161 is a region originating principally in the first silicon layer, and it has a base section 162 which is fixed to the mirror section 110, and a plurality of electrode teeth 163 which project from this base section 162. The comb tooth-shaped electrode 165 is a region originating principally in the second silicon layer, and it has a base section 166 which is fixed to the inner frame 120 and projects in an inward direction, and a plurality of electrode teeth 167 which project from this base section 166. When the element is not driven in rotation, the comb tooth-shaped electrodes 161, 165 are positioned at mutually different heights, as illustrated by FIG. 2A and FIG. 3A. Moreover, the comb tooth-shaped electrodes 161, 165 are disposed in a state whereby their respective electrode teeth 163, 167 lie in mutually displaced positions, such that they do not make contact with each other when the element is driven in rotation.

Figure 4A:
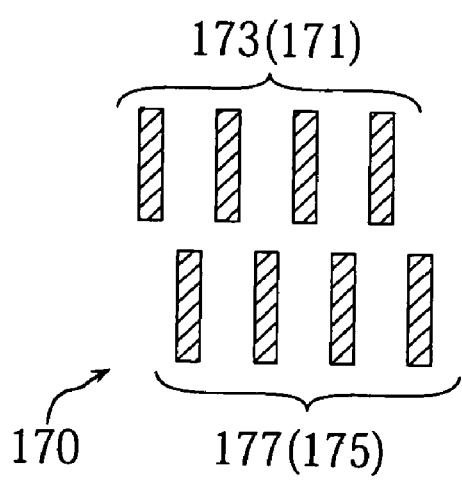
FIGS. 4A–4B are cross-sectional views along line IV—IV in FIG. 1.
Figure 4B:
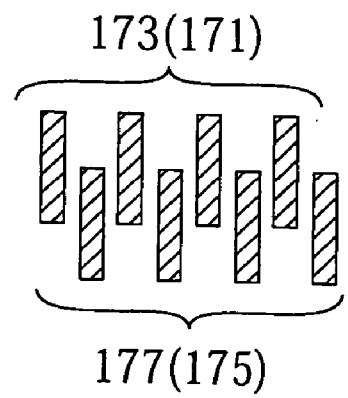

Two drive mechanisms 170 are disposed in a symmetrical fashion, with respect to the mirror section 110, each comprising a comb tooth-shaped electrode 171 and comb tooth-shaped electrode 175. The comb tooth-shaped electrode 171 is a region originating principally in the first silicon layer, and it has a base section 172 which is fixed to the mirror section 110, and a plurality of electrode teeth 172 which project from this base section 173. The comb tooth-shaped electrode 175 is a region originating principally in the second silicon layer, and it has a base section 176 which is fixed to the inner frame 120 and projects in an inward direction, and a plurality of electrode teeth 176 which project from this base section 177. When the element is not driven in rotation, the comb tooth-shaped electrodes 171, 175 are positioned at mutually different heights, as illustrated by FIG. 2A and FIG. 4A. Moreover, the comb tooth-shaped electrodes 171, 175 are disposed in a state whereby their respective electrode teeth 173, 177 lie in mutually displaced positions, such that they do not make contact with each other when the element is driven in rotation.

Figure 5A:
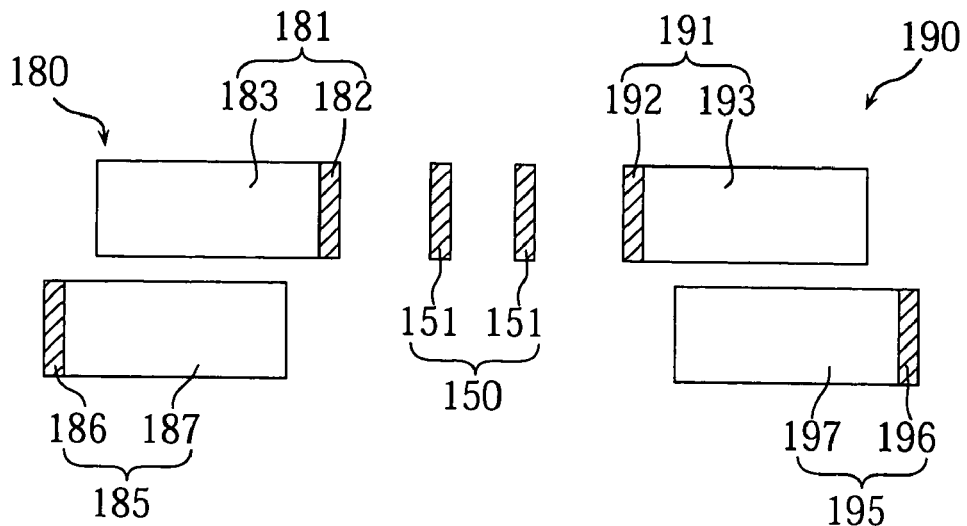
FIGS. 5A–5C are cross-sectional views along line V—V in FIG. 1.
Figure 6A:
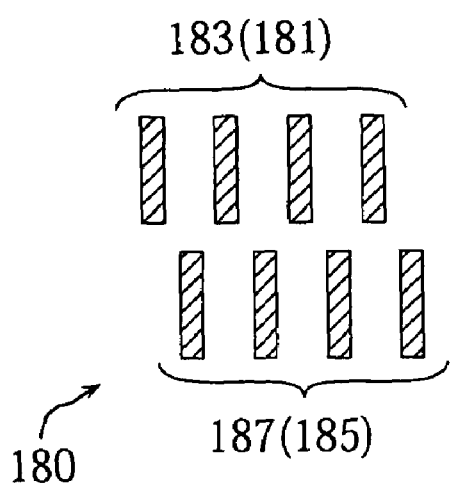
FIGS. 6A–6B are cross-sectional views along line VI—VI in FIG. 1.

Two drive mechanisms 180 are disposed in a symmetrical fashion, with respect to the mirror section 110 and inner frame 120, each comprising a comb tooth-shaped electrode 181 and a comb tooth-shaped electrode 185. The comb tooth-shaped electrode 181 is a region originating principally in the first silicon layer, and it has a base section 182 which is fixed to the inner frame 120 and projects in an outward direction, and a plurality of electrode teeth 182 which project from this base section 183. The comb tooth-shaped electrode 185 is a region originating principally in the second silicon layer, and it has a base section 186 which is fixed to the outer frame 130 and projects in an inward direction, and a plurality of electrode teeth 186 which project from this base section 187. When the element is not driven in rotation, the comb tooth-shaped electrodes 181, 185 are positioned at mutually different heights, as illustrated by FIG. 5A and FIG. 6A. Moreover, the comb tooth-shaped electrodes 181, 185 are disposed in a state whereby their respective electrode teeth 183, 187 lie in mutually displaced positions, such that they do not make contact with each other when the element is driven in rotation.

Figure 7A:
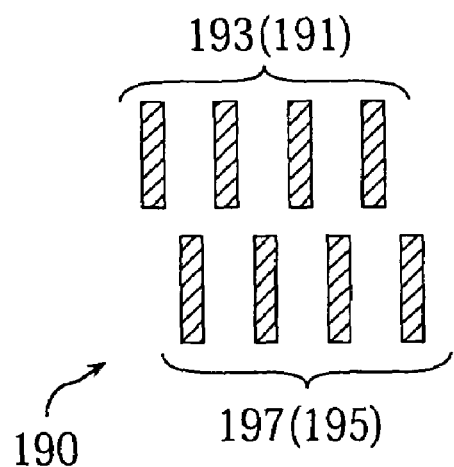
FIGS. 7A–7B are cross-sectional view along line VII—VII in FIG. 1.
Figure 7B:
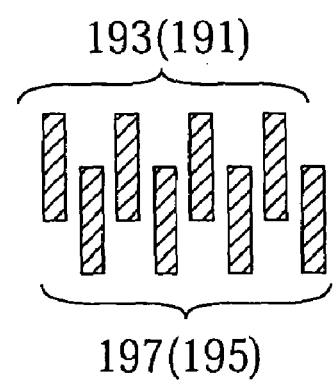

Two drive mechanisms 190 are disposed in a symmetrical fashion, with respect to the mirror section 110 and inner frame 120, each comprising a comb tooth-shaped electrode 191 and a comb tooth-shaped electrode 195. The comb tooth-shaped electrode 191 is a region originating principally in the first silicon layer, and it has a base section 192 which is fixed to the inner frame 120 and projects in an outward direction, and a plurality of electrode teeth 192 which project from this base section-193. The comb tooth-shaped electrode 195 is a region originating principally in the second silicon layer, and it has a base section 196 which is fixed to the outer frame 130 and projects in an inward direction, and a plurality of electrode teeth 196 which project from this base section 197. When the element is not driven in rotation, the comb tooth-shaped electrodes 191, 195 are positioned at mutually different heights, as illustrated by FIG. 5A and FIG. 7A. Moreover, the comb tooth-shaped electrodes 191, 195 are disposed in a state whereby their respective electrode teeth 193, 197 lie in mutually displaced positions, such that they do not make contact with each other when the element is driven in rotation.

As described above, the micro-mirror element X1 is manufactured by carrying out processes on a material substrate having a multiple-layer structure, by means of bulk micro-machining technology, such as MEMS technology. Moreover, as described above, in the present embodiment, the material substrate has a laminated structure consisting of a first and second silicon layer, and an insulating layer interposed between same.

In the manufacture of the micro-mirror element X1, more specifically, respective silicon layers are processed by carrying out etching on a material substrate, at prescribed timings, using an etching mask covering the region corresponding to the mirror section 110, an etching mask covering the region corresponding to the inner frame 120, an etching mask covering the region corresponding to the outer frame 130, an etching mask covering the region corresponding to the pair of connecting sections 140, an etching mask covering the region corresponding to the pair of connecting sections 150, an etching masks covering the regions corresponding to the respective drive mechanisms 160, 170, 180, 190, as appropriate. For the etching technique, it is possible to adopt a dry etching method, such as Deep Reactive Ion Etching (RIE), or a wet etching method using KOH, or the like. The unwanted regions of the insulating layer are removed as appropriate by etching. In this way, the respective regions of the micro-mirror element X1 are formed on a material substrate having a first and second silicon layer and an insulating layer. In the present invention, when manufacturing the micro-mirror element X1, it is also possible to adopt a material substrate having a different laminated structure.

In the micro-mirror element X1, by applying prescribed electric potentials, as and when necessary, to the respective comb tooth-shaped electrodes 161, 165, 171, 175, 181, 185, 191, 195, it is possible to cause the mirror section 110 to rotate about the axis of rotation A1.

Figure 5B:
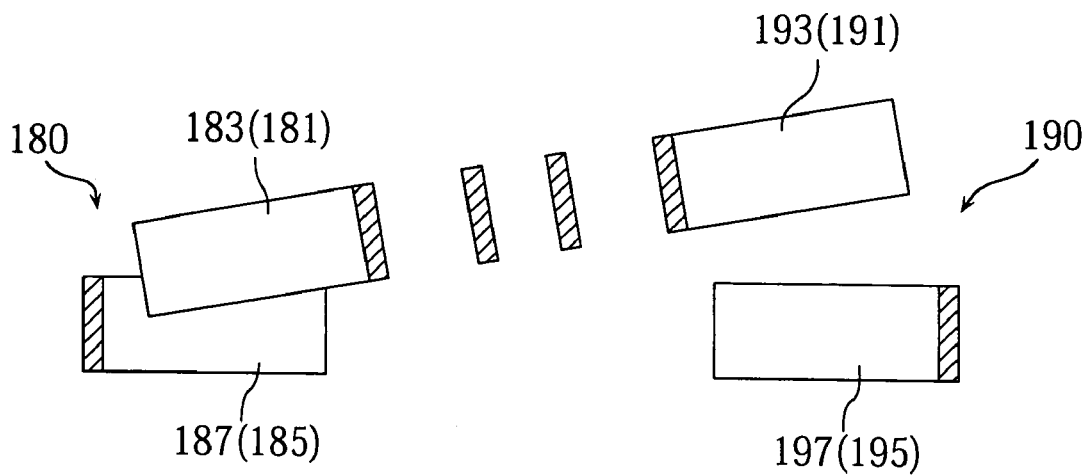
Figure 5C:
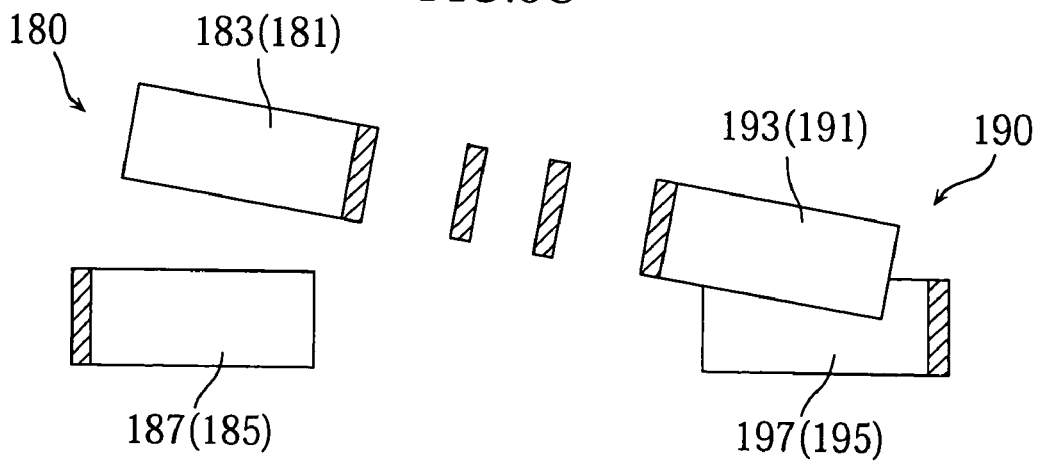
Figure 6B:
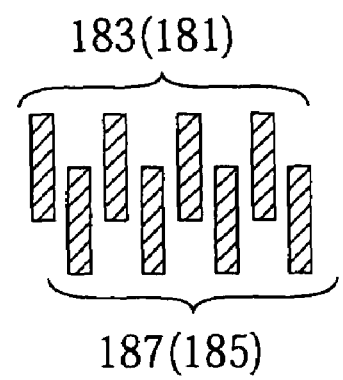

By applying a prescribed electric potential to the comb tooth-shaped electrodes 181, 185 of the drive mechanisms 180, a prescribed electrostatic attraction is generated between the comb tooth-shaped electrodes 181, 185, whereby the comb tooth-shaped electrode 181 is drawn inside the comb tooth-shaped electrode 185, such that the respective electrodes assume the orientation illustrated in FIG. 5B and FIG. 6B, for example. By this means, the inner frame 120 and the mirror section 110 accompanying same perform rotational operation about the axis of rotation A1, with respect to the outer frame 130. The amount of rotational displacement performed in this rotational operation can be governed by adjusting the applied electric potential.

Figure 2B:
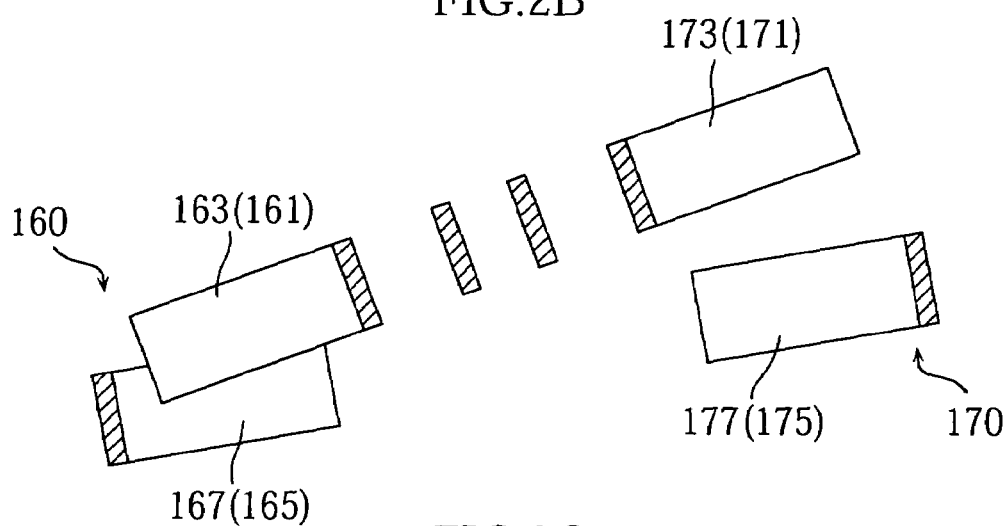
Figure 2C:
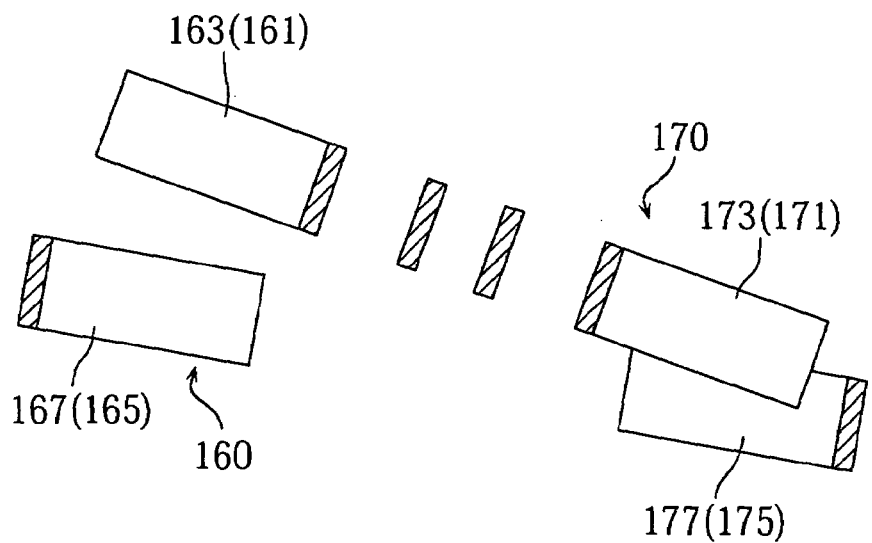
Figure 3B:
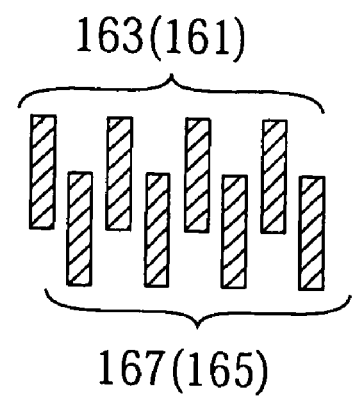

In a state where the comb tooth-shaped electrodes 181, 185 have assumed the orientation shown in FIG. 5B and FIG. 6B, if a prescribed electrostatic attraction is generated between the comb tooth-shaped electrodes 161, 165 by applying a prescribed electric potential to the comb tooth-shaped electrodes 161, 165 of the drive mechanisms 160, then either comb tooth-shaped electrode 161 will be drawn inside the comb tooth-shaped electrode 165, and the two electrodes will assume the orientation illustrated in FIG. 2B and FIG. 3B, for example. By this means, the mirror section 110 performs rotational operation about the axis of rotation A1, with respect to the inner frame 120. The amount of rotational displacement performed in this rotational operation can be governed by adjusting the applied electric potential.

The overall amount of displacement of the mirror section 110 corresponds to the total of the respective displacements caused by the two types of rotational movement described above. Rotational operation of the mirror section 110 in the opposite direction about the axis of rotation A1 can be achieved by generating a prescribed electrostatic attraction in the drive mechanisms 190, similarly to the operation described above with respect to the drive mechanisms 180, whilst also generating a prescribed electrostatic attraction in the drive mechanisms 170, similarly to the operation described above with respect to the drive mechanisms 160, as illustrated in FIG. 2C, FIG. 4B, FIG. 5C and FIG. 7B, for example. By driving the mirror section 110 to swing in the above fashion, it is possible to switch the direction of reflection of the light reflected by the mirror surface 111 provided on the mirror section 110.

Figure 8A:
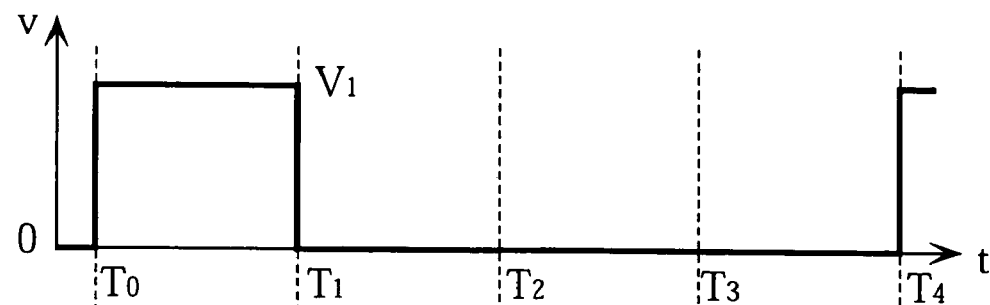
FIGS. 8A–8C show one example of a drive mode of the micro-mirror element in FIG. 1.
Figure 8B:
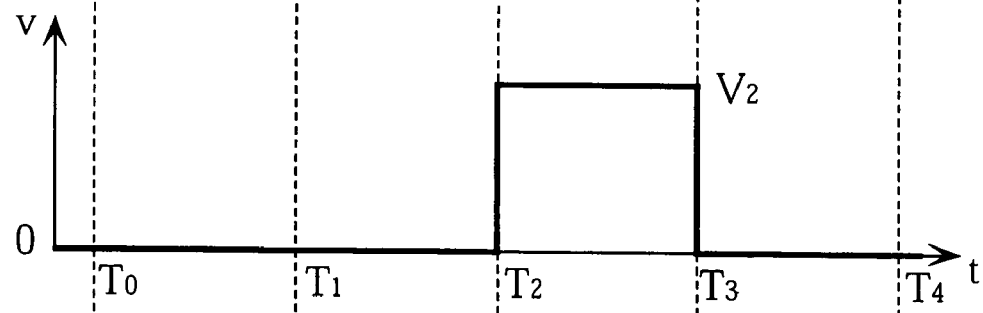
Figure 8C:
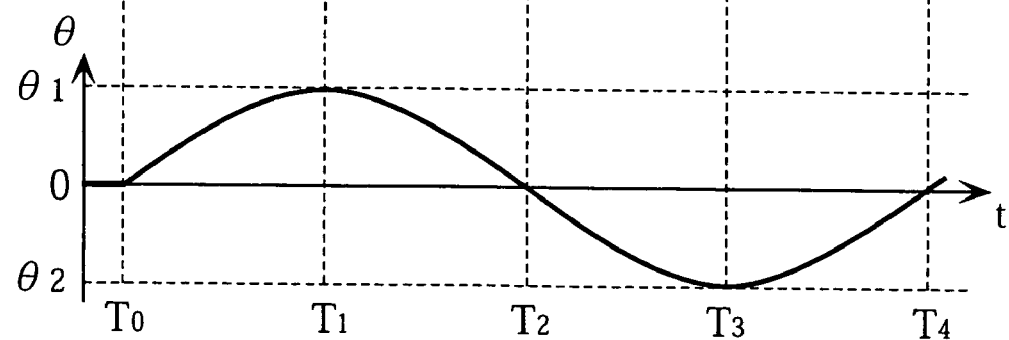

FIG. 8 shows one example of a drive configuration for the micro-mirror element X1. FIG. 8A shows the change over time of the voltage applied to the comb tooth-shaped electrodes 165 of the drive mechanisms 160 and the comb tooth-shaped electrodes 185 of the drive mechanisms 180. FIG. 8B shows the change over time of the voltage applied to the comb tooth-shaped electrodes 175 of the drive mechanisms 170 and the comb tooth-shaped electrodes 195 of the drive mechanisms 190. In the graph in FIG. 8A and the graph in FIG. 8B, the time (t) is represented on the horizontal axis, and the applied voltage (v) is represented on the vertical axis. In the present drive mode, the comb tooth-shaped electrodes 161, 171, 181, 191 are connected to ground. Furthermore, FIG. 8C shows the change over time of the angle of rotation of the mirror section 110 in the present drive mode. In the graph in FIG. 8C, time (t) is represented on the horizontal axis, and the angle of rotation (θ) is represented on the vertical axis.

In the present drive mode, firstly, a prescribed voltage $V_1$ is applied between time $T_0$ and time $T_1$, as shown in FIG. 8A, to the respective comb tooth-shaped electrodes 165, 185 of the micro-mirror element X1 in an initial state (where the angle of rotation of the mirror section 110 is 0°) at time To, such that the rotational displacement of the mirror section 110 reaches a maximum angle of rotation $\theta_1$ at time $T_1$. Between time $T_0$ and $T_1$, an electrostatic attraction is generated between the comb tooth-shaped electrodes 161, 165 and the comb tooth-shaped electrodes 181, 185, and the angle of rotation of the mirror section 110 increases continuously in a first direction. At time $T_1$, the drive mechanisms 160 assume the orientation illustrated in FIG. 2B and FIG. 3B, for example, and the drive mechanisms 180 assume the orientation illustrated in FIG. 5B and FIG. 6B, for example, whilst the angle of rotation reaches $\theta_1$ as illustrated in FIG. 8C. In this case, a prescribed twisting reaction is generated in the connecting sections 140, 150.

Thereupon, at time $T_1$, the applied voltage to the respective comb tooth-shaped electrodes 165, 185 is set substantially to 0V. Subsequently, between time $T_1$ and $T_2$, the twisting reaction of the connecting sections 140, 150 acts as a restoring force, and the angle of rotation decreases continuously. At time $T_2$, the drive mechanisms 160, 170 assume the orientation illustrated in FIG. 2A, FIG. 3A and FIG. 4A, and the drive mechanisms 180, 190 assume the orientation illustrated in FIG. 5A, FIG. 6A and FIG. 7A, whilst the angle of rotation reaches 0° as illustrated in FIG. 8C.

Thereupon, between time $T_2$ and time $T_3$, a prescribed voltage $V_2$ is applied to the respective comb tooth-shaped electrodes 175, 195, as illustrated in FIG. 8B, such that the rotational displacement of the mirror section 110 reaches a maximum angle of rotation $\theta_2$ at time $T_3$. Between time $T_2$ and $T_3$, an electrostatic attraction is generated between the comb tooth-shaped electrodes 171, 175 and the comb tooth-shaped electrodes 191, 195, and the angle of rotation of the mirror section 110 increases continuously in a second direction that is opposite to the first direction. At time $T_3$, the drive mechanisms 170 assume the orientation illustrated in FIG. 2C and FIG. 4B, for example, and the drive mechanisms 190 assume the orientation illustrated in FIG. 5C and FIG. 7B, for example, whilst the angle of rotation reaches $\theta_2$ as illustrated in FIG. 8C. In this case, a prescribed twisting reaction is generated in the connecting sections 140, 150.

Thereupon, at time $T_3$, the applied voltage to the respective comb tooth-shaped electrodes 175, 195 is set substantially to 0V. Subsequently, between time $T_3$ and $T_4$, the twisting reaction of the connecting sections 140, 150 acts as a restoring force, and the angle of rotation decreases continuously. At time $T_4$, the drive mechanisms 160, 170 assume the orientation illustrated in FIG. 2A, FIG. 3A and FIG. 4A, and the drive mechanisms 180, 190 assume the orientation illustrated in FIG. 5A, FIG. 6A and FIG. 7A, whilst the angle of rotation reaches 0° as illustrated in FIG. 8C. The sequence of operations described above, from time $T_0$ to time $T_4$ are repeated, according to requirements.

In the present drive mode, preferably, the voltage $V_1$ and the voltage $V_2$ are the same, and the absolute value of the angle of rotation $\theta_1$ is the same as the absolute value of the angle of rotation $\theta_2$. Moreover, the respective periods between time $T_0$ and time $T_1$, between time $T_1$ and time $T_2$, between time $T_2$ and time $T_3$, and between time $T_3$ and time $T_4$ are preferably set to the same length, and each constitute respectively one quarter of a cycle of the swinging operation of the mirror section 110. In this way, it is possible to achieve a cyclical rotational operation of the mirror section 110 of the micro-mirror element X1.

In the micro-mirror element X1, the stroke of the drive mechanisms 180 and the stroke of the drive mechanisms 160, or the stroke of the drive mechanisms 190 and the stroke of the drive mechanisms 170, are mutually superimposed and thus a long stroke is ensured. Since an effectively long stroke is ensured by superimposition of the strokes of two types of drive mechanisms, then it is possible to form the respective drive mechanisms formed by sets of comb tooth-shaped electrodes, for example, to a relatively thin size (to a relatively short length in the direction of rotational operation). Therefore, the movable section (mirror section 110 and inner frame 120) which tends to be formed to a thickness that reflects the thickness of the drive mechanisms, can be formed to a relatively thin size. The thinner the movable section, the lighter the weight thereof, and hence the more suitable it is for achieving high speeds of operation. In this way, the micro-mirror element X1 is suitable for achieving a high speed of operation for rotational operations of the mirror section 110 involving large amounts of rotational displacement.

In the micro-mirror element X1, by disposing the drive mechanisms 160 and the drive mechanisms 180 electrically in parallel, and disposing the drive mechanisms 170 and the drive mechanisms 190 electrically in parallel, it is possible to simplify the control of the rotational drive operation. For example, if the respective comb tooth-shaped electrodes 161 of the two drive mechanisms 160 and the respective comb tooth-shaped electrodes 181 of the two drive mechanisms 180 are disposed electrically in parallel, and if the respective comb tooth-shaped electrodes 165 of the two drive mechanisms 160 and the respective comb tooth-shaped electrodes 185 of the two drive mechanisms 180 are disposed electrically in parallel, then when driving rotation, the same electrical potential is applied simultaneously to all of the comb tooth-shaped electrodes 161, 181, and the same electrical potential is applied simultaneously to all of the comb tooth-shaped electrodes 165, 185, and hence it is possible to achieve common control of the drive mechanisms 160, 180. Moreover, if the respective comb tooth-shaped electrodes 170 of the two drive mechanisms 171 and the respective comb tooth-shaped electrodes 190 of the two drive mechanisms 191 are disposed electrically in parallel, and if the respective comb tooth-shaped electrodes 175 of the two drive mechanisms 170 and the respective comb tooth-shaped electrodes 195 of the two drive mechanisms 190 are disposed electrically in parallel, then when driving rotation, the same electrical potential is applied simultaneously to all of the comb tooth-shaped electrodes 171, 191, and the same electrical potential is applied simultaneously to all of the comb tooth-shaped electrodes 175, 195, and hence it is possible to achieve common control of the drive mechanisms 170, 190.

In a design in which the maximum relative angle of rotational displacement of the mirror section 110 with respect to the inner frame 120 that can be achieved by means of the drive mechanisms 160, 170, and the maximum relative angle of rotational displacement of the inner frame 120 with respect to the outer frame 130 that can be achieved by means of the drive mechanisms 180, 190, are set so as to be equal, if the drive mechanisms 160, 180 are controlled commonly as described above, for example, and if the drive mechanisms 170, 190 are controlled commonly as described above, for example, then taking the twisting spring constant of the connecting sections 140, 150 to be $k_1$ and $k_2$ respectively, and the rotational torque generated by the drive mechanisms 160, 170 and the drive mechanisms 180, 190 to be $T_1$ and $T_2$, respectively, it is possible to control the drive mechanisms with the greatest level of efficiency when the conditions in equation (1) below are satisfied. On the other hand, in a design in which the ratio between the maximum relative angle of rotational displacement of the mirror section 110 with respect to the inner frame 120 that can be achieved by means of the drive mechanisms 160, 170, and the maximum relative angle of rotational displacement of the inner frame 120 with respect to the outer frame 130 that can be achieved by means of the drive mechanisms 180, 190, is set to be 1:a, if the drive mechanisms 160, 180 are controlled commonly as described above, for example, and if the drive mechanisms 170, 190 are controlled commonly as described above, for example, then taking the twisting spring constant of the connecting sections 140, 150 to be $k_1$ and $k_2$ respectively, and the rotational torque generated by the drive mechanisms 160, 170 and the drive mechanisms 180, 190 to be $T_{1\,and\,T2}$, respectively, it is possible to control the drive mechanisms with the greatest level of efficiency when the conditions in equation (2) below are satisfied. Furthermore, if the inertias of the mirror section 110 and the inner frame 120 are taken to be $I_1$ and $I_2$, respectively, then preferably, the values of $k_1/I_1$ and $k_2/(I_1+I_2)$ should be equal in the micro-mirror element X1.

$$k_1/T_1 = k_2/T_2 \qquad (1)$$

$$a(k_1/T_1 = k_2/T_2) \qquad (2)$$

In the micro-mirror element X1, by disposing the drive mechanisms 160 and the drive mechanisms 180 in electrically separate fashion, and disposing the drive mechanisms 170 and the drive mechanisms 190 in electrically separate fashion, it is possible to achieve high precision in the control of the rotational drive operation. If a composition of this kind is adopted, then by independently adjusting the driving force or rotational torque generated by the respective drive mechanisms 160, 170, 180, 190, it is possible to control the two types of rotational operation about the axis of rotation A1, independently. In this case also, it is desirable that the conditions stipulated in Equation (1) or Equation (2) are satisfied.

FIG. 9–FIG. 15 show a micro-mirror element X2 according to a second embodiment of the present invention. FIG. 9 is a plan view of the micro-mirror element X2, and FIG. 10 is a cross-sectional view along line X—X in FIG. 9. Furthermore, FIG. 11 to FIG. 15 are cross-sectional views along line XI—XI, line XII—XII, line XIII—XIII, line XIV—XIV and line XV—XV in FIG. 9, respectively.

The micro-mirror element X2 comprises a mirror section 110, an inner frame 120, an outer frame 130, a pair of connecting sections 140, a pair of connecting sections 150, and respective pairs of drive mechanisms 260, 270, 280, 290. The micro-mirror element X2 differs from the micro-mirror element X1 in respect of the fact that it is equipped with drive mechanisms 260, 270, 280 and 290, instead of the drive mechanisms 160, 170, 180 and 190. Moreover, similarly to the micro-mirror element X1, the micro-mirror element X2 is manufactured by carrying out processing on a material substrate, which is an SOI substrate, by means of a bulk micro-machining technology, such as MEMS technology, or the like. The material substrate has a laminated structure consisting, for example, of first and second silicon layers, and an insulating layer interposed between these silicon layers, a prescribed type of conductivity being imparted to the respective silicon layers by doping with an impurity. For the purpose of clarifying the diagrams, in FIG. 9, the areas originating in the first silicon layer which project in the direction of the reader beyond the insulating layer are marked by diagonal hatching (with the exception of the mirror surface 111).

Figure 10A:
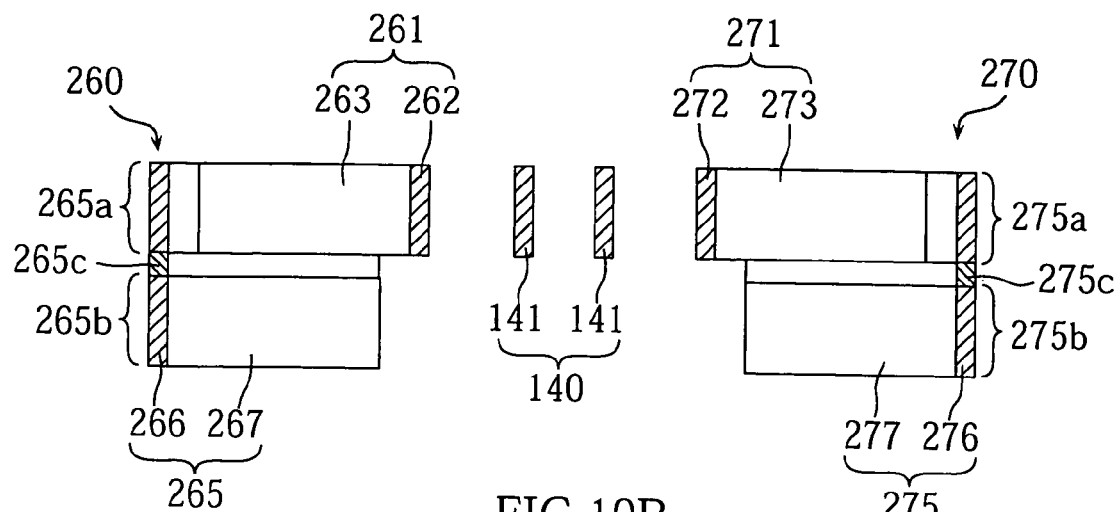
FIGS. 10A–10C are cross-sectional views along line X—X in FIG. 9.
Figure 10B:
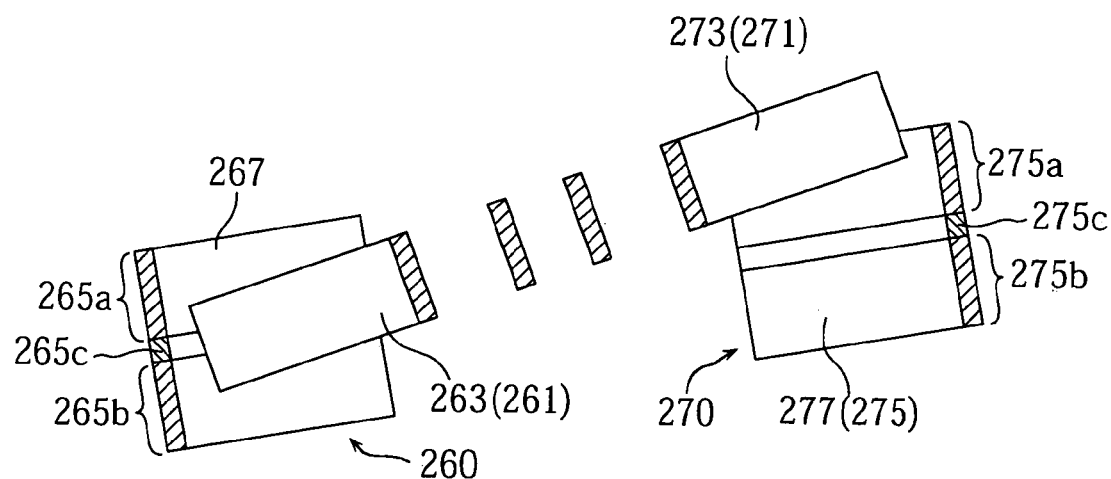
Figure 10C:
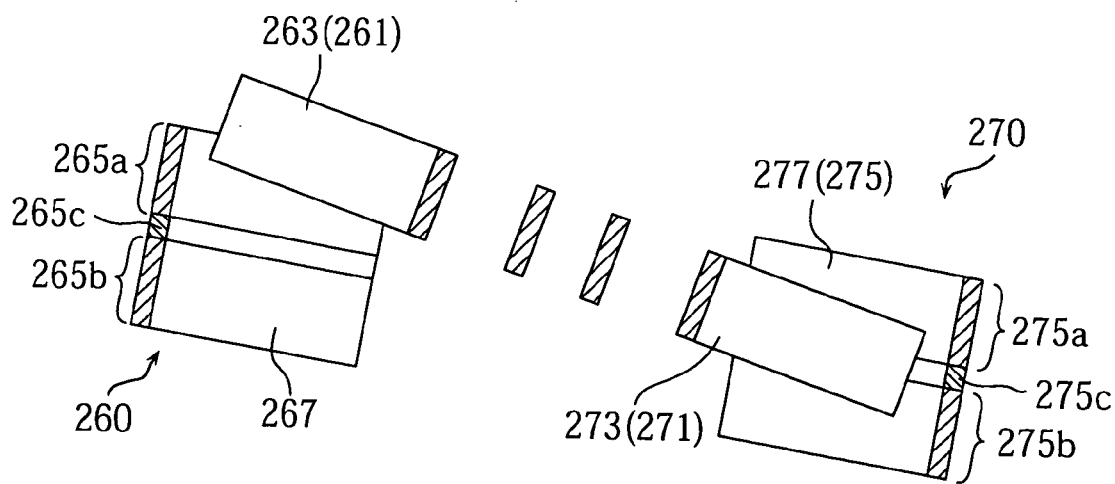
Figure 11A:
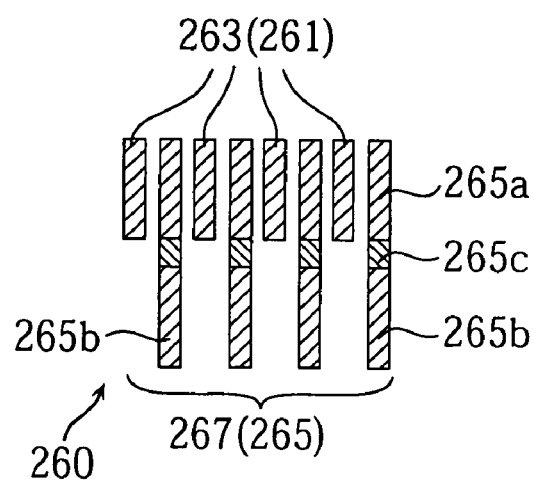
FIGS. 11A–11B are cross-sectional views along line XI—XI in FIG. 9.
Figure 11B:
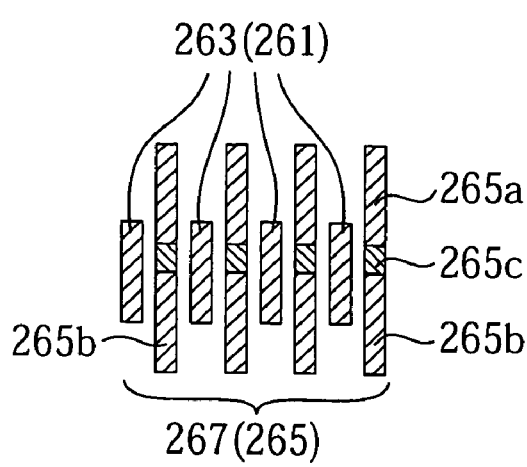

Two drive mechanisms 260 provided in the micro-mirror element X2 are disposed in a symmetrical fashion, with respect to the mirror section 110, each comprising a comb tooth-shaped electrode 261 and comb tooth-shaped electrode 265. The comb tooth-shaped electrode 261 is a region originating principally in the first silicon layer, and it has a base section 262 which is fixed to the mirror section 110, and a plurality of electrode teeth 262 which project from this base section 263. The comb tooth-shaped electrode 265 has a laminated structure consisting of a conductor section 265a, a conductor section 265b, and an insulating section 265c for electrically separating the two conductor sections, and also has a base section 266 which is fixed to the inner frame 120 and projects in an inward direction, and a plurality of electrode teeth 267 which project from this base section 266. The conductor sections 265a, 265b are regions which originate respectively in the first and second silicon layer. When the element is not driven in rotation, the comb tooth-shaped electrode 261 and the base section 265b of the comb tooth-shaped electrode 265 are positioned at mutually different heights, as illustrated by FIG. 10A and FIG. 11A. Moreover, the comb tooth-shaped electrodes 261, 265 are disposed in a state whereby their respective electrode teeth 263, 267 lie in mutually displaced positions, such that they do not make contact with each other.

Figure 12A:
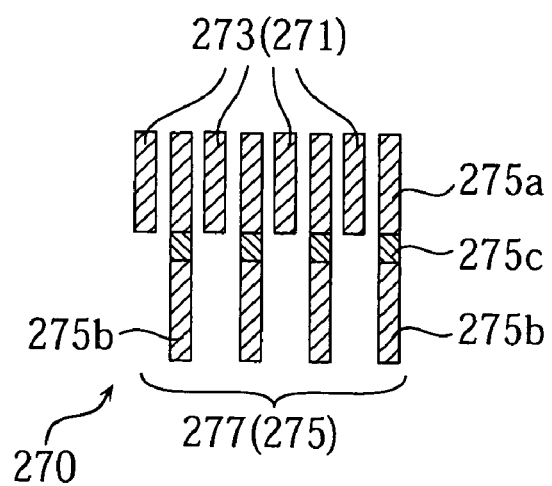
Figure 12B:
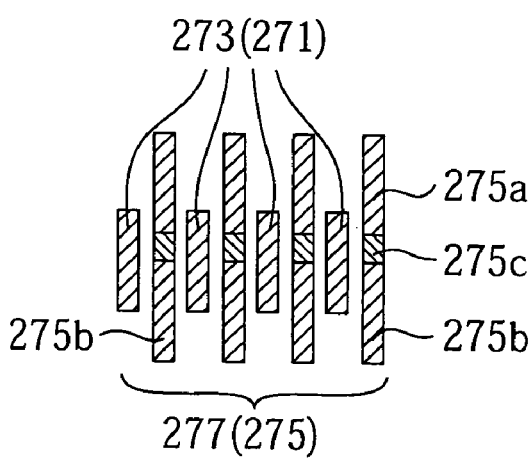

Two drive mechanisms 270 are disposed in a symmetrical fashion, with respect to the mirror section 110, each comprising a comb tooth-shaped electrode 271 and comb tooth-shaped electrode 275. The comb tooth-shaped electrode 271 is a region originating principally in the first silicon layer, and it has a base section 272 which is fixed to the mirror section 110, and a plurality of electrode teeth 272 which project from this base section 273. The comb tooth-shaped electrode 275 has a laminated structure consisting of a conductor section 275a, a conductor section 275b, and an insulating section 275c for electrically separating the two conductor sections, and also has a base section 276 which is fixed to the inner frame 120 and projects in an inward direction, and a plurality of electrode teeth 277 which project from this base section 276. The conductor sections 275a, 275b are regions which originate respectively in the first and second silicon layers. When the element is not driven in rotation, the comb tooth-shaped electrode 271 and the base section 275b of the comb tooth-shaped electrode 275 are positioned at mutually different heights, as illustrated by FIG. 10A and FIG. 12A. Moreover, the comb tooth-shaped electrodes 271, 275 are disposed in a state whereby their respective electrode teeth 273, 277 lie in mutually displaced positions, such that they do not make contact with each other.

Figure 13A:
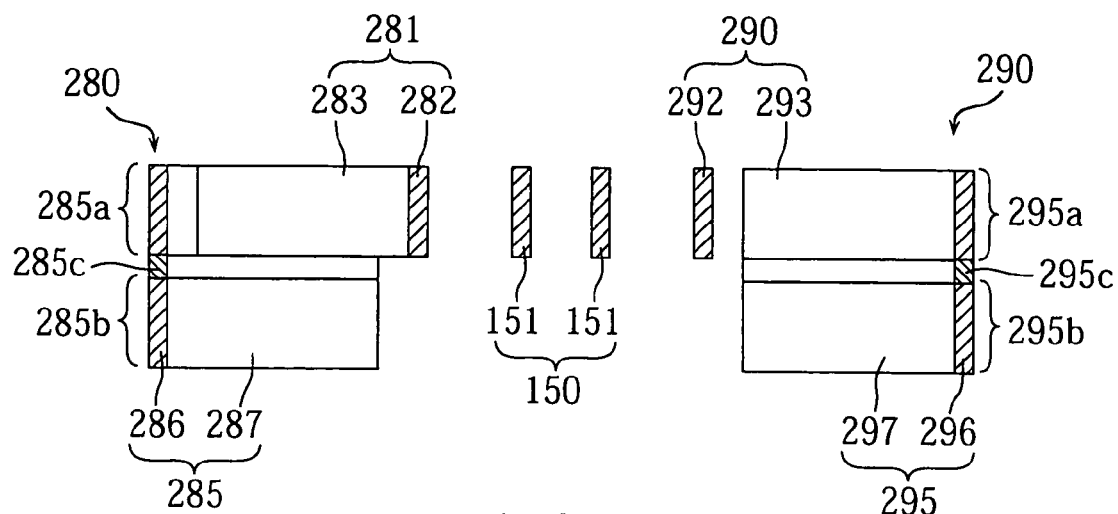
FIGS. 13A–13C are cross-sectional views along line XIII—XIII in FIG. 9.
Figure 13B:
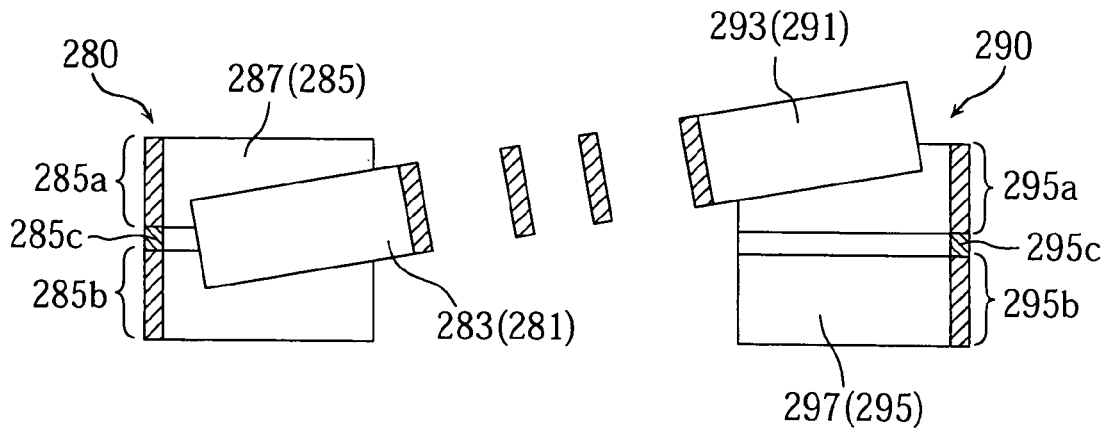
Figure 13C:
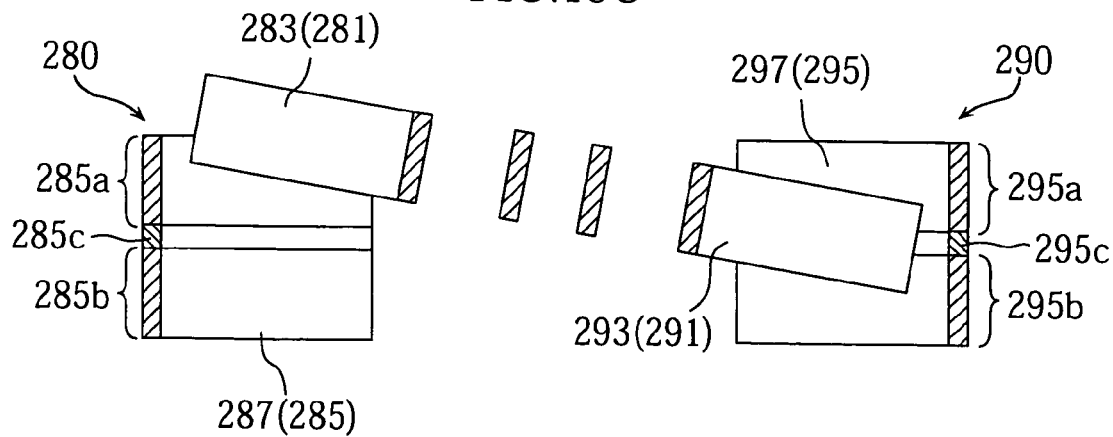
Figure 14A:
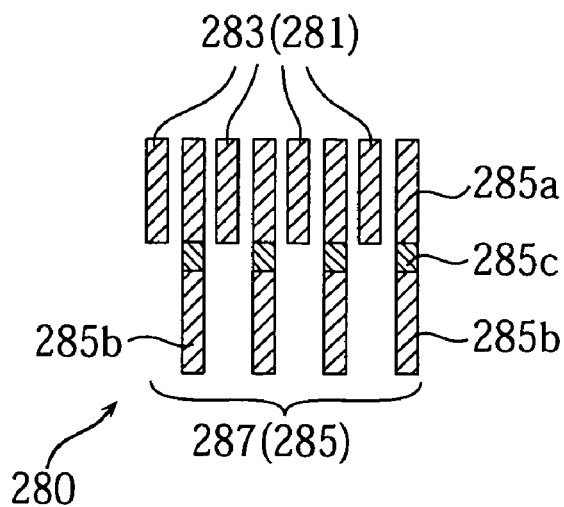
FIGS. 14A–14B are cross-sectional views along line XIV—XIV in FIG. 9.
Figure 14B:
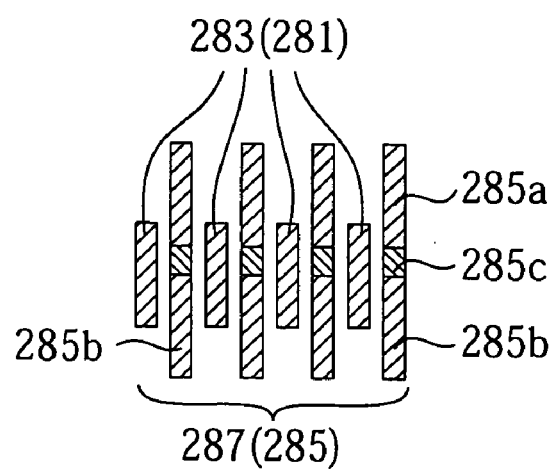

Two drive mechanisms 280 are disposed in a symmetrical fashion, with respect to the mirror section 110 and inner frame 120, each comprising a comb tooth-shaped electrode 281 and a comb tooth-shaped electrode 285. The comb tooth-shaped electrode 281 is a region originating principally in the first silicon layer, and it has a base section 0.282 which is fixed to the inner frame 120, and a plurality of electrode teeth 283 which project from this base section 282. The comb tooth-shaped electrode 285 has a laminated structure consisting of a conductor section 285a, a conductor section 285b, and an insulating section 285c for electrically separating the two conductor sections, and also has a base section 286 which is fixed to the outer frame 130 and projects in an inward direction, and a plurality of electrode teeth 287 which project from this base section 286. The conductor sections 285a, 285b are regions which originate respectively in the first and second silicon layers. When the element is not driven in rotation, the comb tooth-shaped electrode 281 and the base section 285b of the comb tooth-shaped electrode 285 are positioned at mutually different heights, as illustrated by FIG. 13A and FIG. 14A. Moreover, the comb tooth-shaped electrodes 281, 285 are disposed in a state whereby their respective electrode teeth 283, 287 lie in mutually displaced positions, such that they do not make contact with each other.

Figure 15A:
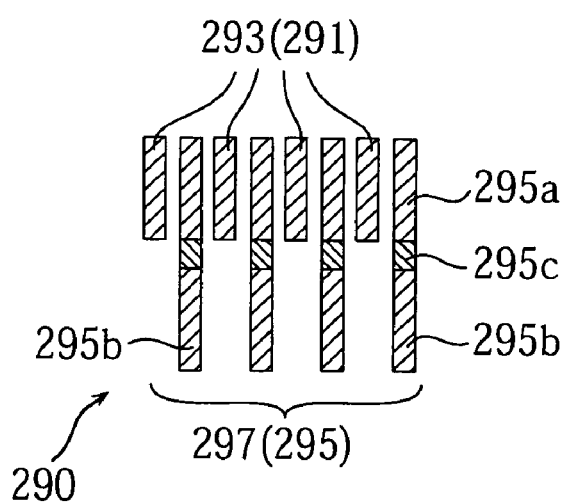
FIGS. 15A–15B are cross-sectional views along line XV—XV in FIG. 9.
Figure 15B:
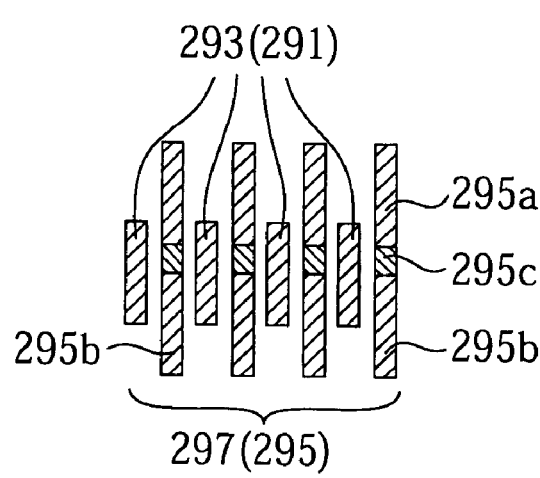

Two drive mechanisms 290 are disposed in a symmetrical fashion, with respect to the mirror section 110 and inner frame 120, each comprising a comb tooth-shaped electrode 291 and a comb tooth-shaped electrode 295. The comb tooth-shaped electrode 291 is a region originating principally in the first silicon layer, and it has a base section 292 which is fixed to the inner frame 120, and a plurality of electrode teeth 292 which project from this base section 293. The comb tooth-shaped electrode 295 has a laminated structure consisting of a conductor section 295a, a conductor section 295b, and an insulating section 295c for electrically separating the two conductor sections, and also has a base section 296 which is fixed to the outer frame 130 and projects in an inward direction, and a plurality of electrode teeth 297 which project from this base section 296. The conductor sections 295a, 295b are regions which originate respectively in the first and second silicon layers. When the element is not driven in rotation, the comb tooth-shaped electrode 291 and the base section 295b of the comb tooth-shaped electrode 295 are positioned at mutually different heights, as illustrated by FIG. 13A and FIG. 15A. Moreover, the comb tooth-shaped electrodes 291, 295 are disposed in a state whereby their respective electrode teeth 293, 297 lie in mutually displaced positions, such that they do not make contact with each other.

In the micro-mirror element X2, by applying prescribed electric potentials, as and when necessary, to the comb tooth-shaped electrodes 261, 271, 281, 291, the conductor sections 265a, 265b of the comb tooth-shaped electrodes 265, the conductor sections 275a, 275b of the comb tooth-shaped electrodes 275, the conductor sections 285a, 285b of the comb tooth-shaped electrodes 285, and the conductors sections 295a, 295b of the comb tooth-shaped electrodes 295, it is possible to cause the mirror section 110 to perform rotational operation about the axis of rotation A1.

FIG. 16 shows one example of a drive mode for the micro-mirror element X2. FIG. 16A shows the change over time of the voltage applied to the conductor sections 265b of the comb tooth-shaped electrodes 265 of the drive mechanisms 260 and the conductor sections 285b of the comb tooth-shaped electrodes 285 of the drive mechanisms 280. FIG. 16B shows the change over time of the voltage applied to the conductor sections 275b of the comb tooth-shaped electrodes 275 of the drive mechanisms 270 and the conductor sections 295b of the comb tooth-shaped electrodes 295 of the drive mechanisms 290. FIG. 16C shows the change over time of the voltage applied to the conductor sections 265a of the comb tooth-shaped electrodes 265 of the drive mechanisms 260, the conductor section 275a of the comb tooth-shaped electrodes 275 of the drive mechanisms 270, the conductor sections 285a of the comb tooth-shaped electrodes 285 of the drive mechanisms 280, and the conductor sections 295a of the comb tooth-shaped electrodes 295 of the drive mechanisms 290. In the respective graphs in FIG. 16A–FIG. 16C, the time (t) is represented on the horizontal axis, and the applied voltage (v) is represented on the vertical axis. In the present drive mode, the comb tooth-shaped electrodes 261, 271, 281, 291 are connected to ground. Furthermore, FIG. 16D shows the change over time of the angle of rotation of the mirror section 110 in the present drive mode. In the graph in FIG. 16D, time (t) is represented on the horizontal axis, and the angle of rotation (θ) is represented on the vertical axis.

Figure 16A:
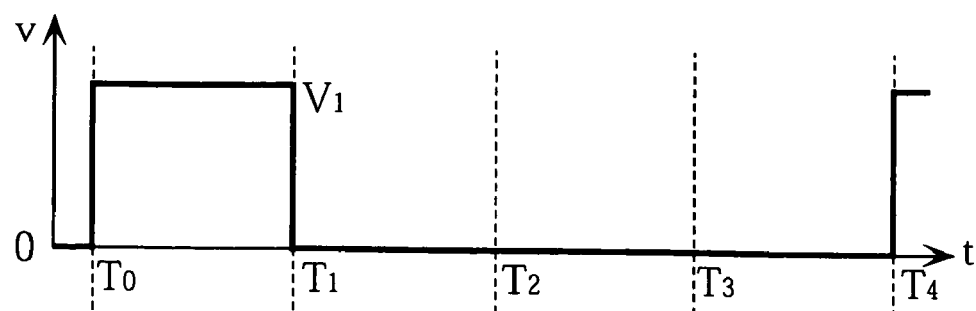
FIGS. 16A–16D show one example of a drive mode of the micro-mirror element in FIG. 9.

In the present drive mode, firstly, a prescribed voltage $V_1$ is applied between time $T_0$ and time $T_1$, as shown in FIG. 16A, to the conductor sections 265b, 285b of the respective comb tooth-shaped electrodes 265, 285 of the micro-mirror element X2 in an initial state (where the angle of rotation of the mirror section 110 is 0°) at time $T_0$, such that the rotational displacement of the mirror section 110 reaches a maximum angle of rotation $θ_1$ at time $T_1$. Between time $T_0$ and $T_1$, an electrostatic attraction is generated between the each comb tooth-shaped electrode 261 and the conductor section 265b, and between each comb tooth-shaped electrode 281 and the conductor section 285b, and the angle of rotation of the mirror section 110 increases continuously in a first direction. At time $T_1$, the drive mechanisms 260 assume the orientation illustrated in FIG. 10B and FIG. 11B, for example, and the drive mechanisms 280 assume the orientation illustrated in FIG. 13B and FIG. 14B, for example, whilst the angle of rotation reaches $θ_1$, as illustrated in FIG. 16D. In this case, a prescribed twisting reaction is generated in the connecting sections 140, 150.

Figure 16B:
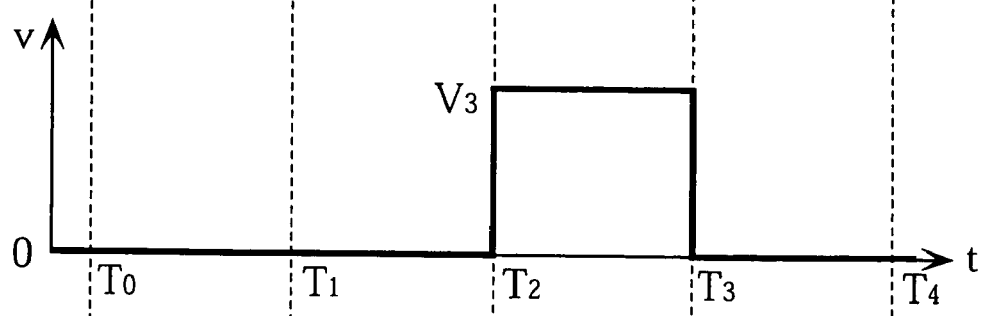

Next, between time $T_1$ and time $T_2$, the voltage applied to the conductor sections 265b, 285b is set substantially to zero, and a prescribed voltage $V_2$ is applied to the respective conductor sections 265a, 275a, 285a, 295a, as illustrated in FIG. 16B. During this time period, in addition to the twisting reactions of the connecting sections 140, 150 acting as restoring forces, an electrostatic attraction is generated between the comb tooth-shaped electrode 261 and the conductor section 265b, between the comb tooth-shaped electrode 271 and the conductor section 275b, between the comb tooth-shaped electrode 281 and the conductor section 285b, and between the comb tooth-shaped electrode 291 and the conductor section 295b, and hence the angle of rotation of the mirror section 110 decreases continuously. At time $T_2$, the drive mechanisms 260, 270 assume the orientation illustrated in FIG. 10A, FIG. 11A and FIG. 12A, and the drive mechanisms 280, 290 assume the orientation illustrated in FIG. 13A, FIG. 14A and FIG. 15A, whilst the angle of rotation reaches 0° as illustrated in FIG. 16D.

Thereupon, between time $T_2$ and time $T_3$, a prescribed voltage $V_3$ is applied to the respective conductor sections 275b, 295b, and the voltage applied to the respective conductor sections 265a, 275a, 285a, 295a is set substantially to 0V, as illustrated in FIG. 16B, such that the rotational displacement of the mirror section 110 reaches a maximum angle of rotation $\theta_2$ at time $T_3$. Between time $T_2$ and $T_3$, an electrostatic attraction is generated between each comb tooth-shaped electrode 271 and the conductor section 275b, and between each comb tooth-shaped electrode 291 and the conductor section 295b, and the angle of rotation of the mirror section 110 increases continuously in a second direction which is opposite to the first direction. At time $T_3$, the drive mechanisms 270 assume the orientation illustrated in FIG. 10C and FIG. 12B, for example, and the drive mechanisms 290 assume the orientation illustrated in FIG. 13C and FIG. 15B, for example, whilst the angle of rotation reaches $\theta_2$ as illustrated in FIG. 16D. In this case, a prescribed twisting reaction is generated in the connecting sections 140, 150.

Figure 16C:
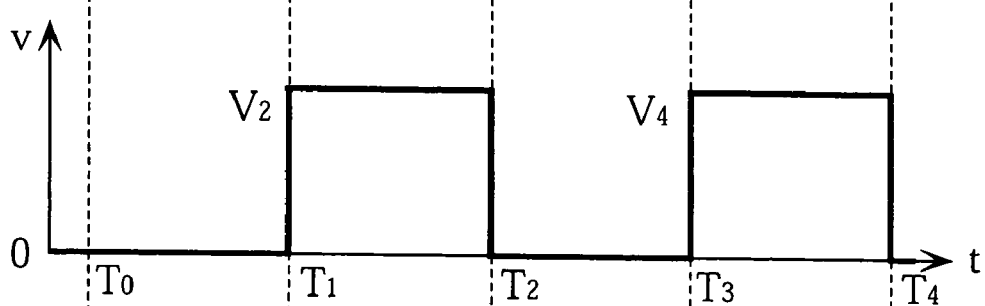
Figure 16D:
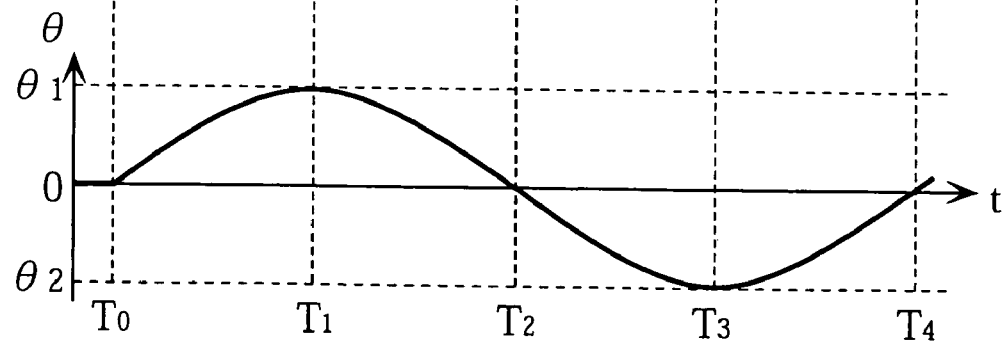

Next, between time $T_3$ and time $T_4$, the voltage applied to the conductor sections 275b, 295b is set substantially to zero, and a prescribed voltage $V_4$ is applied to the respective conductor sections 265a, 275a, 285a, 295a, as illustrated in FIG. 16C. During this time period, in addition to the twisting reactions of the connecting sections 140, 150 acting as restoring forces, an electrostatic attraction is generated between the comb tooth-shaped electrode 261 and the conductor section 265b, between the comb tooth-shaped electrode 271 and the conductor section 275b, between the comb tooth-shaped electrode 281 and the conductor section 285b, and between the comb tooth-shaped electrode 291 and the conductor section 295b, and hence the angle of rotation of the mirror section 110 decreases continuously. At time $T_4$, the drive mechanisms 260, 270 assume the orientation illustrated in FIG. 10A, FIG. 11A and FIG. 12A, and the drive mechanisms 280, 290 assume the orientation illustrated in FIG. 13A, FIG. 14A and FIG. 15A, whilst the angle of rotation reaches $\theta_2$ as illustrated in FIG. 16D. The sequence of operations described above, from time To to time $T_4$, are repeated, according to requirements.

In the present drive mode, preferably, the voltage $V_1$ and the voltage $V_3$ are the same, the voltage $V_2$ and the voltage $V_4$ are the same, and the absolute value of the angle of rotation $\theta_1$ is the same as the absolute value of the angle of rotation $\theta_2$. Moreover, preferably, the voltages $V_2$ and $V_4$ are less than the voltages $V_1$ and $V_3$. Moreover, preferably, the respective periods between time $T_0$ and time $T_1$, between time $T_1$ and time $T_2$, between time $T_2$ and time $T_3$, and between time $T_3$ and time $T_4$ are set to the same length, and each constitute respectively one quarter of a cycle of the rotational operation of the mirror section 110. In this way, it is possible to achieve a cyclical rotational operation of the mirror section 110 of the micro-mirror element X2.

In the micro-mirror element X2, the stroke of the drive mechanisms 280 and the stroke of the drive mechanisms 260, or the stroke of the drive mechanisms 290 and the stroke of the drive mechanisms 270, are mutually superimposed and thus a long stroke is ensured. Since an effectively long stroke is ensured by superimposition of the strokes of two types of drive mechanisms, then it is possible to form the respective drive mechanisms formed by sets of comb tooth-shaped electrodes, for example, to a relatively thin size (to a relatively short length in the direction of rotational operation). Therefore, the movable section (mirror section 110 and inner frame 120) which tends to be formed to a thickness that reflects the thickness of the drive mechanisms, can be formed to a relatively thin size. The thinner the movable section, the lighter the weight thereof, and hence the more suitable it is for achieving high speeds of operation. In this way, the micro-mirror element X2 is suitable for achieving a high speed of operation for rotational operations of the mirror section 110 involving large amounts of rotational displacement.

In the micro-mirror element X2, by disposing the drive mechanisms 260 and the drive mechanisms 280 electrically in parallel, and disposing the drive mechanisms 270 and the drive mechanisms 290 electrically in parallel, it is possible to simplify the control of the rotational drive operation. For example, if the respective comb tooth-shaped electrodes 261 and the respective comb tooth-shaped electrodes 281 are disposed electrically in parallel, the conductor sections 265a of the respective comb tooth-shaped electrodes 265 and the conductor sections 285a of the respective comb tooth-shaped electrodes 285 are disposed electrically in parallel, and the conductor sections 265b of the respective comb tooth-shaped electrodes 265 and the conductor sections 285b of the respective comb tooth-shaped electrodes 285 are disposed electrically in parallel, then when driving rotation, the same electric potential will be supplied simultaneously to all of the comb tooth-shaped electrodes 261, 281, simultaneously, the same electric potential will be supplied simultaneously to all of the conductor sections 265a, 285a, and the same electric potential will be supplied simultaneously to all of the conductor sections 265b, 285b, and consequently it is possible to perform common control of the drive mechanisms 260, 280. Moreover, if the respective comb tooth-shaped electrodes 271 and the respective comb tooth-shaped electrodes 291 are disposed electrically in parallel, the conductor sections 275a of the respective comb tooth-shaped electrodes 275 and the conductor sections 295a of the respective comb tooth-shaped electrodes 295 are disposed electrically in parallel, and the conductor sections 275b of the respective comb tooth-shaped electrodes 275 and the conductor sections 295b of the respective comb tooth-shaped electrodes 295 are disposed electrically in parallel, then when driving rotation, the same electric potential will be supplied simultaneously to all of the comb tooth-shaped electrodes 271, 291, simultaneously, the same electric potential will be supplied simultaneously to all of the conductor sections 275a, 295a, and the same electric potential will be supplied simultaneously to all of the conductor sections 275b, 295b, and consequently it is possible to perform common control of the drive mechanisms 270, 290.

In a design in which the maximum relative angle of rotational displacement of the mirror section 110 with respect to the inner frame 120 that can be achieved by means of the drive mechanisms 260, 270, and the maximum relative angle of rotational displacement of the inner frame 120 with respect to the outer frame 130 that can be achieved by means of the drive mechanisms 280, 290, are set so as to be equal, if the drive mechanisms 260, 280 are controlled commonly as described above, for example, and if the drive mechanisms 270, 290 are controlled commonly as described above, for example, then taking the twisting spring constant of the connecting sections 140, 150 to be $k_1$ and $k_2$ respectively, and the rotational torque generated by the drive mechanisms 260, 270 and the drive mechanisms 280, 290 to be $T_1$ and $T_2$, respectively, it is possible to control the drive mechanisms with the greatest level of efficiency when the conditions in equation (1) above are satisfied. On the other hand, in a design in which the ratio between the maximum relative angle of rotational displacement of the mirror section 110 with respect to the inner frame 120 that can be achieved by means of the drive mechanisms 260, 270, and the maximum relative angle of rotational displacement of the inner frame 120 with respect to the outer frame 130 that can be achieved by means of the drive mechanisms 280, 290, is set to be 1:a, if the drive mechanisms 260, 280 are controlled commonly as described above, for example, and if the drive mechanisms 270, 290 are controlled commonly as described above, for example, then taking the twisting spring constant of the connecting sections 140, 150 to be $k_1$ and $k_2$ respectively, and the rotational torque generated by the drive mechanisms 260, 270 and the drive mechanisms 280, 290 to be $T_1$ and $T_2$, respectively, it is possible to control the drive mechanisms with the greatest level of efficiency when the conditions in equation (2) above are satisfied.

Figure 17:
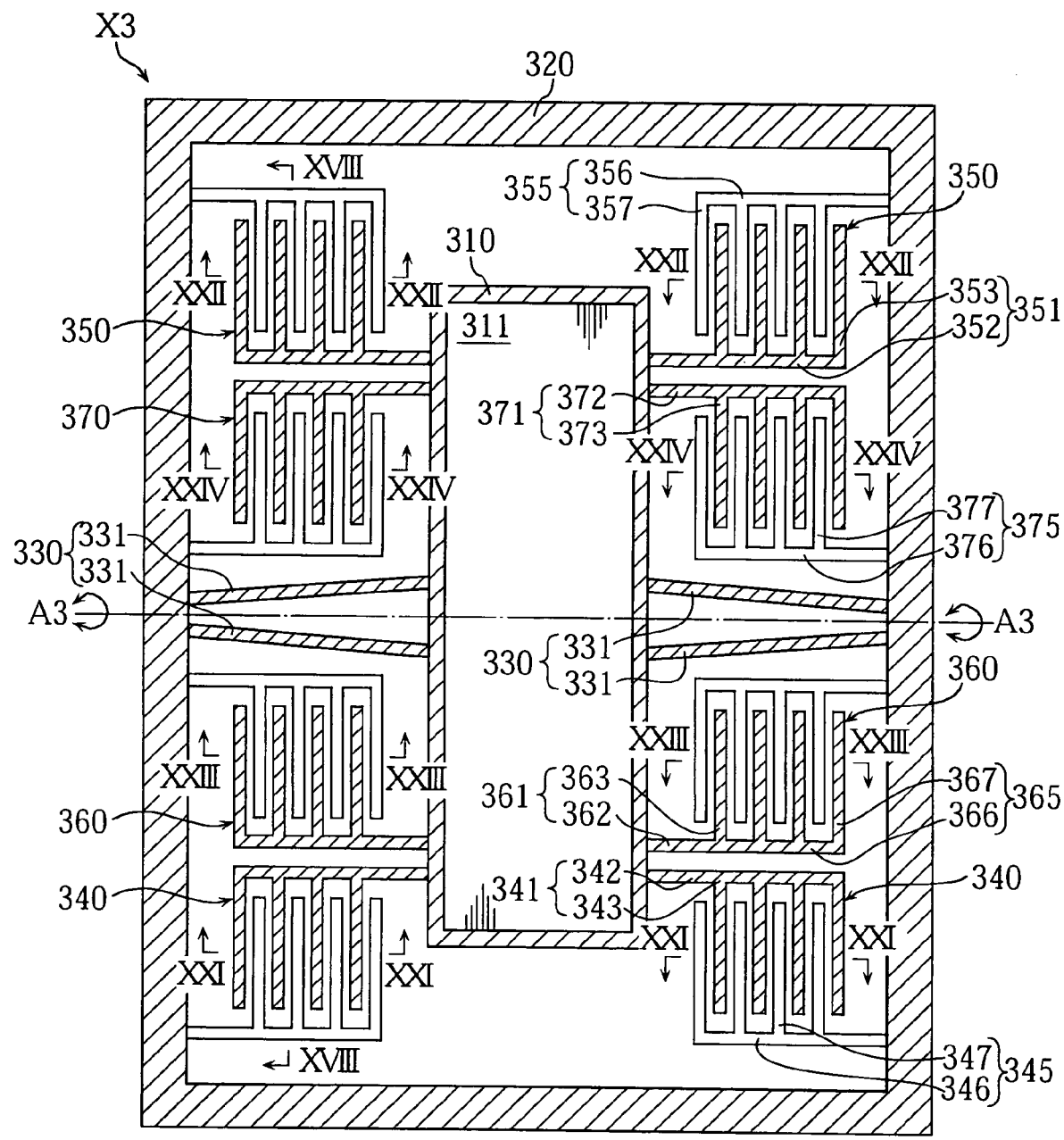
FIG. 17 is a plan view of a micro-mirror element according to a third embodiment of the present invention.
Figure 18:
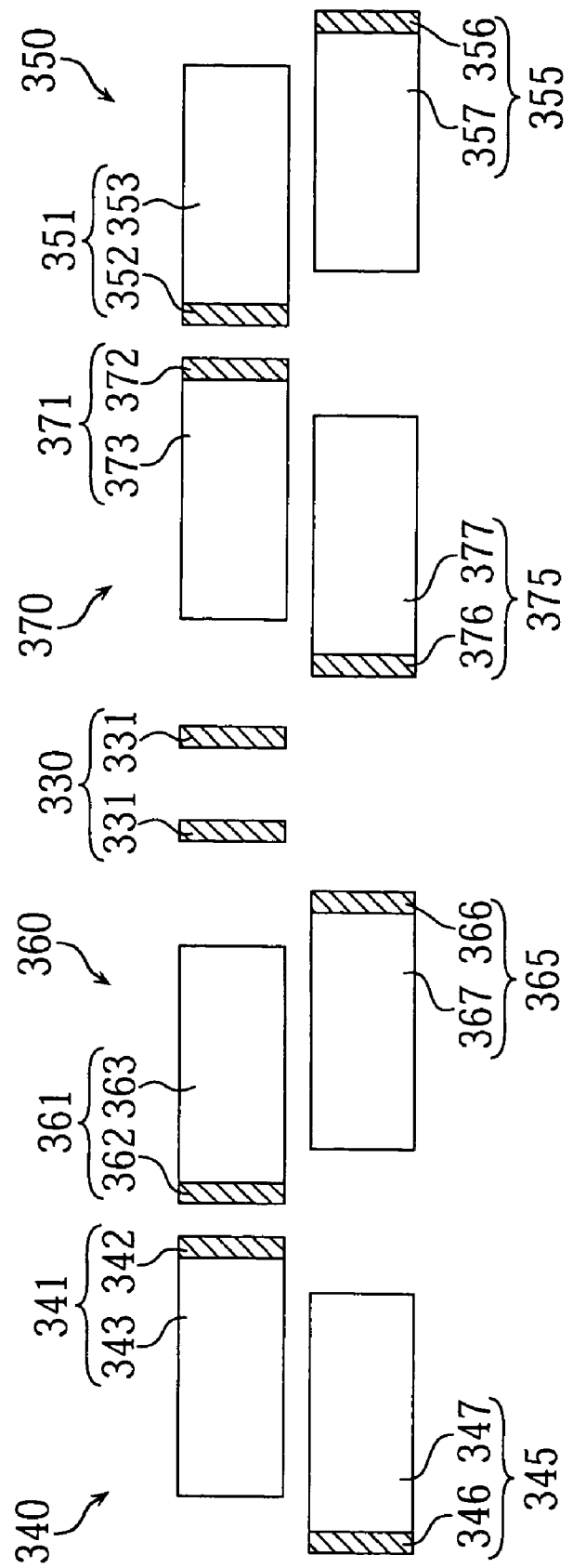
FIG. 18 is a cross-sectional view along line XVIII—XVIII in FIG. 17.

FIG. 17–FIG. 24 show a micro-mirror element X3 according to a third embodiment of the present invention. FIG. 17 is a plan view of the micro-mirror element X3, and FIG. 18 to FIG. 20 are cross-sectional views along line XVIII—XVIII in FIG. 17. Furthermore, FIG. 21 to FIG. 24 are cross-sectional views along line XXI—XXI, line XXII—XXII, line XXIII—XXIII, line XXIV—XXIV and line XV—XV in FIG. 17, respectively.

The micro-mirror element X3 comprises a mirror section 310, a frame 320, a pair of connecting sections 330, and respective pairs of drive mechanisms 340, 350, 360, 370. Moreover, similarly to the micro-mirror element X1, the micro-mirror element X3 is manufactured by carrying out processing on a material substrate, which is an SOI substrate having a prescribed laminated structure, by means of a bulk micro-machining technology, such as MEMS technology, or the like. The material substrate has a laminated structure consisting, for example, of first and second silicon layers, and an insulating layer interposed between these silicon layers, a prescribed type of conductivity being imparted to the respective silicon layers by doping with an impurity. For the purpose of clarifying the diagrams, in FIG. 17, the areas originating in the first silicon layer which project in the direction of the reader beyond the insulating layer are marked by diagonal hatching (with the exception of the mirror surface 311).

The mirror section 310 is a region formed principally in the first silicon layer, and it has a mirror surface 311 having a light reflecting function, on the front surface thereof. The mirror surface 311 has a laminated structure consisting of a Cr layer formed on the first silicon layer, and an Ar layer formed on the Cr layer. The mirror surface 310 of this kind forms the movable section of the present invention. The frame 320 is a region formed principally in the first silicon layer, in such a state that it surrounds the mirror section 310.

The pair of connecting sections 330 are regions formed in the first silicon layer, and consist respectively of two torsion bars 331. The respective torsion bars 331 are connected to the mirror section 310 and the frame 320, thus linking same together. The interval between the two torsion bars 330 of the respective connecting sections 331 gradually increases from the frame 320 side towards the mirror section 310 side. The pair of connecting sections 330 of this kind define an axis A3 for the rotational operation of the mirror section 310 with respect to the frame 320. Preferably, the connecting sections 330 which are constituted by two torsion bars 331, the interval between which gradually increases from the frame 320 side towards the mirror section 310 side, prevent unwanted displacement in the rotational operation of the mirror section 310. Furthermore, it is also possible to constitute the connecting sections 330 such that two different electric potentials can be applied from the frame 320 to the mirror section 310, via the two torsion bars 331.

Figure 21A:
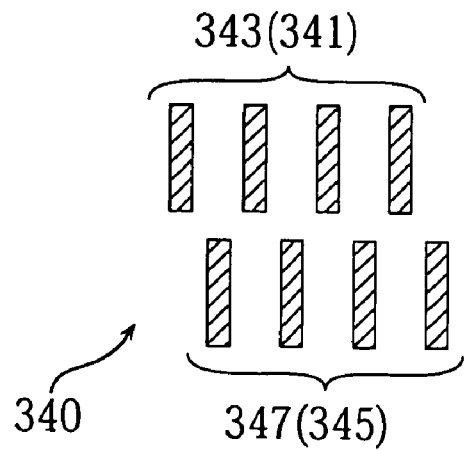
FIGS. 21A–21C are cross-sectional views along line XXI—XXI in FIG. 17.

Two drive mechanisms 340 are disposed in a symmetrical fashion, with respect to the mirror section 310, each comprising a comb tooth-shaped electrode 341 and comb tooth-shaped electrode 345. The comb tooth-shaped electrode 341 is a region originating principally in the first silicon layer, and it has a base section 342 which is fixed to the mirror section 310, and a plurality of electrode teeth 343 which project from this base section 342. The comb tooth-shaped electrode 345 is a region originating principally in the second silicon layer, and it has a base section 346 which is fixed to the frame 320 and projects in an inward direction, and a plurality of electrode teeth 347 which project from this base section 346. When the element is not driven in rotation, the comb tooth-shaped electrodes 341, 345 are positioned at mutually different heights, as illustrated by FIG. 18 and FIG. 21A. Moreover, the comb tooth-shaped electrodes 341, 345 are disposed in a state whereby their respective electrode teeth 343, 347 lie in mutually displaced positions, such that they do not make contact with each other when the element is driven in rotation.

Figure 22A:
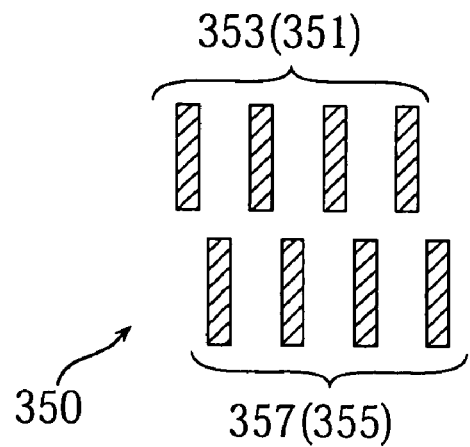
FIGS. 22A–22C are cross-sectional view along line XXII—XXII in FIG. 17.

Two drive mechanisms 350 are disposed in a symmetrical fashion, with respect to the mirror section 310, each comprising a comb tooth-shaped electrode 351 and comb tooth-shaped electrode 355. The comb tooth-shaped electrode 351 is a region originating principally in the first silicon layer, and it has a base section 352 which is fixed to the mirror section 310, and a plurality of electrode teeth 353 which project from this base section 352. The comb tooth-shaped electrode 355 is a region originating principally in the second silicon layer, and it has a base section 356 which is fixed to the frame 320 and projects in an inward direction, and a plurality of electrode teeth 357 which project from this base section 356. When the element is not driven in rotation, the comb tooth-shaped electrodes 351, 355 are positioned at mutually different heights, as illustrated by FIG. 18 and FIG. 22A. Moreover, the comb tooth-shaped electrodes 351, 355 are disposed in a state whereby their respective electrode teeth 353, 357 lie in mutually displaced positions, such that they do not make contact with each other when the element is driven in rotation.

Figure 23A:
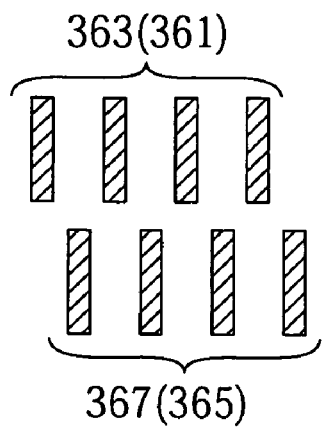
FIGS. 23A–23C are cross-sectional views along line XXIII—XXIII in FIG. 17.

Two drive mechanisms 360 are disposed in a symmetrical fashion, with respect to the mirror section 310, each comprising a comb tooth-shaped electrode 361 and comb tooth-shaped electrode 365. The comb tooth-shaped electrode 361 is a region originating principally in the first silicon layer, and it has a base section 362 which is fixed to the mirror section 310, and a plurality of electrode teeth 363 which project from this base section 362. The comb tooth-shaped electrode 365 is a region originating principally in the second silicon layer, and it has a base section 366 which is fixed to the frame 320 and projects in an inward direction, and a plurality of electrode teeth 367 which project from this base section 366. When the element is not driven in rotation, the comb tooth-shaped electrodes 361, 365 are positioned at mutually different heights, as illustrated by FIG. 18 and FIG. 23A. Moreover, the comb tooth-shaped electrodes 361, 365 are disposed in a state whereby their respective electrode teeth 363, 367 lie in mutually displaced positions, such that they do not make contact with each other when the element is driven in rotation.

Figure 24A:
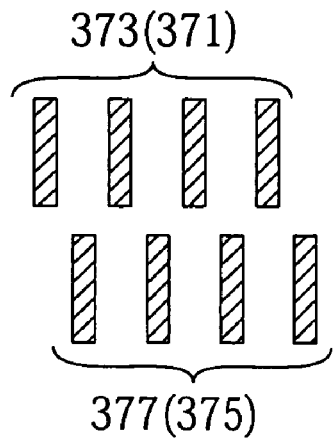
FIGS. 24A–24C are cross-sectional views along line XXIV—XXIV in FIG. 17.

Two drive mechanisms 370 are disposed in a symmetrical fashion, with respect to the mirror section 310, each comprising a comb tooth-shaped electrode 371 and comb tooth-shaped electrode 375. The comb tooth-shaped electrode 371 is a region originating principally in the first silicon layer, and it has a base section 372 which is fixed to the mirror section 310, and a plurality of electrode teeth 373 which project from this base section 372. The comb tooth-shaped electrode 375 is a region originating principally in the second silicon layer, and it has a base section 376 which is fixed to the frame 320 and projects in an inward direction, and a plurality of electrode teeth 377 which project from this base section 376. When the element is not driven in rotation, the comb tooth-shaped electrodes 371, 375 are positioned at mutually different heights, as illustrated by FIG. 18 and FIG. 24A. Moreover, the comb tooth-shaped electrodes 371, 375 are disposed in a state whereby their respective electrode teeth 373, 377 lie in mutually displaced positions, such that they do not make contact with each other when the element is driven in rotation.

In the micro-mirror element X3, by applying prescribed electric potentials, as and when necessary, to the respective comb tooth-shaped electrodes 341, 345, 351, 355, 361, 365, 371, 375, it is possible to cause the mirror section 310 to rotate about the axis of rotation A3.

Figure 21B:
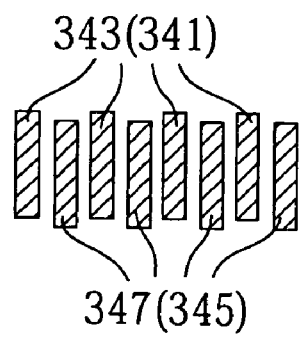
Figure 21C:
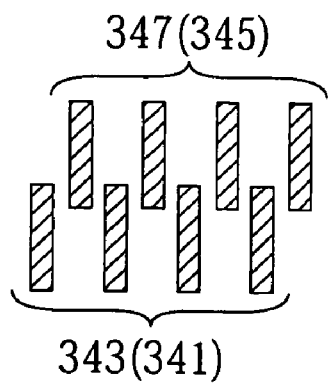
Figure 22B:
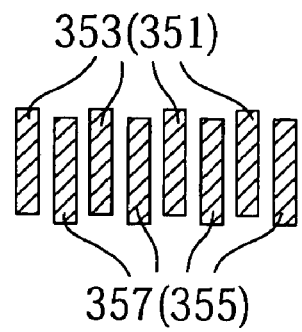
Figure 22C:
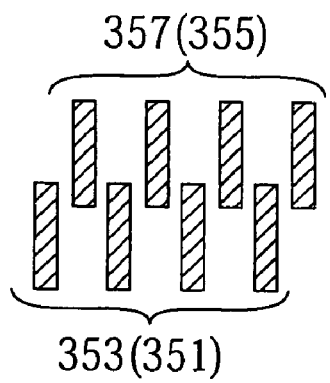
Figure 23B:
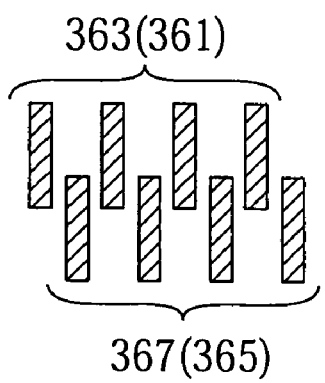
Figure 23C:
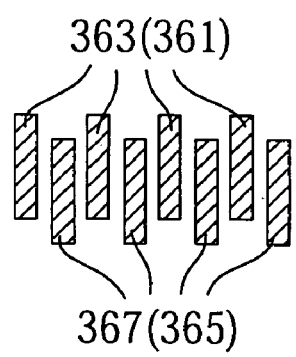
Figure 24B:
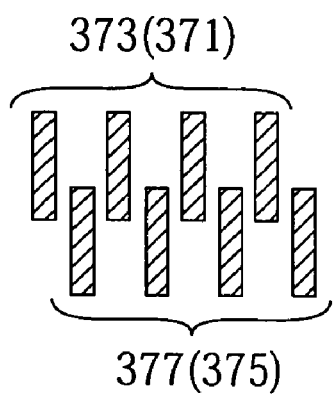
Figure 24C:
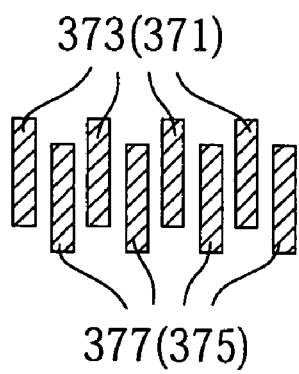

For example, by applying a prescribed electric potential to the comb tooth-shaped electrodes 341, 345 of the drive mechanisms 340, a prescribed electrostatic attraction is generated between the comb tooth-shaped electrodes 341, 345, and by applying a prescribed electric potential to the comb tooth-shaped electrodes 361, 365 of the drive mechanisms 360, a prescribed electrostatic attraction is generated between the comb tooth-shaped electrodes 361, 365, whereby the comb tooth-shaped electrodes 341 are respectively drawn inside the comb tooth-shaped electrodes 345, and the comb tooth-shaped electrodes 361 are respectively drawn inside the comb tooth-shaped electrodes 365, such that the drive mechanisms 340, 360 each assume the orientations illustrated in FIG. 19A, FIG. 21B and FIG. 23B, for example. By this means, the mirror section 310 performs rotational operation about the axis of rotation A3, with respect to the frame 320. The amount of rotational displacement performed in this rotational operation can be governed by adjusting the applied electric potential. Rotational drive of the mirror section 310 in the opposite direction about the axis of rotation A3 can be achieved as illustrated in FIG. 20A, FIG. 22B and FIG. 24B, for example, by generating a prescribed electrostatic attraction by means of the drive mechanisms 350, 370, in a similar manner to the operation described above with respect to the drive mechanisms 340, 360. By driving rotation of the mirror section 310 in two directions in this fashion, it is possible to switch the direction of reflection of the light reflected by the mirror surface 311 provided on the mirror section 310, as appropriate.

FIG. 25 shows one example of a drive mode for the micro-mirror element X3. FIG. 25A illustrates the change over time of the voltage applied to the comb tooth-shaped electrodes 345 of the drive mechanisms 340. FIG. 25B illustrates the change over time of the voltage applied to the comb tooth-shaped electrodes 365 of the drive mechanisms 360. FIG. 25C illustrates the change over time of the voltage applied to the comb tooth-shaped electrodes 355 of the drive mechanisms 350. FIG. 25D illustrates the change over time of the voltage applied to the comb tooth-shaped electrodes 375 of the drive mechanisms 370. In the respective graphs in FIG. 25A–FIG. 25D, the time (t) is represented on the horizontal axis, and the applied voltage (v) is represented on the vertical axis. In the present drive mode, the comb tooth-shaped electrodes 341, 351, 361, 371 are connected to ground. Furthermore, FIG. 25E shows the change over time of the angle of rotation of the mirror section 310 in the present drive mode. In the graph in FIG. 25E, time (t) is represented on the horizontal axis, and the angle of rotation ($\theta$) is represented on the vertical axis.

Figure 25A:
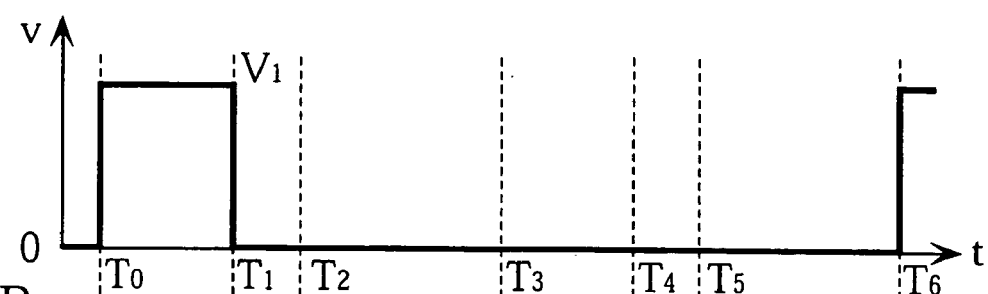
FIGS. 25A–25E show one example of a drive mode of the micro-mirror element in FIG. 17.
Figure 25B:
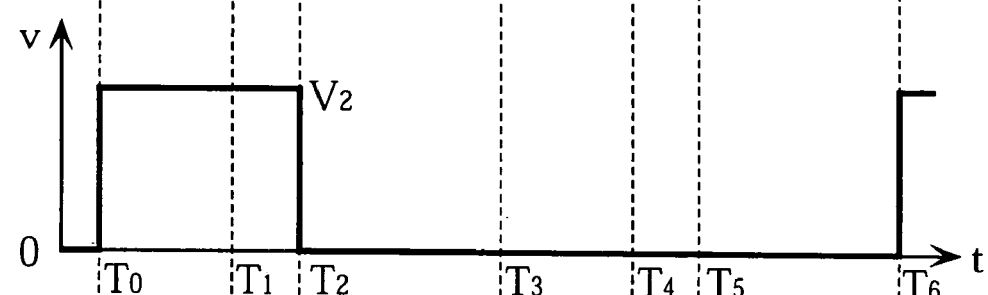

In the present drive mode, firstly, between time $T_0$ and $T_1$, a prescribed voltage $V_1$ is applied to the comb tooth-shaped electrodes 345 as illustrated in FIG. 25A, and between $T_0$ and $T_2$, a prescribed voltage $V_2$ is applied to the comb tooth-shaped electrodes 365 as illustrated in FIG. 25B, such that the rotational displacement of the mirror section 310, which is in an initial state (angle of rotation of 0°) at time $T_0$, reaches a maximum angle of rotation $\theta_1$ at time $T_2$. Between time $T_0$ and time $T_1$, an electrostatic attraction is generated between the comb tooth-shaped electrodes 341, 345 and between the comb tooth-shaped electrodes 361, 365, and the angle of rotation of the mirror section 310 increases continuously in a first direction, and at time $T_1$, the drive mechanisms 340, 360 assume the orientation illustrated in FIG. 19A, FIG. 21B and FIG. 23B, for example. At time $T_1$, prior to the time at which the rotational displacement (for example, $\theta_1$'), which can be generated in the drive mechanisms 340 by a driving force (driving torque) in a second direction opposite to the first direction, is reached, the voltage applied to the comb tooth-shaped electrodes 345 is set substantially to 0V. Between time $T_1$ and $T_2$, an electrostatic attraction is generated between the comb tooth-shaped electrodes 361, 365, and the angle of rotation of the mirror section 310 increases continuously in a first direction. At time $T_2$, the drive mechanisms 340, 360 assume the orientation illustrated in FIG. 19B, FIG. 21C and FIG. 23C, for example, and the angle of rotation reaches $\theta_1$, as illustrated in FIG. 25E. In this case, a prescribed twisting reaction is generated in the connecting sections 330.

Thereupon, at time $T_2$, the voltage applied to the respective comb tooth-shaped electrodes 365 is set substantially to 0V. Subsequently, between time $T_2$ and $T_3$, the twisting reaction of the connecting sections 330 acts as a restoring force, and the angle of rotation decreases continuously. At time $T_3$, the angle of rotation reaches 0°, as illustrated in FIG. 25E.

Figure 25C:
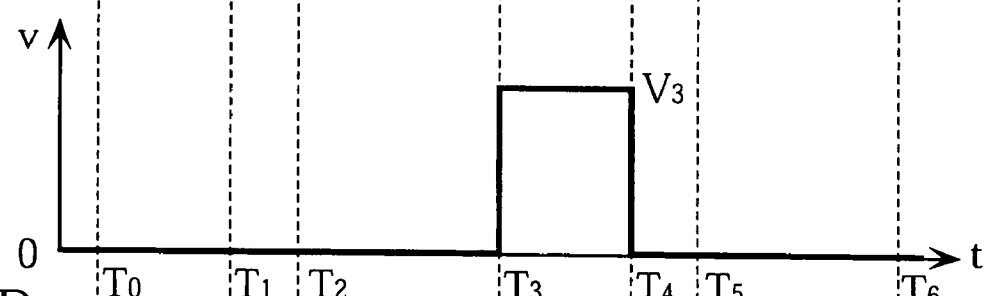
Figure 25D:
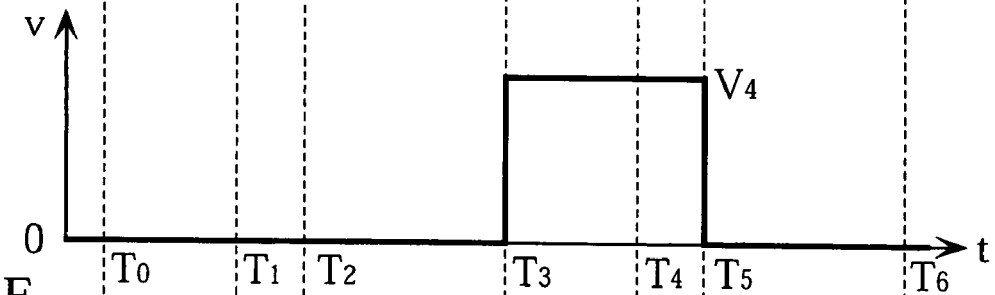
Figure 25E:
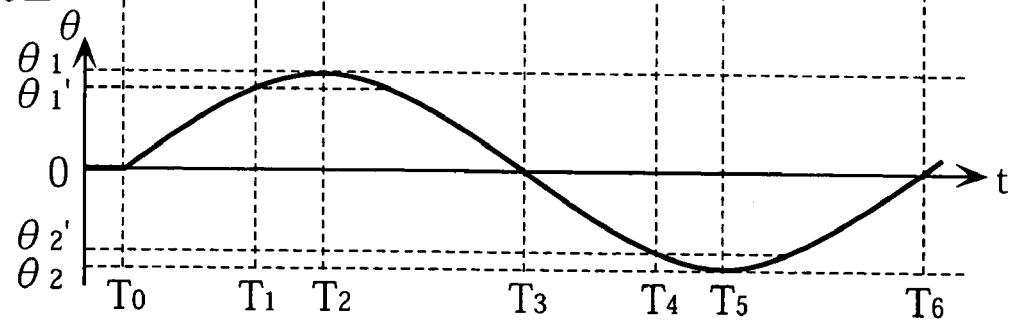

Thereupon, between time $T_3$ and time $T_4$, a prescribed voltage $V_3$ is applied to the comb tooth-shaped electrodes 355 as illustrated in FIG. 25C, and between $T_3$ and $T_5$, a prescribed voltage $V_4$ is applied to the comb tooth-shaped electrodes 375 as illustrated in FIG. 25D, such that the rotational displacement of the mirror section 310 reaches a maximum angle of rotation $\theta_2$ at time $t_5$. Between time $T_3$ and time $T_4$, an electrostatic attraction is generated between the comb tooth-shaped electrodes 351, 355 and between the comb tooth-shaped electrodes 371, 375, and the angle of rotation of the mirror section 310 increases continuously in a second direction, and at time $T_4$, the drive mechanisms 350, 370 assume the orientation illustrated in FIG. 20A, FIG. 22B and FIG. 24B, for example. At time $T_4$, prior to the time at which the rotational displacement (for example, $\theta_2$'), which can be generated in the drive mechanisms 350 by a driving force (driving torque) in a first direction opposite to the second direction, is reached, the voltage applied to the comb tooth-shaped electrodes 355 is set substantially to 0V. Between time $T_4$ and time $T_5$, an electrostatic attraction is generated between the comb tooth-shaped electrodes 371, 375, and the angle of rotation of the mirror section 310 increases continuously in the second direction. At time $T_5$, the drive mechanisms 350, 370 assume the orientation illustrated in FIG. 20B, FIG. 22C and FIG. 24C, for example, and the angle of rotation reaches $\theta_2$, as illustrated in FIG. 25E. In this case, a prescribed twisting reaction is generated in the connecting sections 330.

Thereupon, at time $T_5$, the voltage applied to the respective comb tooth-shaped electrodes 375 is set substantially to 0V. Subsequently, between time $T_5$ and $T_6$, the twisting reaction of the connecting sections 330 acts as a restoring force, and the angle of rotation decreases continuously. At time $T_6$, the angle of rotation reaches $\theta_1$, as illustrated in FIG. 25E. The sequence of operations described above, from time $T_0$ to time $T_6$, are repeated, according to requirements.

In the present drive mode, preferably, the voltage $V_1$ and the voltage $V_3$ are the same, the voltage $V_2$ and the voltage $V_4$ are the same, and the absolute value of the angle of rotation $\theta_1$ is the same as the absolute value of the angle of rotation $\theta_2$. Moreover, the respective periods between time $T_0$ and time $T_2$, between time $T_2$ and time $T_3$, between time $T_3$ and time $T_5$, and between time $T_5$ and time $T_6$, are preferably set to the same length, and each constitute respectively one quarter a cycle of the rotational operation of the mirror section 310. In this way, it is possible to achieve a cyclical rotational operation of the mirror section 310 of the micro-mirror element X3.

FIG. 26 shows a further example of a drive mode for the micro-mirror element X3. FIG. 26A illustrates the change over time of the voltage applied to the comb tooth-shaped electrodes 345 of the drive mechanisms 340. FIG. 26B illustrates the change over time of the voltage applied to the comb tooth-shaped electrodes 365 of the drive mechanisms 360. FIG. 26C illustrates the change over time of the voltage applied to the comb tooth-shaped electrodes 355 of the drive mechanisms 350. FIG. 26D illustrates the change over time of the voltage applied to the comb tooth-shaped electrodes 375 of the drive mechanisms 370. In the respective graphs in FIG. 26A–FIG. 26D, the time (t) is represented on the horizontal axis, and the applied voltage (v) is represented on the vertical axis. In the present drive mode, the comb tooth-shaped electrodes 341, 351, 361, 371 are connected to ground. Furthermore, FIG. 26E shows the change over time of the angle of rotation of the mirror section 310 in the present drive mode. In the graph in FIG. 26E, time (t) is represented on the horizontal axis, and the angle of rotation ($\theta$) is represented on the vertical axis. The present drive mode differs from the drive modes described above with reference to FIG. 25 in that there are additional periods in which a voltage is applied to the comb tooth-shaped electrodes 345, 355.

Figure 26A:
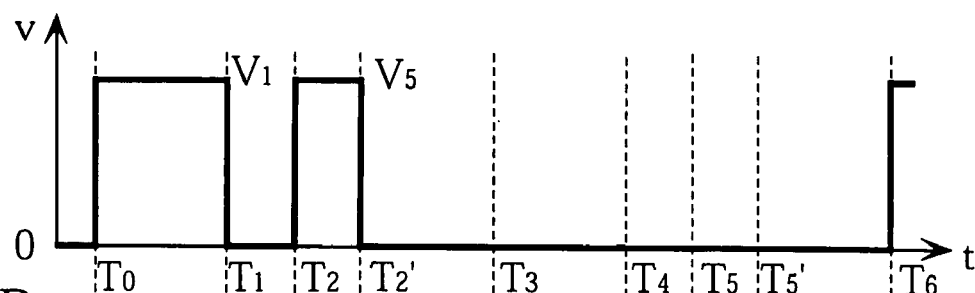
FIGS. 26A–26E show a further example of a drive mode of the micro-mirror element in FIG. 17.
Figure 26B:
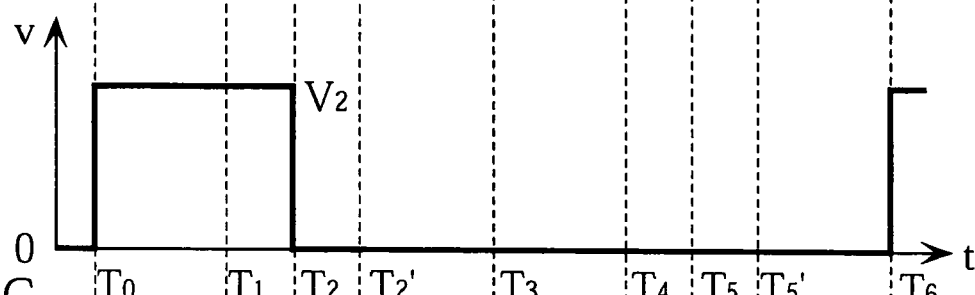

In the present drive mode, a prescribed voltage $V_5$ is applied to the comb tooth-shaped electrodes 345 between time $T_2$ and time $T_2'$, as illustrated in FIG. 26A. During this period, the twisting forces of the connecting sections 330 act as restoring forces, in addition to which an electrostatic attraction is generated between the comb tooth-shaped electrodes 341, 345, as a driving force in the second direction, and the angle of rotation of the mirror section 310 decreases continuously. At time $T_2'$, the drive mechanisms 340, 360 assume the orientation shown in FIG. 19A, FIG. 21B and FIG. 23B, for example. At time $T_2'$, prior to the time at which the rotational displacement (for example, $\theta_1'$), which can be generated in the drive mechanisms 340 by a driving force (driving torque) in a first direction opposite to the second direction, is reached, the voltage applied to the comb tooth-shaped electrodes 345 is set substantially to 0V.

Figure 26C:
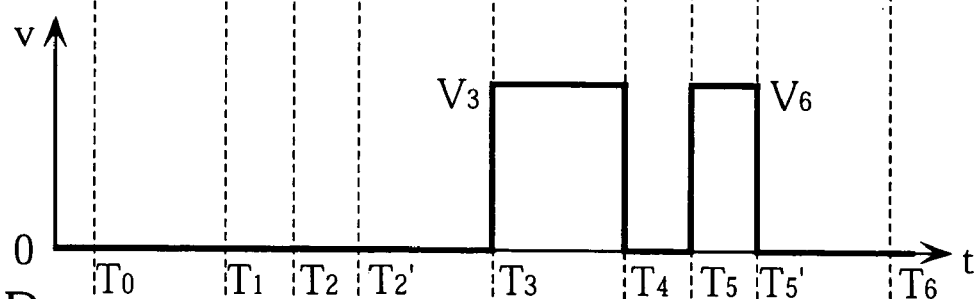
Figure 26D:
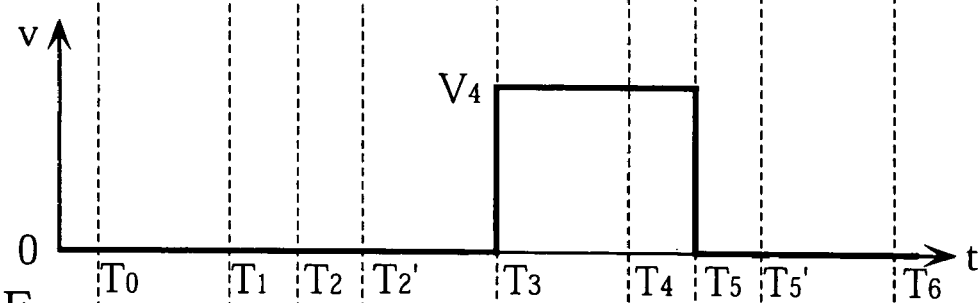
Figure 26E:
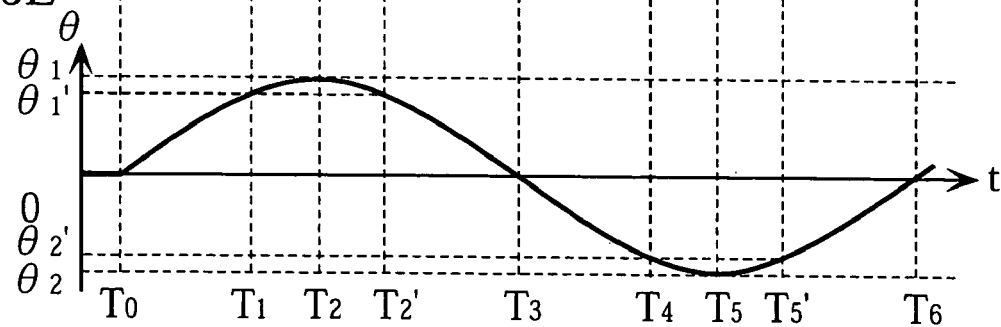

Furthermore, in the present drive mode, a prescribed voltage $V_6$ is applied to the comb tooth-shaped electrodes 355 between time $T_5$ and time $T_5'$, as illustrated in FIG. 26C. During this period, the twisting forces of the connecting sections 330 act as restoring forces, in addition to which an electrostatic attraction is generated between the comb tooth-shaped electrodes 351, 355, as a driving force in the first direction, and the angle of rotation of the mirror section 310 decreases continuously. At time $T_5'$, the drive mechanisms 350, 370 assume the orientation shown in FIG. 20B, FIG. 22B and FIG. 24B, for example. At time $T_5'$, prior to the time at which the rotational displacement (for example, $\theta_2'$), which can be generated in the drive mechanisms 350 by a driving force (driving torque) in a second direction opposite to the first direction, is reached, the voltage applied to the comb tooth-shaped electrodes 355 is set substantially to 0V.

In the present drive mode, preferably, the voltage $V_1$ and voltage $V_5$ are the same and the voltage $V_3$ and voltage $V_6$ are the same. Moreover, preferably the sum of the respective periods between time $T_0$ and time $T_1$, and between time $T_2$ and time $T_2'$, and the sum of the respective periods between time $T_3$ and time $T_4$, and between time $T_5$ and time $T_5'$, each constitute respectively one quarter of a cycle of the rotational operation of the mirror section 310. In this way, it is possible to achieve a cyclical rotational operation of the mirror section 310 of the micro-mirror element X3.

In the micro-mirror element X3, the drive mechanisms 340, 350 are disposed in mutually distant positions, and the drive mechanisms 360, 370 are disposed in mutually close positions, with respect to the axis of rotation A3 of the rotational operation of the mirror section 310. In a composition of this kind, the drive mechanisms 340, 350 are more suitable than the drive mechanisms 360, 370, when generating a large rotational torque. For example, if the dimensional designs of the drive mechanisms 340, 350 and the drive mechanisms 360, 370 are equal, then when the same voltage is applied to these drive mechanisms, a greater rotational torque will be generated in the drive mechanisms 340, 350, compared to the drive mechanisms 360, 370, because the drive mechanisms 340, 350 are situated at a greater distance from the axis of rotation A3. Moreover, the drive mechanisms 360, 370 are more suitable than the drive mechanisms 340, 350, when a large stroke is to be ensured. For example, if the dimensional designs of the drive mechanisms 340, 350 and the drive mechanisms 360, 370 are equal, then the drive mechanisms 360, 370 have a stroke covering a larger amount of rotational displacement (angle of rotation) than the drive mechanisms 340, 350. In an micro-mirror element X3 equipped with both drive mechanisms 340, 350 that are suitable for generating a large rotational torque and drive mechanisms 360, 370 that are suitable for ensuring a large stroke, it is possible to ensure an effectively large stroke even without forming the respective comb tooth-shaped electrodes of the respective drive mechanisms to an excessively thick size. In this way, the micro-mirror element X3 is suitable for achieving a high speed of operation for rotational operations of the mirror section 310 involving large amounts of rotational displacement.

In a micro-mirror element X3 of this kind, preferably, the drive mechanisms 340, 350 and the drive mechanisms 360, 370 are electrically separated and are controlled respectively in an independent fashion, such that the respective characteristics of the drive mechanisms 340, 350 and the drive mechanisms 360, 370 can be utilized effectively. For example, in the range where the amount of displacement of the mirror section 310 is a small angle, a large rotational torque can be generated by means of the drive mechanisms 340, 350, and in the range where it is a large angle, a prescribed rotational torque can be sustained in a continuous manner, by means of the drive mechanisms 360, 370, throughout the relatively long stroke of these drive mechanisms 360, 370.

Moreover, in the micro-mirror element X3, by enlarging the electric field-generating surface area of the respective comb tooth-shaped electrodes of the drive mechanisms 360, 370 to a prescribed surface area, it is possible to achieve a small differential between the rotational torque generated by the drive mechanisms 360, 370 and the rotational torque generated by the drive mechanisms 340, 350. Alternatively, it is also possible to append a plurality of types of drive mechanisms for generating driving forces at yet more distant locations from the axis of rotation A3. By adopting these compositions, it may be possible to enhance prescribed characteristics of the micro-mirror element X3.

In addition, in the micro-mirror element X3, preferably, means for detecting the amount of rotational displacement of the mirror section 310 (angle of rotation) should be provided, such that the mirror section 310 can be driven in rotation with a high degree of accuracy. For such detecting means, it is possible to employ, for example, optical means utilizing reflection of light at the upper face or lower face of the mirror section 310, means for measuring the value of electrostatic capacitance of the comb tooth-shaped electrodes or on the lower face of the mirror section 310, or means for measuring the distortion of the connecting sections 330 or the torsion bars 331, by means of a piezo-resistance distortion gauge, or the like.

Figure 27:
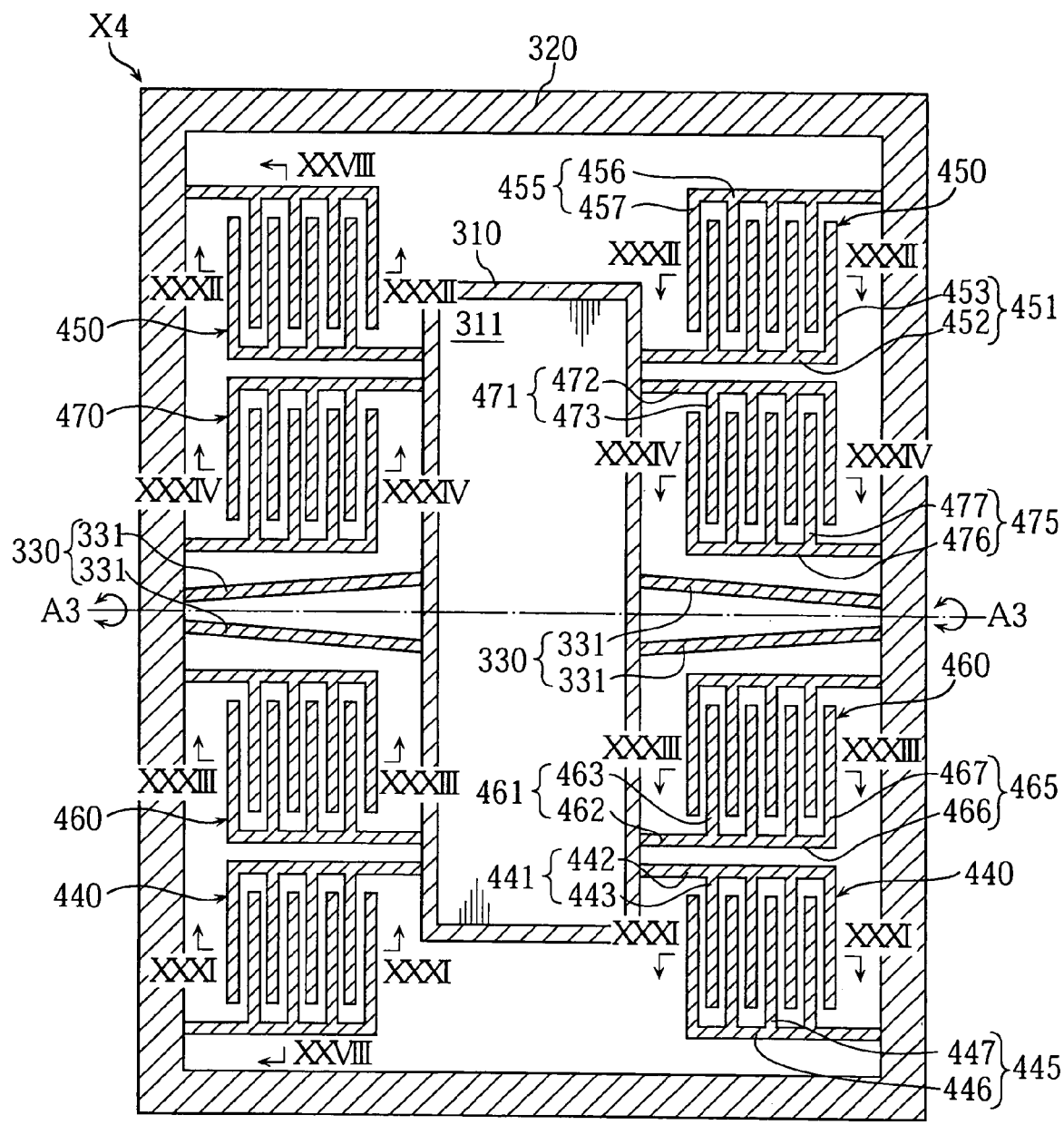
FIG. 27 is a plan view of a micro-mirror element according to a fourth embodiment of the present invention.

FIG. 27–FIG. 34 show a micro-mirror element X4 according to a fourth embodiment of the present invention. FIG. 27 is a plan view of the micro-mirror element X4, and FIG. 28 to FIG. 30 are cross-sectional views along line XXVIII—XXVIII in FIG. 27. Furthermore, FIG. 31 to FIG. 34 are cross-sectional views along line XXXI—XXXI, line XXXII—XXXII, line XXXIII—XXXIII, and line XXXIV—XXXIV in FIG. 27, respectively.

The micro-mirror element X4 comprises a mirror section 310, a frame 320, a pair of connecting sections 330, and respective pairs of drive mechanisms 440, 450, 460, 470. The micro-mirror element X4 differs from the micro-mirror element X3 in respect of the fact that it is equipped with drive mechanisms 440, 450, 460 and 470, instead of the drive mechanisms 340, 350, 360 and 370. Moreover, similarly to the micro-mirror element X1, the micro-mirror element X4 is manufactured by carrying out processing on a material substrate, which is an SOI substrate having a prescribed laminated structure, by means of a bulk micro-machining technology, such as MEMS technology, or the like. The material substrate has a laminated structure consisting, for example, of first and second silicon layers, and an insulating layer interposed between these silicon layers, a prescribed type of conductivity being imparted to the respective silicon layers by doping with an impurity. For the purpose of clarifying the diagrams, in FIG. 27, the areas originating in the first silicon layer which project in the direction of the reader beyond the insulating layer are marked by diagonal hatching (with the exception of the mirror surface 311).

Figure 31A:
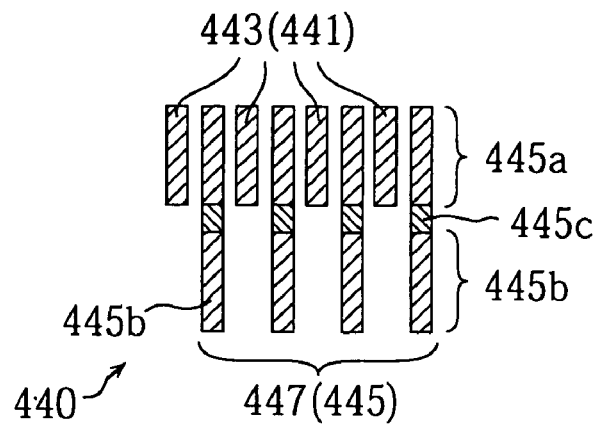
FIGS. 31A–31C are cross-sectional views along line XXXI—XXXI in FIG. 27.
Figure 31B:
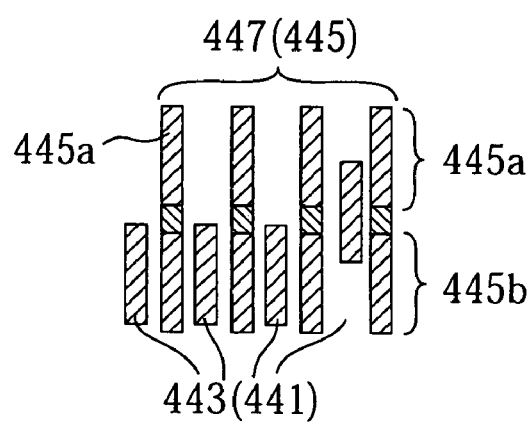
Figure 31C:
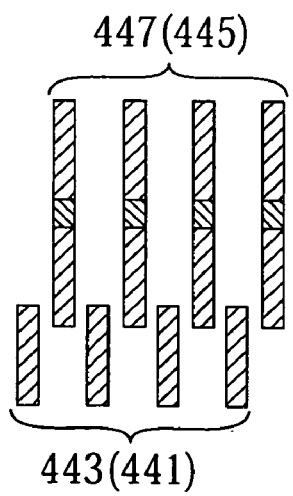

Two drive mechanisms 440 provided in the micro-mirror element X4 are disposed in a symmetrical fashion, with respect to the mirror section 310, each comprising a comb tooth-shaped electrode 441 and comb tooth-shaped electrode 445. The comb tooth-shaped electrode 441 is a region originating principally in the first silicon layer, and it has a base section 442 which is fixed to the mirror section 310, and a plurality of electrode teeth 443 which project from this base section 442. The comb tooth-shaped electrode 445 has a laminated structure consisting of a conductor section 445a, a conductor section 445b, and an insulating section 445c for electrically separating the two conductor sections, and also has a base section 446 which is fixed to the frame 320 and projects in an inward direction, and a plurality of electrode teeth 447 which project from this base section 446. The conductor sections 445a, 445b are regions which originate respectively in the first and second silicon layers. When the element is not driven in rotation, the comb tooth-shaped electrode 441 and the base section 445b of the comb tooth-shaped electrode 445 are positioned at mutually different heights, as illustrated by FIG. 28 and FIG. 31A. Moreover, the comb tooth-shaped electrodes 441, 445 are disposed in a state whereby their respective electrode teeth 443, 447 lie in mutually displaced positions, such that they do not make contact with each other.

Figure 32A:
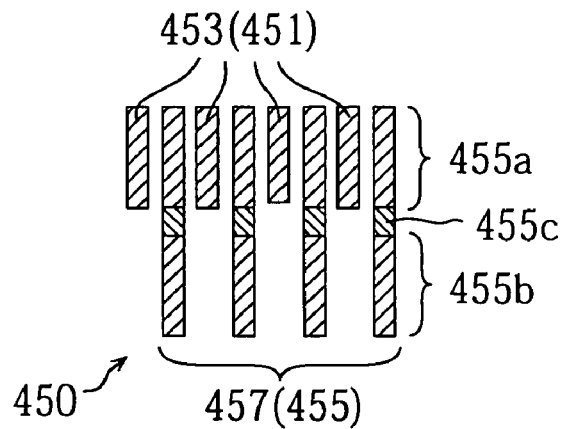
FIGS. 32A–32C are cross-sectional views along line XXXII—XXXII in FIG. 27.
Figure 32B:
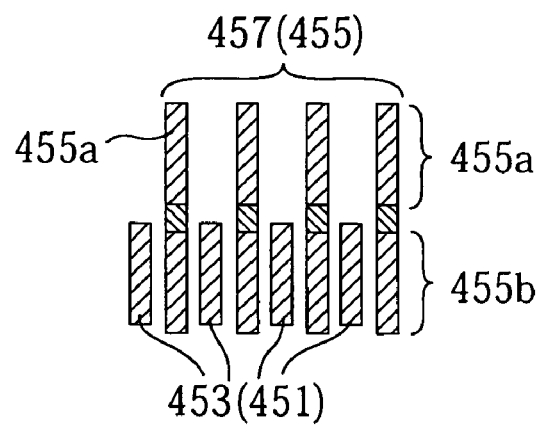
Figure 32C:
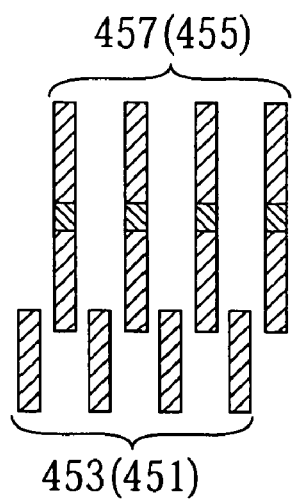

Two drive mechanisms 450 are disposed in a symmetrical fashion, with respect to the mirror section 310, each comprising a comb tooth-shaped electrode 451 and comb tooth-shaped electrode 455. The comb tooth-shaped electrode 451 is a region originating principally in the first silicon layer, and it has a base section 452 which is fixed to the mirror section 310, and a plurality of electrode teeth 453 which project from this base section 452. The comb tooth-shaped electrode 455 has a laminated structure consisting of a conductor section 455a, a conductor section 455b, and an insulating section 455c for electrically separating the two conductor sections, and also has a base section 456 which is fixed to the frame 320 and projects in an inward direction, and a plurality of electrode teeth 457 which project from this base section 456. The conductor sections 455a, 455b are regions which originate respectively in the first and second silicon layers. When the element is not driven in rotation, the comb tooth-shaped electrode 451 and the base section 455b of the comb tooth-shaped electrode 455 are positioned at mutually different heights, as illustrated by FIG. 28 and FIG. 32A. Moreover, the comb tooth-shaped electrodes 451, 455 are disposed in a state whereby their respective electrode teeth 453, 457 lie in mutually displaced positions, such that they do not make contact with each other.

Figure 33A:
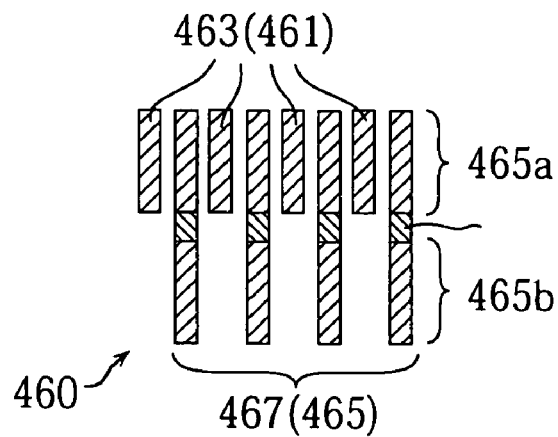
FIGS. 33A–33C are cross-sectional views along line XXXIII—XXXIII in FIG. 27.
Figure 33B:
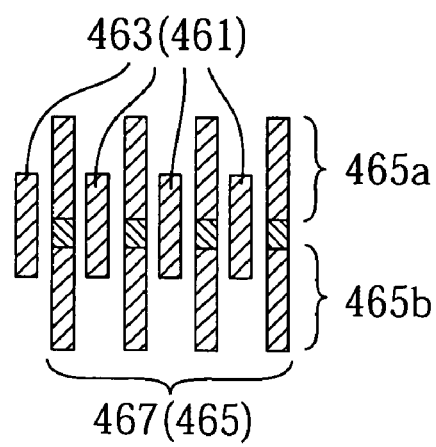
Figure 33C:
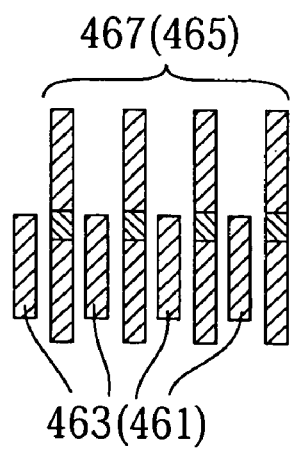

Two drive mechanisms 460 are disposed in a symmetrical fashion, with respect to the mirror section 310, each comprising a comb tooth-shaped electrode 461 and comb tooth-shaped electrode 465. The comb tooth-shaped electrode 461 is a region originating principally in the first silicon layer, and it has a base section 462 which is fixed to the mirror section 310, and a plurality of electrode teeth 463 which project from this base section 462. The comb tooth-shaped electrode 465 has a laminated structure consisting of a conductor section 465a, a conductor section 465b, and an insulating section 465c for electrically separating the two conductor sections, and also has a base section 466 which is fixed to the frame 320 and projects in an inward direction, and a plurality of electrode teeth 467 which project from this base section 466. The conductor sections 465a, 465b are regions which originate respectively in the first and second silicon layers. When the element is not driven in rotation, the comb tooth-shaped electrode 461 and the base section 465b of the comb tooth-shaped electrode 465 are positioned at mutually different heights, as illustrated by FIG. 28 and FIG. 33A. Moreover, the comb tooth-shaped electrodes 461, 465 are disposed in a state whereby their respective electrode teeth 463, 467 lie in mutually displaced positions, such that they do not make contact with each other.

Figure 34A:
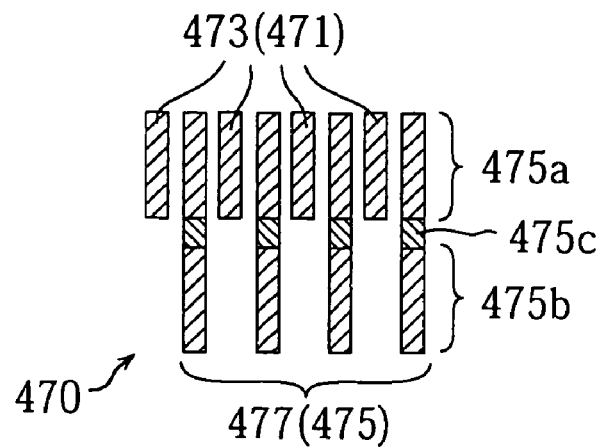
FIGS. 34A–34C are cross-sectional views along line XXXIV—XXXIV in FIG. 27.
Figure 34B:
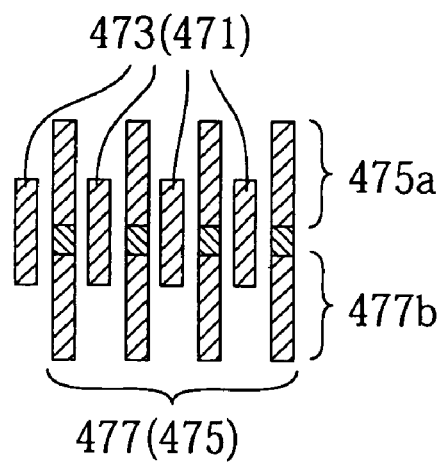
Figure 34C:
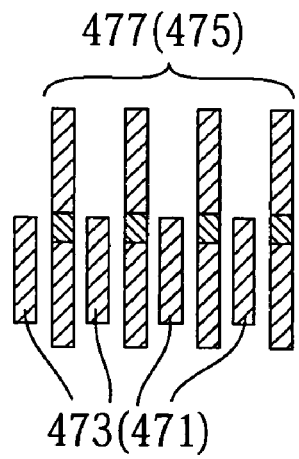

Two drive mechanisms 470 are disposed in a symmetrical fashion, with respect to the mirror section 310, each comprising a comb tooth-shaped electrode 471 and comb tooth-shaped electrode 475. The comb tooth-shaped electrode 471 is a region originating principally in the first silicon layer, and it has a base section 472 which is fixed to the frame 320, and a plurality of electrode teeth 473 which project from this base section 472. The comb tooth-shaped electrode 475 has a laminated structure consisting of a conductor section 475a, a conductor section 475b, and an insulating section 475c for electrically separating the two conductor sections, and also has a base section 476 which is fixed to the frame 320 and projects in an inward direction, and a plurality of electrode teeth 477 which project from this base section 476. The conductor sections 475a, 475b are regions which originate respectively in the first and second silicon layers. When the element is not driven in rotation, the comb tooth-shaped electrode 471 and the base section 475b of the comb tooth-shaped electrode 475 are positioned at mutually different heights, as illustrated by FIG. 28 and FIG. 34A. Moreover, the comb tooth-shaped electrodes 471, 475 are disposed in a state whereby their respective electrode teeth 473, 477 lie in mutually displaced positions, such that they do not make contact with each other.

In the micro-mirror element X4, by applying prescribed electric potentials, as and when necessary, to the comb tooth-shaped electrodes 441, 451, 461, 471, the conductor sections 445a, 445b of the comb tooth-shaped electrodes 445, the conductor sections 455a, 455b of the comb tooth-shaped electrodes 455, the conductor sections 465a, 465b of the comb tooth-shaped electrodes 465, and the conductors sections 475a, 475b of the comb tooth-shaped electrodes 475, it is possible to cause the mirror section 310 to perform rotational operation about the axis of rotation A3.

FIG. 35 shows one example of a drive configuration for the micro-mirror element X4. FIG. 35A illustrates the change over time of the voltage applied to the conductor sections 445b of the comb tooth-shaped electrodes 445 of the drive mechanisms 440. FIG. 35B illustrates the change over time of the voltage applied to the conductor sections 465b of the comb tooth-shaped electrodes 465 of the drive mechanisms 460. FIG. 35C illustrates the change over time of the voltage applied to the conductor sections 455b of the comb tooth-shaped electrodes 455 of the drive mechanisms 450. FIG. 35D illustrates the change over time of the voltage applied to the conductor sections 475b of the comb tooth-shaped electrodes 475 of the drive mechanisms 470. FIG. 35E shows the change over time of the voltage applied to the conductor sections 445a of the comb tooth-shaped electrodes 445 of the drive mechanisms 440, the conductor sections 455a of the comb tooth-shaped electrodes 455 of the drive mechanisms 450, the conductor sections 465a of the comb tooth-shaped electrodes 465 of the drive mechanisms 460, and the conductor sections 475a of the comb tooth-shaped electrodes 475 of the drive mechanisms 470. In the respective graphs in FIG. 35A–FIG. 35E, the time (t) is represented on the horizontal axis, and the applied voltage (v) is represented on the vertical axis. In the present drive mode, the comb tooth-shaped electrodes 441, 451, 461, 471 are connected to ground. Furthermore, FIG. 35F shows the change over time of the angle of rotation of the mirror section 310 in the present drive mode. In the graph in FIG. 35F, time (t) is represented on the horizontal axis, and the angle of rotation (θ) is represented on the vertical axis.

Figure 35A:
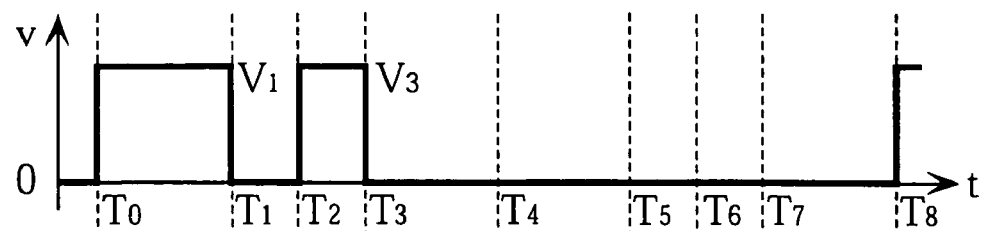
FIGS. 35A–35F show one example of a drive mode of the micro-mirror element in FIG. 27.
Figure 35B:
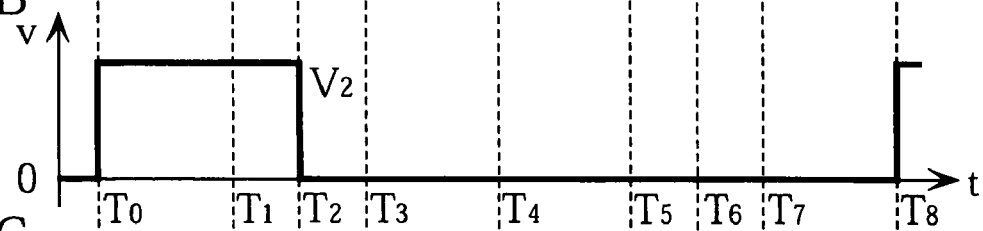
Figure 35C:
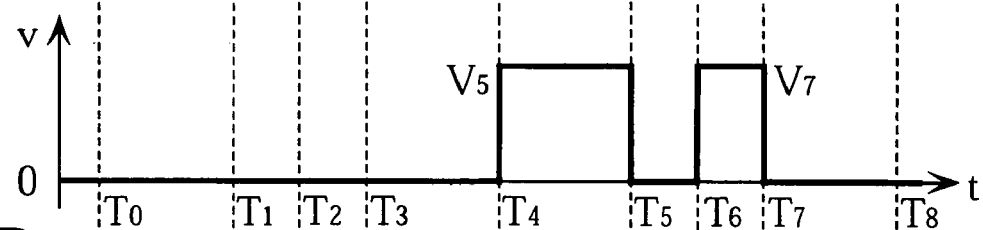
Figure 35D:
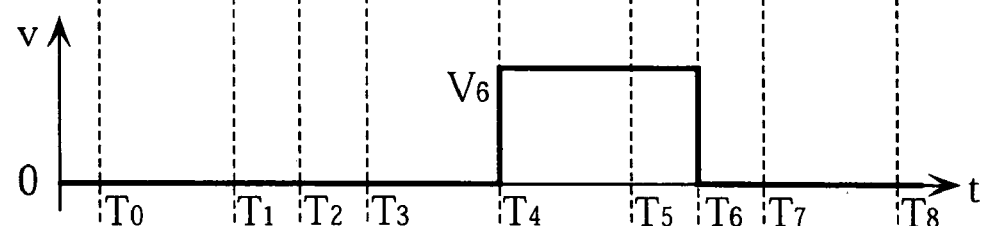

In the present drive mode, firstly, between time $T_0$ and $T_1$, a prescribed voltage $V_1$ is applied to the conductor sections 445b as illustrated in FIG. 35A, and between time $T_0$ and time $T_2$, a prescribed voltage $V_2$ is applied to the conductor sections 465b as illustrated in FIG. 35B, such that the rotational displacement of the mirror section 310, which is in an initial state (angle of rotation of 0°) at time To, reaches a maximum angle of rotation $\theta_1$ at time $T_2$. Between time $T_0$ and time $T_1$, an electrostatic attraction is generated between the comb tooth-shaped electrodes 441 and the conductor sections 445b, and between the comb tooth-shaped electrodes 461 and the conductor sections 465b, and the angle of rotation of the mirror section 310 increases continuously in a first direction, and at time $T_1$, the drive mechanisms 440, 460 assume the orientation illustrated in FIG. 29A, FIG. 31B and FIG. 33B, for example. At time $T_1$, prior to the time at which the rotational displacement (for example, $\theta_1'$), which can be generated in the drive mechanisms 440 by a driving force (driving torque) in a second direction opposite to the first direction, is reached, the voltage applied to each conductor section 445b is set substantially to 0V. Between time $T_1$ and $T_2$, an electrostatic attraction is generated between the comb tooth-shaped electrodes 461 and the conductor sections 465b, and the angle of rotation of the mirror section 310 increases continuously in a first direction. At time $T_2$, the drive mechanisms 440, 460 assume the orientation illustrated in FIG. 29B, FIG. 31C and FIG. 33C, for example, and the angle of rotation reaches $\theta_1$, as illustrated in FIG. 35F. In this case, a prescribed twisting reaction is generated in the connecting sections 330.

Figure 35E:
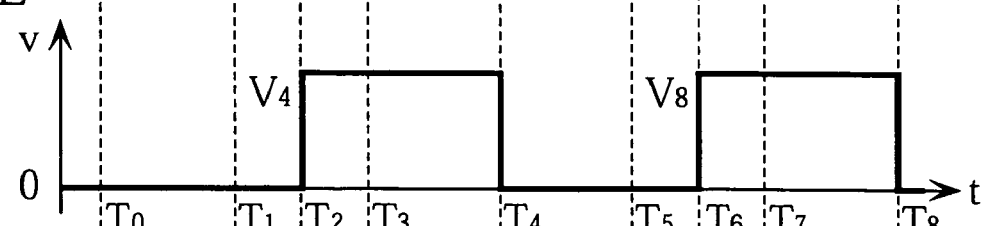
Figure 35F:
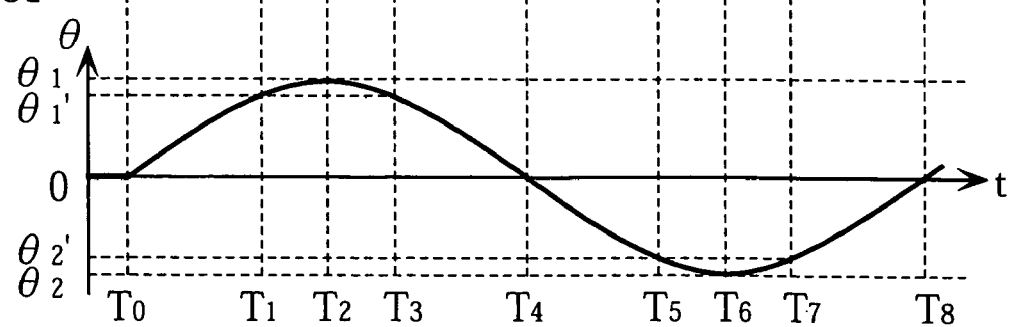

Thereupon, a prescribed voltage $V_3$ is applied to the conductor sections 445b between time $T_2$ and time $T_3$, and a prescribed voltage $V_4$ is applied to the conductor sections 445a, 455a, 465a, 475a, between time $T_2$ and time $T_4$, as illustrated in FIG. 35E, such that the angle of rotation reaches $\theta_2$ at time $T_4$. Moreover, between time $T_2$ and time $T_4$, the voltage applied to the conductor sections 465b is set substantially to 0V. Between time $T_2$ and time $T_3$, in addition to the twisting reactions of the connecting sections 330 acting as restoring forces, an electrostatic attraction is generated between the comb tooth-shaped electrodes 441 and the comb tooth-shaped electrodes 445 (conductor sections 445a and 445b) as a driving force in the second direction, and furthermore, electrostatic forces of attraction are also generated between the comb tooth-shaped electrodes 451 and the conductor sections 455a, between the comb tooth-shaped electrodes 461 and the conductor sections 465a, and between the comb tooth-shaped electrodes 471 and the conductor sections 475a, as driving forces in the second direction, whereby the angle of rotation of the mirror section 310 decreases continuously. At time $T_3$, the drive mechanisms 440, 460 assume the orientation shown in FIG. 29A, FIG. 31B and FIG. 33B, for example. At time $T_3$, prior to the time at which the rotational displacement (for example, $\theta_1'$), which can be generated in the drive mechanisms 440 by a driving force (driving torque) in a first direction opposite to the second direction, is reached, the voltage applied to each conductor section 445b is substantially set to 0V. Thereupon, between time $T_3$ and time $T_4$, electrostatic forces of attraction continue to be generated between the comb tooth-shaped electrodes 441 and the conductor sections 445a, between the comb tooth-shaped electrodes 451 and the conductor sections 455a, between the comb tooth-shaped electrodes 461 and the conductor sections 465a, and between the comb tooth-shaped electrodes 471 and the conductor sections 475a, and hence the angle of rotation of the mirror section 310 decreases continuously. At time $T_4$, the angle of rotation reaches 0°, as illustrated in FIG. 35F.

Thereupon, between time $T_4$ and $T_5$, a prescribed voltage $V_5$ is applied to the conductor sections 455b as illustrated in FIG. 35D, and between time $T_4$ and time $T_6$, a prescribed voltage $V_6$ is applied to the conductor sections 475b as illustrated in FIG. 35D, such that the rotational displacement of the mirror section 310 reaches a maximum angle of rotation $\theta_2$ at time $T_6$. Between time $T_4$ and time $T_5$, an electrostatic attraction is generated between the comb tooth-shaped electrodes 451 and the conductor sections 455b, and between the comb tooth-shaped electrodes 471 and the conductor sections 475b, and the angle of rotation of the mirror section 310 increases continuously in a second direction, and at time $T_5$, the drive mechanisms 450, 470 assume the orientation illustrated in FIG. 30A, FIG. 32B and FIG. 34B, for example. At time $T_5$, prior to the time at which the rotational displacement (for example, $\theta_2'$), which can be generated in the drive mechanisms 450 by a driving force (driving torque) in a first direction opposite to the second direction, is reached, the voltage applied to each conductor section 455b is substantially set to 0V. Between time $T_5$ and $T_6$, an electrostatic attraction continues to be generated between the comb tooth-shaped electrodes 471 and the conductor sections 475b, and the angle of rotation of the mirror section 310 increases continuously in the second direction. At time $T_6$, the drive mechanisms 450, 470 assume the orientation illustrated in FIG. 30B, FIG. 32C and FIG. 34C, for example, and the angle of rotation reaches $\theta_2$, as illustrated in FIG. 35F. In this case, a prescribed twisting reaction is generated in the connecting sections 330.

Thereupon, a prescribed voltage $V_7$ is applied to the conductor sections 455b between time $T_6$ and time $T_7$, as illustrated in FIG. 35C, and a prescribed voltage $V_8$ is applied to the conductor sections 445a, 455a, 465a, 475a, between time $T_6$ and time $T_8$, as illustrated in FIG. 35E, such that the angle of rotation reaches 0° at time $T_8$. Moreover, between time $T_6$ and time $T_8$, the voltage applied to the conductor sections 475b is set substantially to 0V. Between time $T_6$ and time $T_7$, in addition to the twisting reactions of the connecting sections 330 acting as restoring forces, an electrostatic attraction is generated between the comb tooth-shaped electrodes 451 and the comb tooth-shaped electrodes 455 (conductor sections 455a and 455b) as a driving force in the first direction, and furthermore, electrostatic forces of attraction are also generated between the comb tooth-shaped electrodes 441 and the conductor sections 445a, between the comb tooth-shaped electrodes 461 and the conductor sections 465a, and between the comb tooth-shaped electrodes 471 and the conductor sections 475a, as driving forces in the first direction, whereby the angle of rotation of the mirror section 310 decreases continuously. At time $T_7$, the drive mechanisms 450, 470 assume the orientation shown in FIG. 30A, FIG. 32B and FIG. 34B, for example. At time $T_7$, prior to the time at which the rotational displacement (for example, $\theta_2'$), which can be generated in the drive mechanisms 450 by a driving force (driving torque) in a second direction opposite to the first direction, is reached, the voltage applied to each conductor section 455b is substantially set to 0V. Thereupon, between time $T_7$ and time $T_8$, electrostatic forces of attraction continue to be generated between the comb tooth-shaped electrodes 441 and the conductor sections 445a, between the comb tooth-shaped electrodes 451 and the conductor sections 455a, between the comb tooth-shaped electrodes 461 and the conductor sections 465a, and between the comb tooth-shaped electrodes 471 and the conductor sections 475a, and hence the angle of rotation of the mirror section 310 decreases continuously. At time $T_8$, the angle of rotation reaches 0°, as illustrated in FIG. 35F. The sequence of operations described above, from time $T_0$ to time $T_8$, are repeated, according to requirements. In the present drive mode, preferably, the voltage $V_1$ and the voltage $V_3$ are the same, the voltage $V_5$ and the voltage $V_7$ are the same, and the absolute value of the angle of rotation $\theta_1$ is the same as the absolute value of the angle of rotation $\theta_2$. Moreover, the respective periods between time $T_0$ and time $T_2$, between time $T_2$ and time $T_4$, between time $T_4$ and time $T_6$, and between time $T_6$ and time $T_8$, are preferably set to the same length, and each constitute one quarter of the rotational operation of the mirror section 310. Moreover, preferably the sum of the respective periods between time $T_0$ and time $T_1$, and between time $T_2$ and time $T_3$, and the sum of the respective periods between time $T_4$ and time $T_5$, and between time $T_6$ and time $T_7$, each constitute respectively one quarter of a cycle of the rotational operation of the mirror section 310. In this way, it is possible to achieve a cyclical rotational operation of the mirror section 310 of the micro-mirror element X4.

In the micro-mirror element X4, the drive mechanisms 440, 450 are disposed in mutually distant positions, and the drive mechanisms 460, 470 are disposed in mutually close positions, with respect to the axis of rotation A3 of the rotational operation of the mirror section 310. In this composition, similarly to the foregoing description relating to the drive mechanisms 340, 350, the drive mechanisms 440, 450 are more suitable than the drive mechanisms 460, 470, for generating a large rotational torque. Moreover, similarly to the foregoing description relating to the drive mechanisms 360, 370, the drive mechanisms 460, 470 are more suitable than the drive mechanisms 440, 450, for ensuring a large stroke. Similarly to the foregoing description relating to the micro-mirror element X3, in an micro-mirror element X4 equipped with both drive mechanisms 440, 450 that are suitable for generating a large rotational torque and drive mechanisms 460, 470 that are suitable for ensuring a large stroke, it is possible to ensure an effectively large stroke even without forming the respective comb tooth-shaped electrodes of the respective drive mechanisms to an excessively thick size. In this way, the micro-mirror element X4 is suitable for achieving a high speed of operation for rotational operations of the mirror section 310 involving large amounts of rotational displacement.

In addition, similarly to the foregoing description relating to micro-mirror element X3, in the micro-mirror element X4, preferably, means for detecting the amount of rotational displacement of the mirror section 310 (angle of rotation) should be provided, such that the mirror section 310 can be driven in rotation with a high degree of accuracy.

Figure 36:
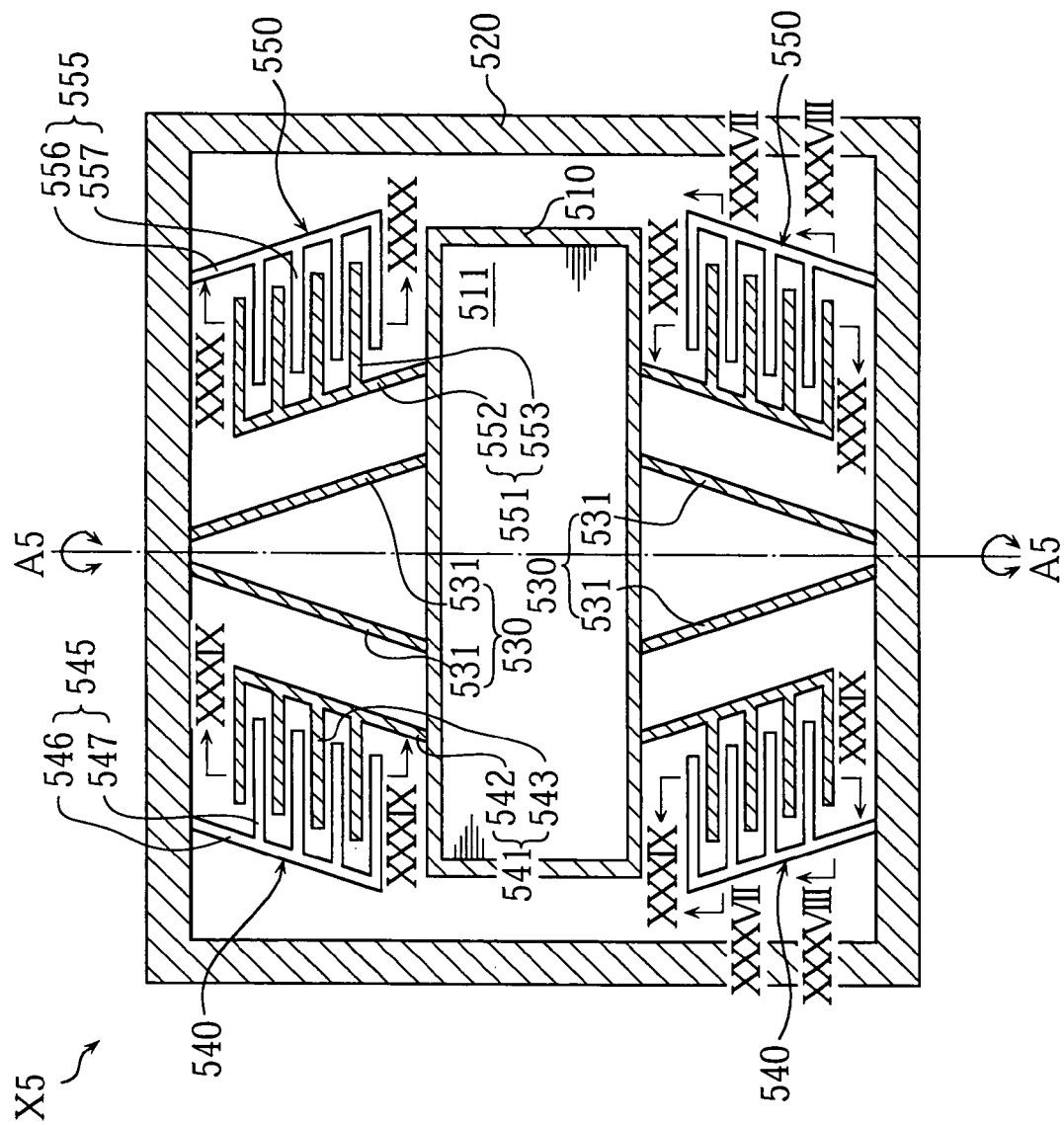
FIG. 36 is a plan view of a micro-mirror element according to a fifth embodiment of the present invention.
Figure 39A:
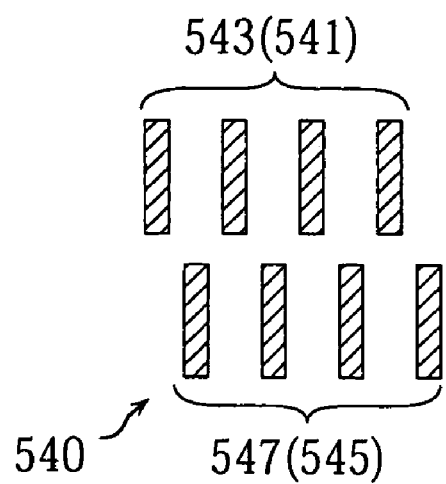
FIGS. 39A–39B are cross-sectional views along line XXXIX—XXXIX in FIG. 36.
Figure 39B:
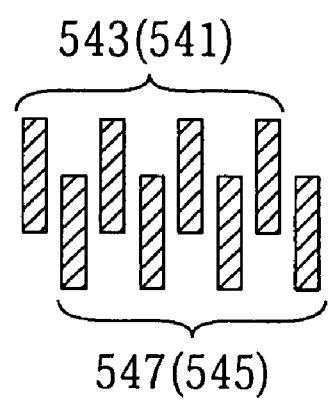
Figure 40A:
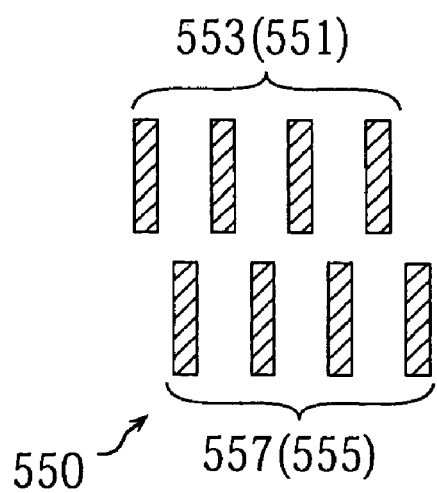
FIGS. 40A–40B are cross-sectional view along line XXXX—XXXX in FIG. 36.
Figure 40B:
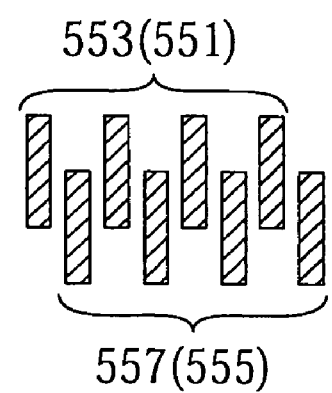

FIG. 36–FIG. 40 show a micro-mirror element X5 according to a fifth embodiment of the present invention. FIG. 36 is a cross-sectional view of the micro-mirror element X5, and FIG. 37 is a cross-sectional view along line XXXVII—XXXVII in FIG. 36. Furthermore, FIG. 38 to FIG. 40 are cross-sectional views along line XXXVIII—XXXVIII, line XXXIX—XXXIX, and line XXXX—XXXX in FIG. 36, respectively.

The micro-mirror element X5 comprises a mirror section 510, a frame 520, a pair of connecting sections 530, and respective pairs of drive mechanisms 540, 550. Moreover, similarly to the micro-mirror element X1, the micro-mirror element X5 is manufactured by carrying out processing on a material substrate, which is an SOI substrate having a prescribed laminated structure, by means of a bulk micro-machining technology, such as MEMS technology, or the like. The material substrate has a laminated structure consisting, for example, of first and second silicon layers, and an insulating layer interposed between these silicon layers, a prescribed type of conductivity being imparted to the respective silicon layers by doping with an impurity. For the purpose of clarifying the diagrams, in FIG. 36, the areas originating in the first silicon layer which are positioned beyond the insulating layer and towards the reader are marked by diagonal hatching (with the exception of the mirror surface 511 described hereinafter).

The mirror section 510 is a region formed principally in the first silicon layer, and it has a mirror surface 511 having a light reflecting function, on the front surface thereof. The mirror surface 511 has a laminated structure consisting of a Cr layer formed on the first silicon layer, and an Ar layer formed on the Cr layer. The mirror surface 510 of this kind forms the movable section of the present invention. The frame 520 is a region formed principally in the first silicon layer, in such a state that it surrounds the mirror section 510.

The pair of connecting sections 530 are regions formed in the first silicon layer, and consist respectively of two torsion bars 531. The respective torsion bars 531 are connected to the mirror section 510 and the frame 520, thus linking same together. The interval between the two torsion bars 530 of the respective connecting sections 531 gradually increases from the frame 520 side towards the mirror section 510 side. The pair of connecting sections 530 of this kind define an axis A5 for the rotational operation of the mirror section 510 with respect to the frame 520. Preferably, the connecting sections 531 which are constituted by two torsion bars 530, the interval between which gradually increases from the frame 520 side towards the mirror section 510 side, prevent unwanted displacement in the rotational operation of the mirror section 510. Furthermore, it is also possible to constitute the connecting sections 530 such that two different electric potentials can be applied from the frame 520 to the mirror section 510, via the two torsion bars 531.

Figure 37A:
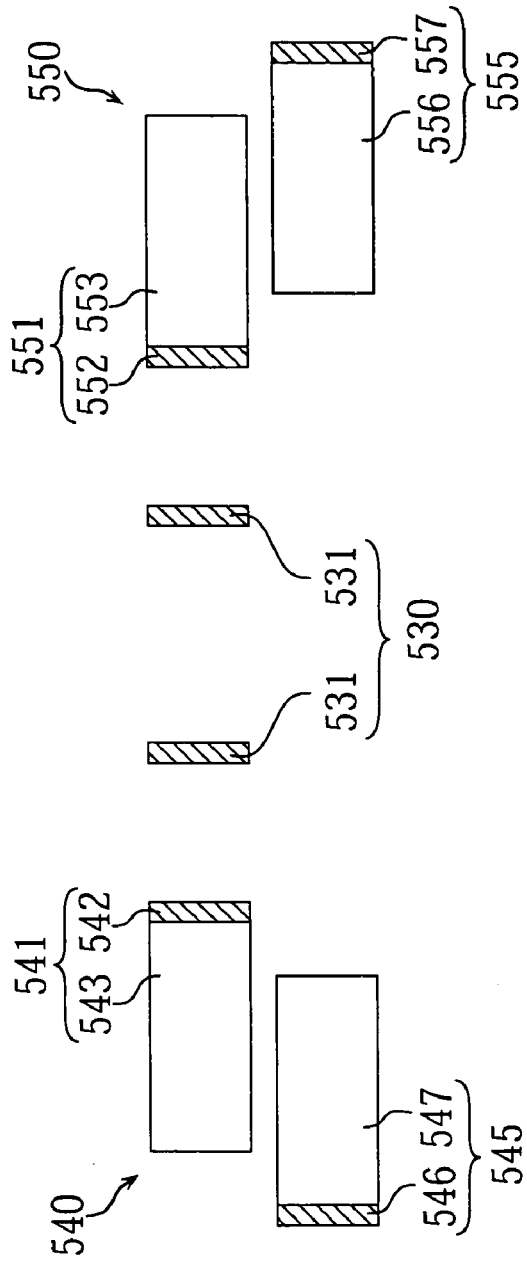
FIGS. 37A–37B are cross-sectional views along line XXXVII—XXXVII in FIG. 36.

Two drive mechanisms 540 are disposed in a symmetrical fashion, with respect to the mirror section 510, each comprising a comb tooth-shaped electrode 541 and comb tooth-shaped electrode 545. The comb tooth-shaped electrode 541 is a region originating principally in the first silicon layer, and it has a base section 542 which is fixed to the mirror section 510, and a plurality of electrode teeth 543. The base section 541 extends such that it approaches the axis of rotation A5 as it becomes more distant from the mirror section 510. A plurality of electrode teeth 543 of substantially the same length extends from this base section 541 in a perpendicular direction to the axis of rotation A5. The comb tooth-shaped electrode 545 is a region originating principally in the second silicon layer, and it has a base section 546 which is fixed to the frame 520 and projects in an inward direction, and a plurality of electrode teeth 547. The base section 546 extends such that it becomes more distant from the axis of rotation A5 as approaching the mirror section 510. A plurality of electrode teeth 547 of substantially the same length extend from this base section 546 in a perpendicular direction to the axis of rotation A5. When the element is not driven in rotation, the comb tooth-shaped electrodes 541 and the comb tooth-shaped electrodes 545 are positioned at mutually different heights, as illustrated by FIG. 37A, FIG. 38A and FIG. 39A. Moreover, the comb tooth-shaped electrodes 541, 545 are disposed in a state whereby their respective electrode teeth 543, 547 lie in mutually displaced positions, such that they do not make contact with each other.

Two drive mechanisms 550 are disposed in a symmetrical fashion, with respect to the mirror section 510, each comprising a comb tooth-shaped electrode 551 and comb tooth-shaped electrode 555. The comb tooth-shaped electrode 551 is a region originating principally in the first silicon layer, and it has a base section 552 which is fixed to the mirror section 510, and a plurality of electrode teeth 553. The base section 551 extends such that it approaches the axis of rotation A5 as it becomes more distant from the mirror section 510. A plurality of electrode teeth 553 of substantially the same length extend from this base section 551 in a perpendicular direction to the axis of rotation A5. The comb tooth-shaped electrode 555 is a region originating principally in the second silicon layer, and it has a base section 556 which is fixed to the frame 520 and projects in an inward direction, and a plurality of electrode teeth 557. The base section 556 extends such that it becomes more distant from the axis of rotation A5 as approaching the mirror section 510. A plurality of electrode teeth 557 of substantially the same length extend from this base section 556 in a perpendicular direction to the axis of rotation A5. When the element is not driven in rotation, the comb tooth-shaped electrodes 551 and the comb tooth-shaped electrodes 555 are positioned at mutually different heights, as illustrated by FIG. 37A, FIG. 38A and FIG. 40A. Moreover, the comb tooth-shaped electrodes 551, 555 are disposed in a state whereby their respective electrode teeth 553, 557 lie in mutually displaced positions, such that they do not make contact with each other.

In the micro-mirror element X5, by applying prescribed electric potentials, as and when necessary, to the respective comb tooth-shaped electrodes 541, 545, 551, 555, it is possible to cause the mirror section 510 to rotate about the axis of rotation A5.

Figure 37B:
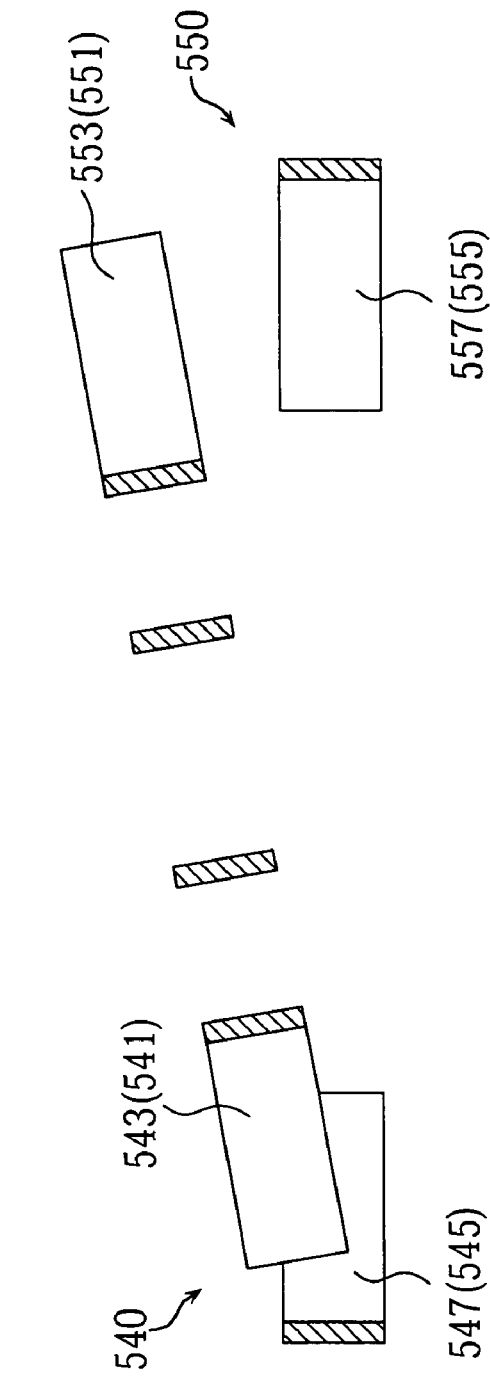

For example, by applying a prescribed electric potential to the comb tooth-shaped electrodes 541, 545 of the drive mechanisms 540, a prescribed electrostatic attraction is generated between the comb tooth-shaped electrodes 541, 545, whereby the comb tooth-shaped electrode 541 is drawn inside the comb tooth-shaped electrode 545, such that the respective electrodes assume the orientation illustrated in FIG. 37B, FIG. 38B, and FIG. 39B, for example. By this means, the mirror section 510 performs rotational operation about the axis of rotation A5, with respect to the frame 520. The amount of rotational displacement performed in this rotational operation can be governed by adjusting the applied electric potential. The mirror section 510 can be driven in rotation in the opposite direction about the axis of rotation A5 by generating a prescribed electrostatic attraction in the drive mechanisms 550, similarly to the foregoing description relating to the drive mechanisms 540. By driving rotation of the mirror section 510 in two directions in this fashion, it is possible to switch the direction of reflection of the light reflected by the mirror surface 511 provided on the mirror section 510, as appropriate.

In the micro-mirror element X5, the stroke based on the most proximately positioned electrode teeth 543, 547 in each drive mechanism 540, and the stroke based on the most proximately positioned electrode teeth 553, 557 in each drive mechanism 550, change continuously in a direction parallel to the electrode teeth. More specifically, the stroke based on the most proximately positioned electrode teeth 543, 547, and the stroke based on the most proximately positioned electrode teeth 553, 557 increases gradually from the mirror section 510 side to the frame 520 side. Therefore, in the micro-mirror element X5, it is possible to ensure an effectively long stroke, even without forming the comb tooth-shaped electrodes 541, 545, 551, 555 of the drive mechanisms 540, 550 to an excessively thick size. In this way, the micro-mirror element X5 is suitable for achieving a high speed of operation for rotational operations of the mirror section 510 involving large amounts of rotational displacement.

Furthermore, in the micro-mirror element X5, the rotational torque generated between the most proximately positioned electrode teeth 543, 547 in each drive mechanism 540, and the rotational torque generated between the most proximately positioned electrode teeth 553, 557 in each drive mechanism 550, change continuously in a direction parallel to the electrode teeth. More specifically, the rotational torque generated between the most proximately positioned electrode teeth 543, 547, and the rotational torque generated between the most proximately positioned electrode teeth 553, 557 increases gradually from the frame 520 side to the mirror section 510 side. Consequently, in the micro-mirror element X5, it is possible to avoid generating sudden variations in torque over a relatively broad range of rotational operation of the mirror section 510.

Figure 41A:
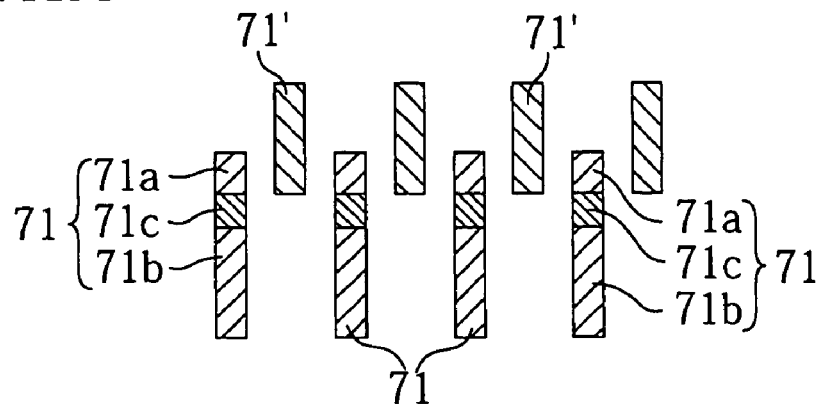
FIGS. 41A–41D show a modification of the comb tooth-shaped electrodes.
Figure 41B:
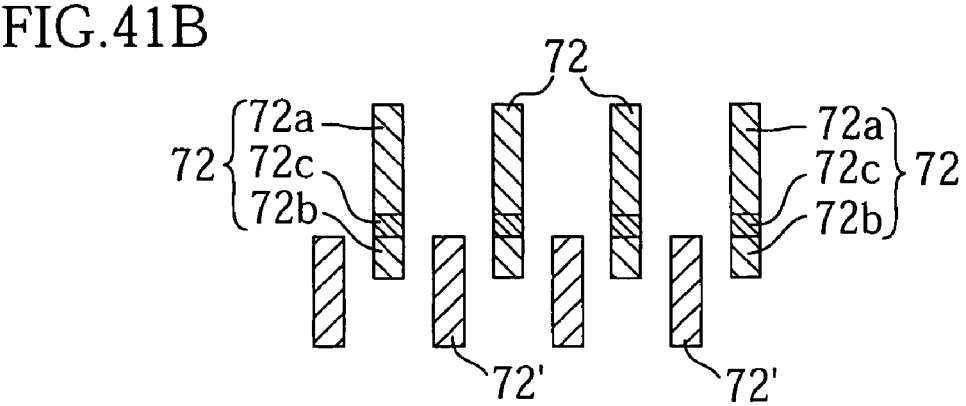
Figure 41C:
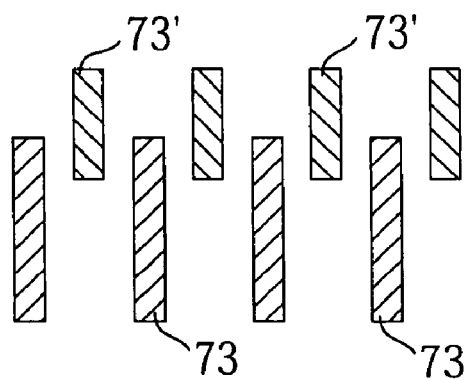
Figure 41D:
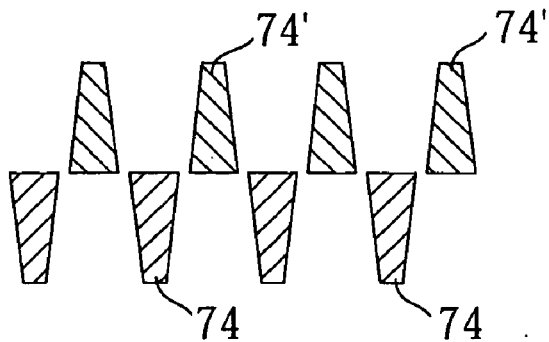
Figure 42A:
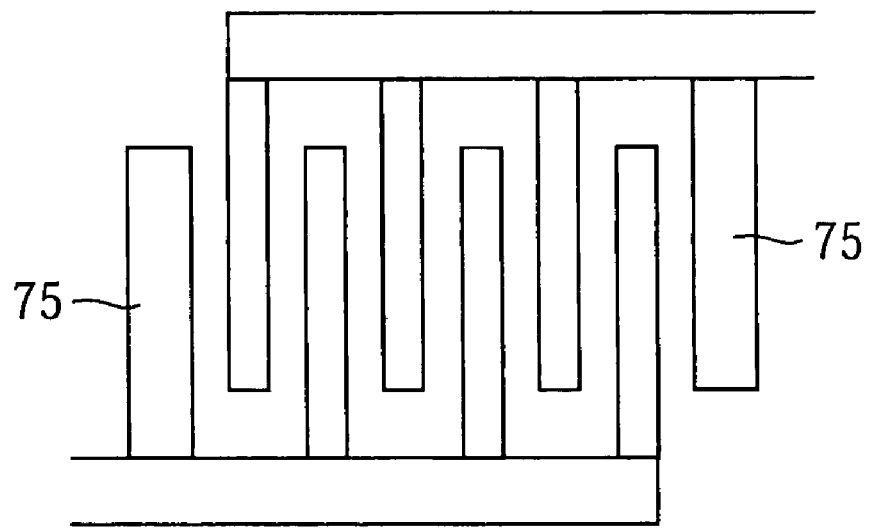
FIGS. 42A–42B show a further modification of the comb tooth-shaped electrodes.
Figure 42B:
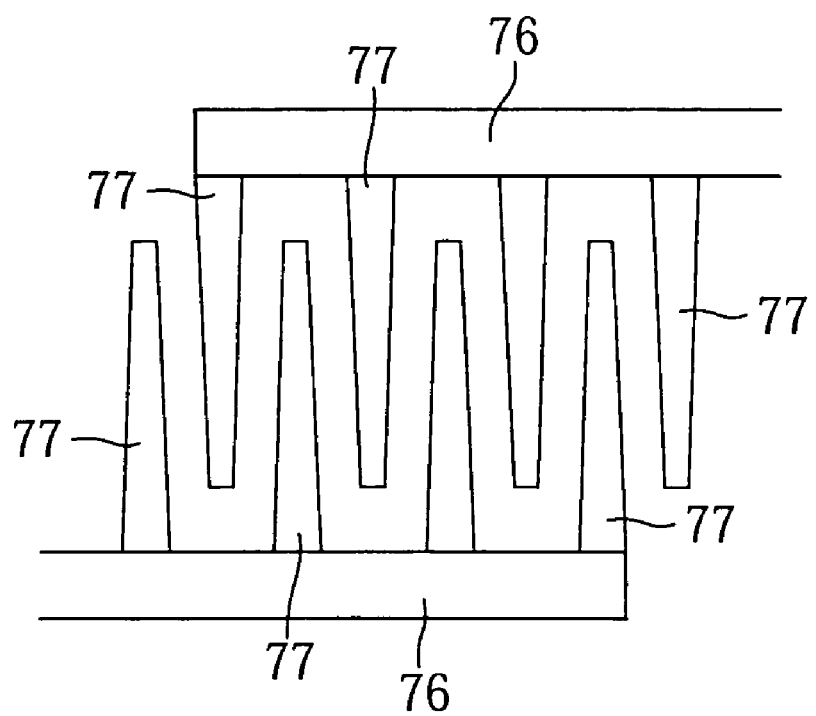
Figure 43:
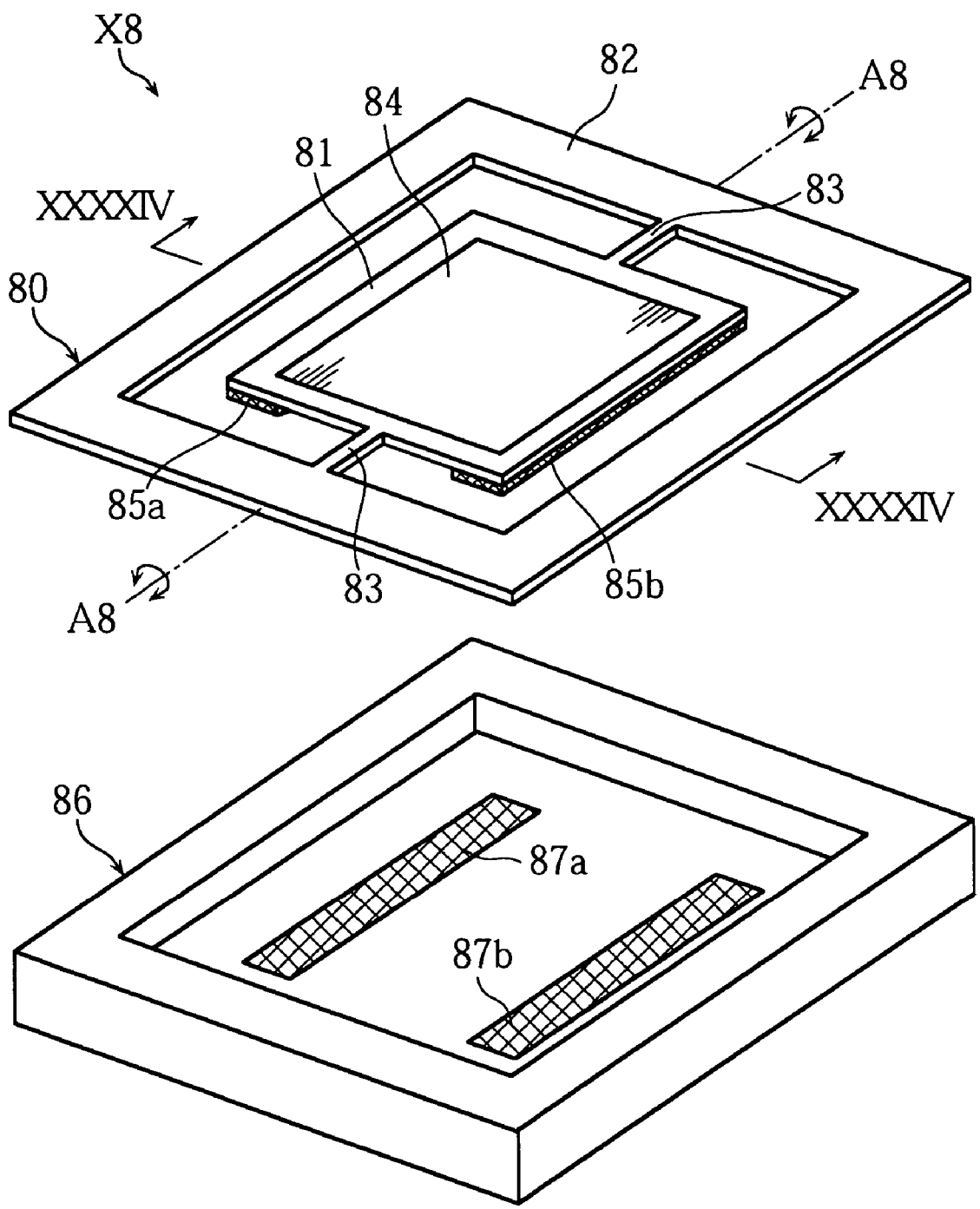
FIG. 43 is an exploded oblique view of a conventional micro-mirror element.
Figure 44:
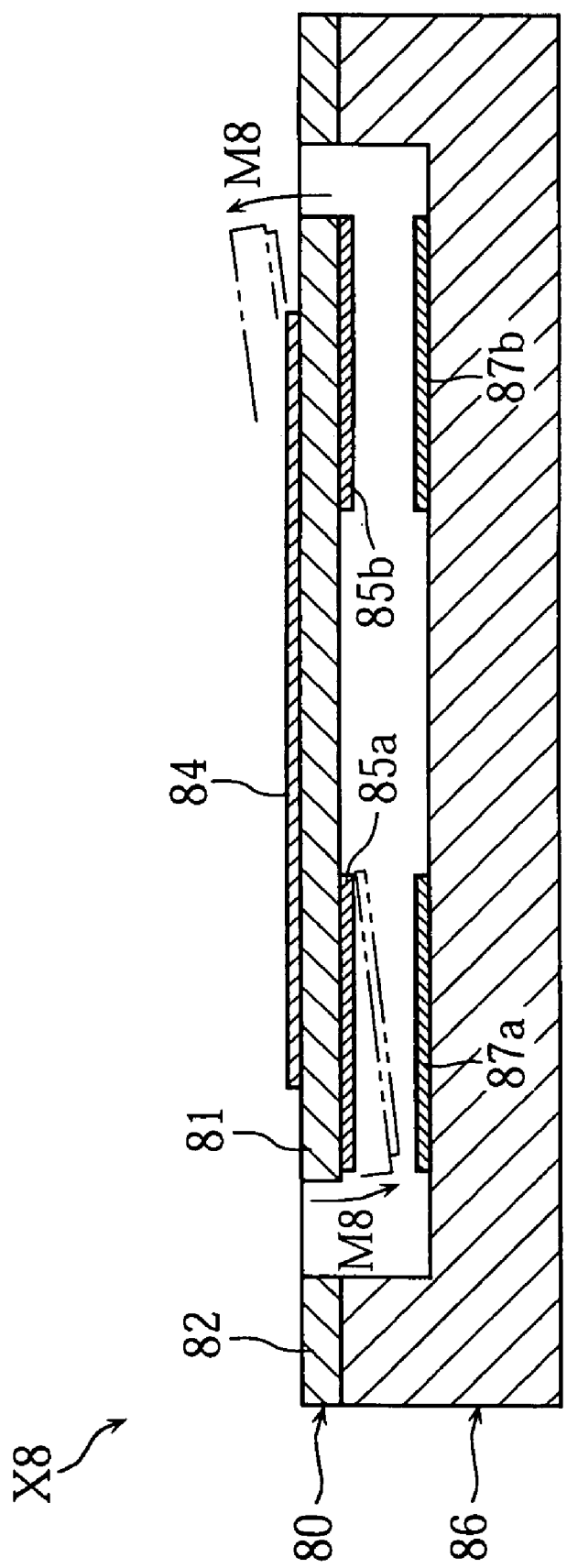
FIG. 44 is a cross-sectional view along line XXXXIV—XXXXIV of the micro-mirror element in FIG. 43, in an assembled state.
Figure 45:
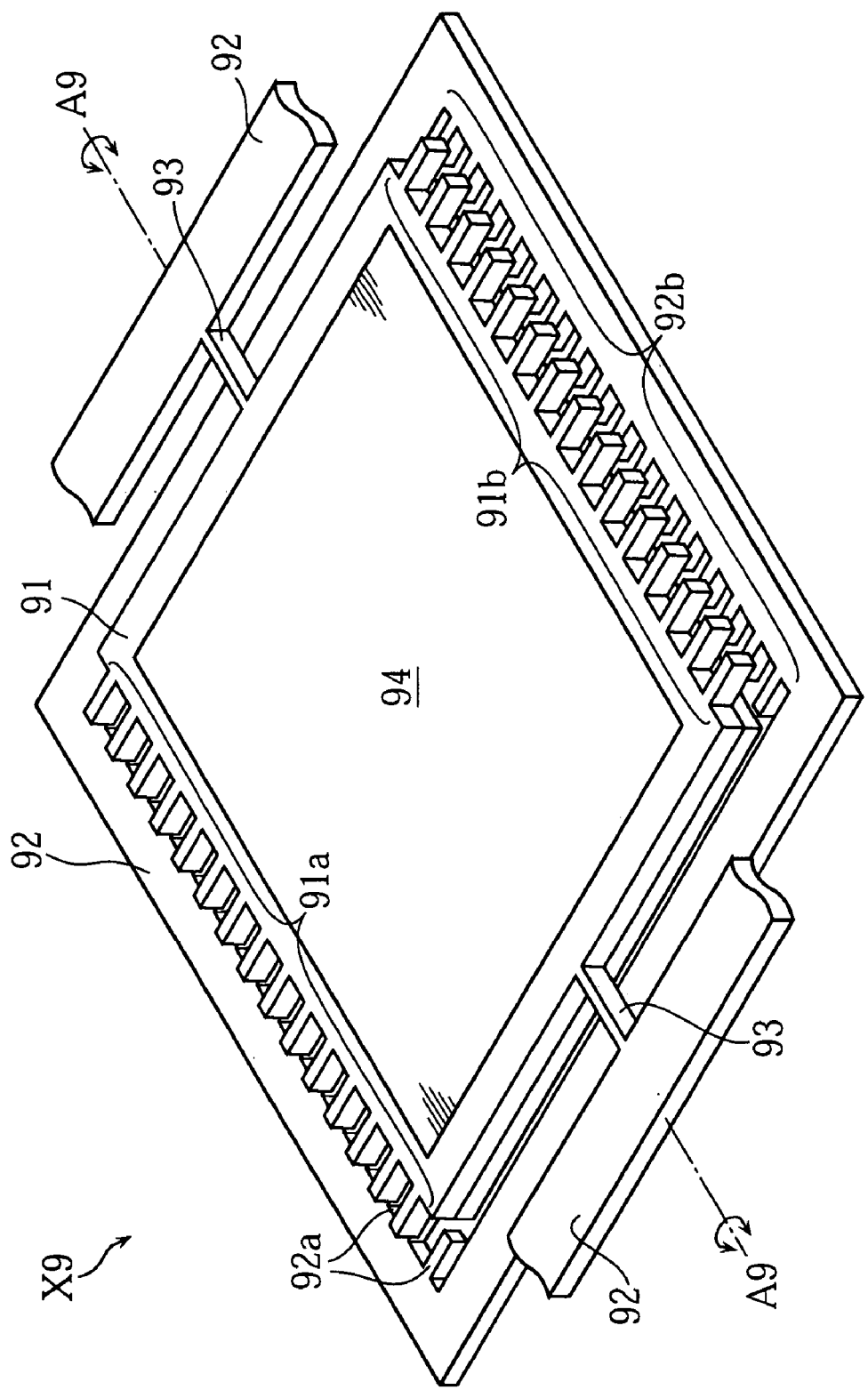
FIG. 45 is partially abbreviated oblique view of a further conventional micro-mirror element.
Figure 46A:
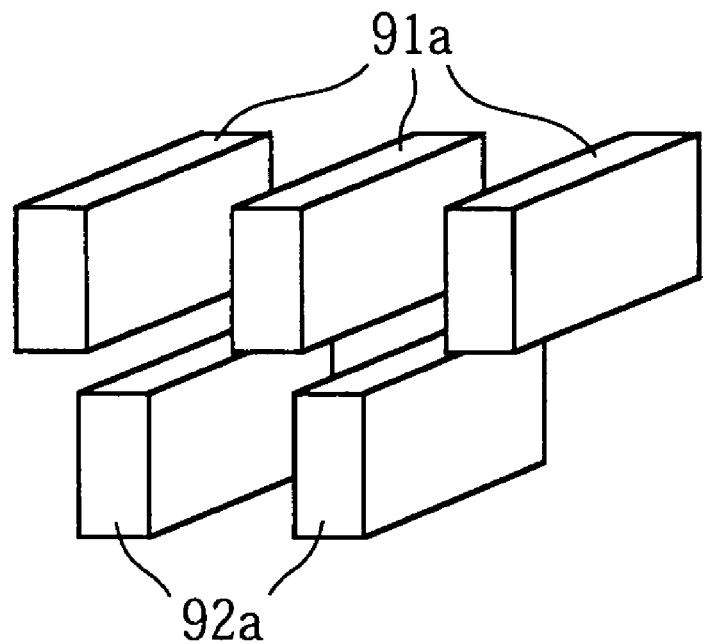
FIGS. 46A–46B show the orientation of a set of comb tooth-shaped electrodes.
Figure 46B:
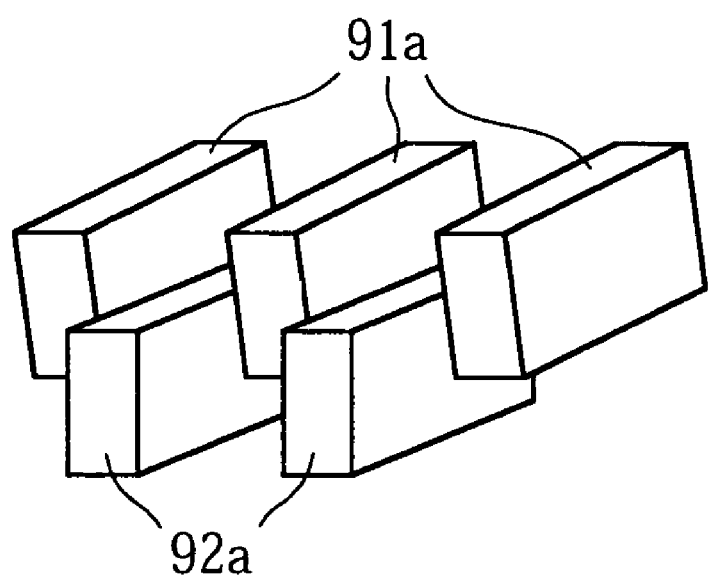
Figure 47A:
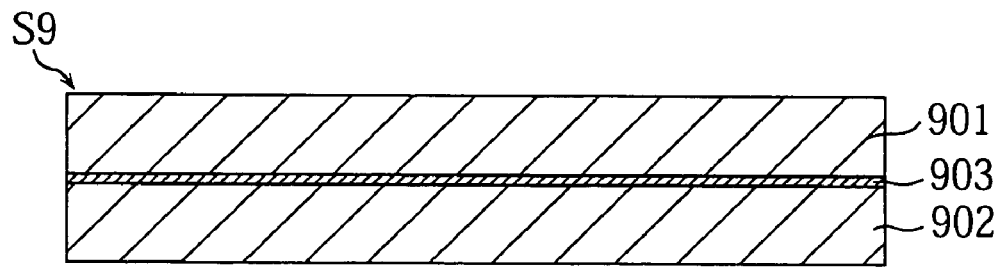
FIGS. 47A–47D show a portion of the processes of a method for manufacturing the micro-mirror element shown in FIG. 45.
Figure 47B:
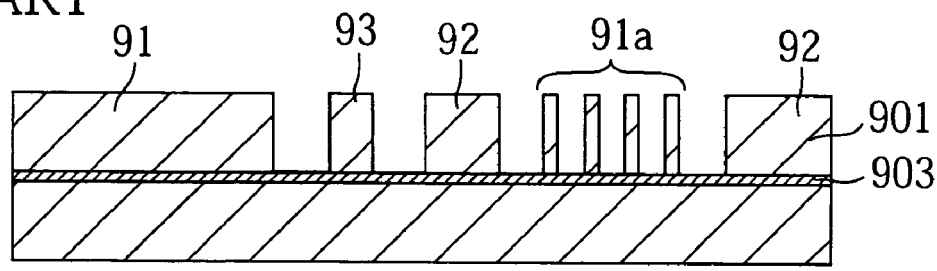
Figure 47C:
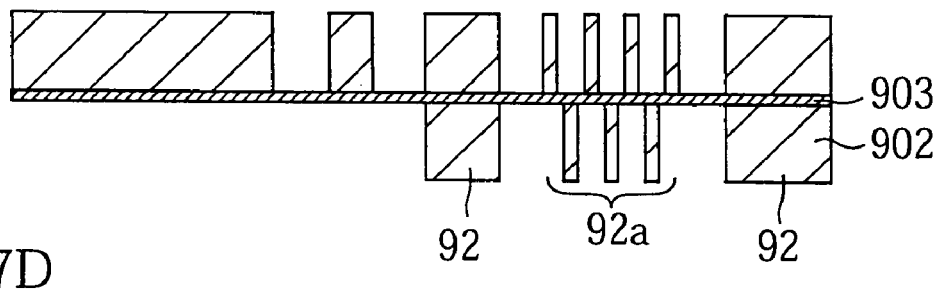
Figure 47D:
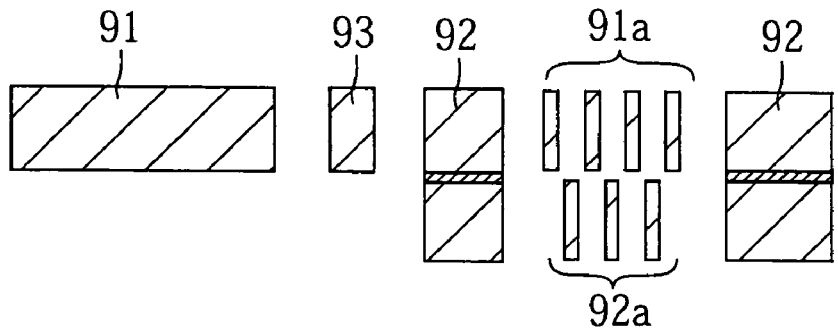

FIG. 41 and FIG. 42 show a modification example of comb tooth-shaped electrodes constituting respective drive mechanisms of micro-mirror elements X1, X3 and X5. FIG. 41A–FIG. 41D show cross-sectional views of comb tooth-shaped electrodes according to respective modification examples, and FIG. 42A and FIG. 42B are respective partial plan views of modification examples.

In the modification illustrated in FIG. 41A, a fixed comb tooth-shaped electrode has electrode teeth 71 and a moving comb tooth-shaped electrode has electrode teeth 71'. When the element is not driven, the electrode teeth 71 and the electrode teeth 71' overlap partially in the direction of the thickness of the comb tooth-shaped electrodes. Here, the fixed comb tooth-shaped electrode corresponds, for example to the comb tooth-shaped electrodes 165, 175, 185, 195 in the micro-mirror element X1, or to the comb tooth-shaped electrodes 345, 355, 365, 375 in the micro-mirror element X3, or to the comb tooth-shaped electrodes 545, 555 in the micro-mirror element X5. On the other hand, the movable comb tooth-shaped electrode corresponds, for example to the comb tooth-shaped electrodes 161, 171, 181, 191 in the micro-mirror element X1, or to the comb tooth-shaped electrodes 341, 351, 361, 371 in the micro-mirror element X3, or to the comb tooth-shaped electrodes 541, 551 in the micro-mirror element X5. This applies similarly to the other modification examples described below. In the present modification, the electrode teeth 71 each have a laminated structure consisting of conductor sections 71a, 71b, and an insulating section 71c interposed between same. In the electrode teeth 71, the conductor sections 71a, 71b are electrically connected. In a composition of this kind, since the electrode teeth 71 and the electrode teeth 71' are already partially overlapping when the element is not driven in rotation, then it is possible to reduce sudden changes in the rotational torque in the range of small angles of rotation on either side of 0°.

In the modification illustrated in FIG. 41B, a moving comb tooth-shaped electrode has electrode teeth 72 and a fixed comb tooth-shaped electrode has electrode teeth 72'. When the element is not driven, the electrode teeth 72 and the electrode teeth 72' overlap partially in the direction of the thickness of the comb tooth-shaped electrodes. In the present modification, the comb tooth-shaped electrode 72 has a laminated structure consisting of conductor sections 72a, 72b, and an insulating section 72c interposed between same. In the electrode teeth 72, the conductor sections 72a, 72b are electrically connected. In a composition of this kind, since the electrode teeth 72 and the electrode teeth 72' are already partially overlapping when the element is not driven in rotation, then it is possible to reduce sudden changes in the rotational torque in the range of small angles of rotation on either side of 0°.

In the modification illustrated in FIG. 41C, a fixed comb tooth-shaped electrode has electrode teeth 73 and a moving comb ooth-shaped electrode has electrode teeth 73'. When the element is not driven, the electrode teeth 73 and the electrode teeth 73' overlap partially in the direction of the thickness of the comb tooth-shaped electrodes. The respective electrode teeth 73, 73' are each made from a uniform conducting section. In a composition of this kind, since the electrode teeth 73 and the electrode teeth 73, are already partially overlapping when the element is not driven in rotation, then it is possible to reduce sudden changes in the rotational torque in the range of small angles of rotation on either side of 0°.

In the modification illustrated in FIG. 41D, a fixed comb tooth-shaped electrode has electrode teeth 74 and a moving comb tooth-shaped electrode has electrode teeth 74'. The electrode teeth 74, which are located in a lower position when the element is not driven in rotation, are designed such that they gradually become wider, from the bottom towards the top thereof, whereas the electrode teeth 74' which are located in an upper position when the element is not driven in rotation, are designed such that they gradually become wider from the top towards the bottom thereof. According to a composition of this kind, by reducing sudden changes in rotational torque in the range of small angles of rotation either side of 0°, and reducing the rotational torque in the case of large angles, it is possible to reduce variation in capacitance after the comb tooth-shaped electrode has been withdrawn (after departure of the stroke). Moreover, according to this composition, it is also possible to increase the bending strength of the respective electrode teeth.

In the modification in FIG. 42A, the outermost electrode tooth 75 is set to a thicker dimension than the other electrode teeth. When a voltage is applied, the outermost electrode tooth in a drive mechanism constituted by a set of comb tooth-shaped electrodes receives a large electrostatic bending force acting in the inward direction of the drive mechanism, but by means of the present composition, it is possible to prevent the outermost electrode tooth 75 from bending excessively, due to this electrostatic force.

In the modification shown in FIG. 42B, respective electrode teeth 77 extending from a base section 76 are designed such that they become gradually wider from the free end towards the base end thereof. By means of a composition of this kind, it is possible to improve the bending strength of the electrode teeth 77, suitably.

The invention claimed is:

1. A micro-oscillation element, comprising:
   a movable main section;
   a first frame and a second frame;
   a first connecting section that connects the movable main section and the first frame and defines a first axis of rotation for a first rotational operation of the movable main section with respect to the first frame;
   a second connecting section that connects the first frame and the second frame and defines a second axis of rotation for a second rotational operation of the first frame and the movable main section with respect to the second frame;
   a first drive mechanism for generating a driving force for the first rotational operation; and
   a second drive mechanism for generating a driving force for the second rotational operation;
   wherein the first axis of rotation and the second axis of rotation are not orthogonal; and
   wherein the first frame has four sides including an electrode supporting side, apart of the first drive mechanism extending from said electrode supporting side of the first frame toward the movable main section, a part of the second drive mechanism extending from said electrode supporting side of the first frame toward the second frame.

2. The micro-oscillation element according to claim 1, wherein at least one of the first drive mechanism and the second drive mechanism comprises a set of comb tooth-shaped electrodes.

3. The micro-oscillation element according to claim 1, wherein the first drive mechanism and the second drive mechanism are operated under common control.

4. The micro-oscillation element according to claim 3, wherein the first drive mechanism and the second drive mechanism are connected electrically in parallel.

5. The micro-oscillation element according to claim 1, wherein the first drive mechanism and the second drive mechanism are electrically separated and operated under mutually independent control.

6. The micro-oscillation element according to claim 1, wherein at least one of the first drive mechanism and the second drive mechanism comprises a first comb tooth-shaped electrode and a second comb tooth-shaped electrode,
at least one of the first comb tooth-shaped electrode and the second comb tooth-shaped electrode having a laminated structure which includes a first conductor section, a second conductor section, and an insulating section interposed between the first and second conductor sections.

7. The micro-oscillation element according to claim 1, wherein at least one of the first drive mechanism and the second drive mechanism comprises a first comb tooth-shaped electrode and a second comb tooth-shaped electrode,
the first comb tooth-shaped electrode having a laminated structure which includes a first conductor section, a second conductor section, and an insulating section interposed between the first and second conductor sections,
the second comb tooth-shaped electrode having a third conductor section facing the first conductor section above the second conductor section when the micro-oscillation element is not driven.

8. The micro-oscillation element according to claim 7, wherein the first conductor section and the third conductor section are of different lengths in the direction of rotational operation.

9. The micro-oscillation element according to claim 7, wherein at least one of the first and second comb tooth-shaped electrodes has a base section and electrode teeth extending from the base section, the electrode teeth having regions that gradually increase in width or thickness towards the base section.

10. The micro-oscillation element according to claim 7, wherein at least one of the first and second comb tooth-shaped electrodes has a base section and electrode teeth extending from the base section, the electrode teeth having regions that gradually increase in width as approaching the other comb tooth-shaped electrode.

11. The micro-oscillation element according to claim 1, wherein the first connecting section has a cavity that becomes wider as approaching the movable main section, and the second connecting section has a cavity that becomes wider as approaching the first frame.

12. The micro-oscillation element according to claim 1, wherein said part of the first drive mechanism, said part of the second drive mechanism, the first connecting section, and the second connecting section extend from said electrode supporting side of the first frame.

* * * * *